US012126462B2

(12) United States Patent
Speicher et al.

(10) Patent No.: US 12,126,462 B2
(45) Date of Patent: Oct. 22, 2024

(54) MIXED MODE MULTICAST ARCHITECTURE

(71) Applicant: QUALCOMM Incorporated, San Diego, CA (US)

(72) Inventors: Sebastian Speicher, Wallisellen (CH); Haris Zisimopoulos, London (GB); Miguel Griot, La Jolla, CA (US); Hong Cheng, Basking Ridge, NJ (US); Juan Zhang, Beijing (CN); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/519,409

(22) Filed: Nov. 27, 2023

(65) Prior Publication Data

US 2024/0089139 A1    Mar. 14, 2024

Related U.S. Application Data

(62) Division of application No. 17/053,312, filed as application No. PCT/CN2019/088345 on May 24, 2019, now Pat. No. 11,870,599.

(30) Foreign Application Priority Data

May 25, 2018 (WO) ................ PCT/CN2018/088504

(51) Int. Cl.
*H04W 36/00* (2009.01)
*H04L 12/18* (2006.01)
(Continued)

(52) U.S. Cl.
CPC ..... *H04L 12/1886* (2013.01); *H04W 28/0252* (2013.01); *H04W 36/0007* (2018.08); *H04W 36/0016* (2013.01); *H04W 72/30* (2023.01)

(58) Field of Classification Search
CPC . H04L 12/1886; H04L 67/63; H04L 12/1836; H04L 12/189; H04W 36/0007;
(Continued)

(56) References Cited

U.S. PATENT DOCUMENTS 11,477,687 B2    10/2022  Kadiri et al.
2005/0026607 A1   2/2005  Hwang et al.
(Continued)

FOREIGN PATENT DOCUMENTS

CN      1585508 A    2/2005
CN    107027103 A    8/2017
(Continued)

OTHER PUBLICATIONS

International Preliminary Report on Patentability—PCT/CN2018/088504 The International Bureau of WIPO—Geneva, Switzerland, Dec. 10, 2020.
(Continued)

*Primary Examiner* — Mandish K Randhawa
(74) *Attorney, Agent, or Firm* — Holland & Hart LLP

(57) ABSTRACT

Methods, systems, and devices for wireless communications are described. A multicast architecture may support flexible change between unicast and multicast operations and may support additional traffic types (e.g., Internet Protocol and Ethernet traffic). For example, the multicast architecture may include transmitting data over a shared multicast radio bearer (MRB) and/or specific data radio bearers (DRBs), a multicast user plane function (UPF) for supplying the multicast data to a base station, multicast data from different radio access networks (RANs), protecting the multicast data through creating a group key, ciphering the multicast data sent on the MRB using the group key, and transitioning the multicast data from a source RAN to a target RAN.

20 Claims, 30 Drawing Sheets

(51) Int. Cl.
*H04W 28/02* (2009.01)
*H04W 72/30* (2023.01)

(58) Field of Classification Search
CPC ............. H04W 72/30; H04W 28/0252; H04W 36/001; H04W 12/0433; H04W 36/0016; H04W 76/11; H04W 76/40
See application file for complete search history.

(56) References Cited

U.S. PATENT DOCUMENTS

| | | | |
|---|---|---|---|
| 2013/0121133 | A1 | 5/2013 | Anchan et al. |
| 2013/0294321 | A1 | 11/2013 | Wang et al. |
| 2013/0315125 | A1 | 11/2013 | Ravishankar et al. |
| 2014/0372624 | A1 | 12/2014 | Wang et al. |
| 2016/0119762 | A1 | 4/2016 | Zhu et al. |
| 2016/0374050 | A1 | 12/2016 | Prasad et al. |
| 2017/0374581 | A1 | 12/2017 | Dao |
| 2018/0035405 | A1 | 2/2018 | Fujishiro et al. |
| 2018/0076969 | A1 | 3/2018 | Yi et al. |
| 2019/0158985 | A1* | 5/2019 | Dao ..................... H04W 28/04 |
| 2020/0084631 | A1 | 3/2020 | Zhang et al. |
| 2020/0259672 | A1 | 8/2020 | Meng et al. |
| 2021/0014765 | A1* | 1/2021 | Shan ..................... H04W 8/02 |
| 2021/0076166 | A1 | 3/2021 | Navratil et al. |
| 2021/0234717 | A1 | 7/2021 | Speicher et al. |

FOREIGN PATENT DOCUMENTS

| | | |
|---|---|---|
| EP | 3079400 A1 | 10/2016 |
| EP | 3092846 A1 | 11/2016 |
| GB | 2522043 A | 7/2015 |
| WO | WO2013166423 A2 | 11/2013 |
| WO | WO2015001746 A1 | 1/2015 |
| WO | WO2015085457 A1 | 6/2015 |
| WO | WO2015105970 A1 | 7/2015 |

OTHER PUBLICATIONS

International Preliminary Report on Patentability—PCT/CN2019/088345 The International Bureau of WIPO—Geneva, Switzerland, Dec. 10, 2020.
International Search Report and Written Opinion—PCT/CN2018/088504—ISA/EPO—Feb. 11, 2019.
International Search Report and Written Opinion—PCT/CN2019/088345—ISA/EPO—Jul. 25, 2019.
Nokia et al., "23.716 solutions: Support of IPTV", SA WG2 Meeting #127, S2-184478, Apr. 20, 2018 (Apr. 20, 2018), 3 Pages.
Supplementary European Search Report—EP19806614—Search Authority—Munich—Jun. 14, 2022.
Supplementary Partial European Search Report—EP19806614—Search Authority—Munich—Feb. 7, 2022.

* cited by examiner

MIXED MODE MULTICAST ARCHITECTURE

CROSS REFERENCES

The present Application for Patent is a Divisional of U.S. patent application Ser. No. 17/053,312 by SPEICHER et al., entitled "MIXED MODE MULTICAST ARCHITECTURE" and filed Nov. 5, 2020, which is a National Stage Entry of International Patent Application No. PCT/CN2019/088345 by SPEICHER et al., entitled "MIXED MODE MULTICAST ARCHITECTURE" and filed May 24, 2019, which claims priority to International Patent Application No. PCT/CN2018/088504 by SPEICHER et al., entitled "MIXED MODE MULTICAST ARCHITECTURE" and filed May 25, 2018, each of which is assigned to the assignee hereof and is hereby incorporated by reference in its entirety.

BACKGROUND

The following relates generally to wireless communications, and more specifically to mixed mode multicast architecture.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some cases, one base station may communicate with multiple UEs simultaneously. Accordingly, the base station may communicate with the multiple UEs via broadcasted transmissions to UEs within a coverage area that include the multiple UEs. Alternatively, the base station may multicast the transmissions specifically to the multiple UEs out of a total number of UEs within the coverage area. However, multicast transmissions may include complex techniques and integrations of different communications layers (e.g., radio and service layer). Improved techniques are desired for multicast communications between a base station and multiple UEs.

SUMMARY

The described techniques relate to improved methods, systems, devices, and apparatuses that support mixed mode multicast architecture. Generally, the described techniques provide for a multicast architecture that may support flexible change between unicast and multicast operations and may support one or more traffic types at a time (e.g., Internet Protocol (IP) and Ethernet traffic). For example, the multicast architecture may include transmitting data over a shared multicast radio bearer (MRB) and/or specific data radio bearers (DRBs), a multicast user plane function (UPF) for supplying the multicast data to a base station, multicast data from different radio access networks (RANs), protecting the multicast data through creating a group key (e.g., derived by a RAN), ciphering the multicast data sent on the MRB using the group key, transitioning the multicast data from a source RAN to a target RAN, or a combination thereof.

A method of wireless communication is described. The method may include receiving multicast traffic at a base station for delivery to a set of user equipments (UEs), determining, at the base station, whether to deliver the multicast traffic to the set of UEs via unicast delivery, via multicast delivery, or combinations thereof, and transmitting the multicast traffic to the set of UEs based on the determining.

An apparatus for wireless communication is described. The apparatus may include a processor, memory in electronic communication with the processor, and instructions stored in the memory. The instructions may be executable by the processor to cause the apparatus to receive multicast traffic at a base station for delivery to a set of UEs, determine, at the base station, whether to deliver the multicast traffic to the set of UEs via unicast delivery, via multicast delivery, or combinations thereof, and transmit the multicast traffic to the set of UEs based on the determining.

Another apparatus for wireless communication is described. The apparatus may include means for receiving multicast traffic at a base station for delivery to a set of UEs, determining, at the base station, whether to deliver the multicast traffic to the set of UEs via unicast delivery, via multicast delivery, or combinations thereof, and transmitting the multicast traffic to the set of UEs based on the determining.

A non-transitory computer-readable medium storing code for wireless communication is described. The code may include instructions executable by a processor to receive multicast traffic at a base station for delivery to a set of UEs, determine, at the base station, whether to deliver the multicast traffic to the set of UEs via unicast delivery, via multicast delivery, or combinations thereof, and transmit the multicast traffic to the set of UEs based on the determining.

In some examples of the method, apparatuses, and non-transitory computer-readable medium described herein, transmitting the multicast traffic to the set of UEs may include operations, features, means, or instructions for transmitting the multicast traffic to each UE within at least a subset of the set of UEs via individual DRBs.

Some examples of the method, apparatuses, and non-transitory computer-readable medium described herein may further include operations, features, means, or instructions for identifying the individual DRBs to be used to transmit the multicast traffic to each UE within the subset of the set of UEs and transmitting a signal (e.g., a radio resource control (RRC) signal) to each UE within the subset of the set of UEs in order to configure each UE within the subset of the set of UEs to receive the multicast traffic via the individual DRBs.

In some examples of the method, apparatuses, and non-transitory computer-readable medium described herein, identifying the individual DRBs may include operations, features, means, or instructions for identifying quality of service (QoS) information for the multicast traffic and identifying the individual DRBs to be used based on the QoS information for the multicast traffic, the individual DRBs either selected from already established DRBs or established as additional DRBs.

In some examples of the method, apparatuses, and non-transitory computer-readable medium described herein, transmitting the multicast traffic to the set of UEs may include operations, features, means, or instructions for transmitting the multicast traffic to each UE within at least a subset of the set of UEs via a shared MRB.

Some examples of the method, apparatuses, and non-transitory computer-readable medium described herein may further include operations, features, means, or instructions for generating a multicast radio network temporary identifier (M-RNTI) in order to identify a source of the multicast traffic, transmitting a signal (e.g., RRC signal or a system information broadcast (SIB) message) to each UE within the subset of the set of UEs in order to provide each UE within the subset of the set of UEs with a tuple based on the M-RNTI and a protocol data unit (PDU) session identifier (ID) and identifying the MRB by the M-RNTI.

In some examples of the method, apparatuses, and non-transitory computer-readable medium described herein, determining whether to deliver the multicast traffic to the set of UEs via unicast delivery, via multicast delivery, or combinations thereof may include operations, features, means, or instructions for identifying one or more UE-related parameters and determining whether to use unicast delivery, multicast delivery, or combinations thereof based on the one or more UE-related parameters, where the one or more UE-related parameters include at least one of a number of UEs in the set of UEs, or a channel quality for communication with individual UEs of the set of UEs.

Some examples of the method, apparatuses, and non-transitory computer-readable medium described herein may further include operations, features, means, or instructions for dynamically changing a determination of whether to deliver the multicast traffic to the set of UEs via unicast delivery, via multicast delivery, or combinations thereof.

In some examples of the method, apparatuses, and non-transitory computer-readable medium described herein, receiving multicast traffic at the base station for delivery to the set of UEs may include operations, features, means, or instructions for receiving the multicast traffic via a tunnel from an MC-UPF, where only a single copy of the multicast traffic may be received for delivery to each of the set of UEs, and where the tunnel supports different types of multicast traffic, the different types including both IP packets and Ethernet frames, and where the IP packets may be received via IP multicast.

Some examples of the method, apparatuses, and non-transitory computer-readable medium described herein may further include operations, features, means, or instructions for receiving, from a management function (e.g., an access and mobility management function (AMF)), at least one of multicast distribution information, a corresponding PDU session ID, QoS information for the multicast traffic, or session management (SM) container, where the multicast distribution information includes a tunnel endpoint identifier (TEID), a multicast distribution address, and a multicast source address, joining a multicast source corresponding to the multicast source address of the multicast distribution information and forwarding the SM container to the set of UEs.

Some examples of the method, apparatuses, and non-transitory computer-readable medium described herein may further include operations, features, means, or instructions for receiving, from a management function, a request to stop transmitting the multicast traffic to at least one of the set of UEs, removing, from a UE context corresponding to the at least one of the set of UEs, a tuple that includes UE multicast source information associated with a multicast source of the multicast traffic and leaving the multicast source if none of the set of UEs may be still receiving multicast data from the multicast source.

Some examples of the method, apparatuses, and non-transitory computer-readable medium described herein may further include operations, features, means, or instructions for preparing for a handover of the multicast traffic for a UE of the set of UEs by forwarding multicast distribution information to a target base station directly (e.g., via an Xn interface) or indirectly via a management function (e.g., via an N2 interface), where the multicast distribution information includes a TEID, a multicast distribution address, and a multicast source address, receiving, either directly or indirectly, a UE radio bearer configuration from the target base station, where the UE radio bearer configuration includes individual DRBs or a shared MRB, forwarding the UE radio bearer configuration to the UE and leaving a multicast source of the multicast traffic if none of the set of UEs may be still receiving multicast data from the multicast source via the base station.

Some examples of the method, apparatuses, and non-transitory computer-readable medium described herein may further include operations, features, means, or instructions for ciphering the multicast traffic using a group key for multicast traffic that may be transmitted via multicast delivery.

A method of wireless communication at a UE is described. The method may include receiving, at the UE and from a base station, a signal (e.g., RRC signal) indicating whether a DRB or an MRB is to be used to receive multicast traffic at the UE and receiving multicast traffic at the UE using either the DRB or the MRB based on the signal.

An apparatus for wireless communication at a UE is described. The apparatus may include a processor, memory in electronic communication with the processor, and instructions stored in the memory. The instructions may be executable by the processor to cause the apparatus to receive, at the UE and from a base station, a signal (e.g., RRC signal) indicating whether a DRB or an MRB is to be used to receive multicast traffic at the UE and receive multicast traffic at the UE using either the DRB or the MRB based on the signal.

Another apparatus for wireless communication at a UE is described. The apparatus may include means for receiving, at the UE and from a base station, a signal (e.g., RRC signal) indicating whether a DRB or an MRB is to be used to receive multicast traffic at the UE and receiving multicast traffic at the UE using either the DRB or the MRB based on the signal.

A non-transitory computer-readable medium storing code for wireless communication at a UE is described. The code may include instructions executable by a processor to receive, at the UE and from a base station, a signal (e.g., RRC signal) indicating whether a DRB or an MRB is to be used to receive multicast traffic at the UE and receive multicast traffic at the UE using either the DRB or the MRB based on the signal.

In some examples of the method, apparatuses, and non-transitory computer-readable medium described herein, receiving the signal may include operations, features, means, or instructions for receiving a tuple based on an M-RNTI, which identifies a multicast source of the multicast traffic, and a PDU session ID and associating the MRB with the M-RNTI in order to facilitate reception of the multicast traffic using the MRB.

In some examples of the method, apparatuses, and non-transitory computer-readable medium described herein, receiving the signal may include operations, features, means, or instructions for receiving a configuration for using the DRB to receive the multicast traffic.

Some examples of the method, apparatuses, and non-transitory computer-readable medium described herein may further include operations, features, means, or instructions for transmitting, prior to receiving the signal indicating whether the DRB or the MRB may be to be used, a message (e.g., an SM message) in order to trigger addition of a multicast source of the multicast traffic to a PDU session with which the UE may be associated, the message including at least one of a PDU session ID, or multicast source information.

Some examples of the method, apparatuses, and non-transitory computer-readable medium described herein may further include operations, features, means, or instructions for transmitting, prior to receiving the signal indicating whether the DRB or the MRB may be to be used and prior to establishment of a PDU session for communication with the UE, a PDU session establishment request, where the PDU session establishment request includes multicast source information corresponding to a multicast source of the multicast traffic.

Some examples of the method, apparatuses, and non-transitory computer-readable medium described herein may further include operations, features, means, or instructions for transmitting, prior to receiving the signal indicating whether the DRB or the MRB may be to be used, an Internet Group Management Protocol (IGMP) or Multicast Listener Discovery (MLD) message via a user-plane in order to trigger addition of a multicast source of the multicast traffic to a PDU session with which the UE may be associated, the IGMP or MLD message including information indicative of the multicast source.

Some examples of the method, apparatuses, and non-transitory computer-readable medium described herein may further include operations, features, means, or instructions for transmitting a message (e.g., SM message) in order to stop delivery of the multicast traffic from a multicast source to the UE, the message including at least one of a PDU session ID, multicast source information, or an indication that the multicast source may be to be dropped from the PDU session.

Some examples of the method, apparatuses, and non-transitory computer-readable medium described herein may further include operations, features, means, or instructions for transmitting an IGMP or MLD message via a user-plane in order to stop delivery of the multicast traffic from a multicast source to the UE, the IGMP or MLD message including information indicative of the multicast source.

Some examples of the method, apparatuses, and non-transitory computer-readable medium described herein may further include operations, features, means, or instructions for receiving, via ciphered non-access stratum (NAS) signaling, a group key associated with ciphering and deciphering the multicast traffic.

A method of wireless communication is described. The method may include identifying, at an SMF, that a UE is to join a multicast source for reception of multicast traffic from the multicast source, selecting an MC-UPF to provide the multicast traffic to the UE, transmitting PDU session information associated with the UE and multicast source information associated with the multicast source to the multicast UPF, receiving, from the MC-UPF and responsive to the PDU session information and the multicast source information, multicast distribution information to be associated with the multicast source, where the multicast distribution information includes information per multicast source per UE charging and LI related information, and transmitting the multicast distribution information, a related PDU session ID, QoS information for the multicast data, and a management container to a management function for use by a base station that is to deliver the multicast traffic to the UE via either unicast delivery or multicast delivery.

An apparatus for wireless communication is described. The apparatus may include a processor, memory in electronic communication with the processor, and instructions stored in the memory. The instructions may be executable by the processor to cause the apparatus to identify, at an SMF, that a UE is to join a multicast source for reception of multicast traffic from the multicast source, select an MC-UPF to provide the multicast traffic to the UE, transmit PDU session information associated with the UE and multicast source information associated with the multicast source to the multicast UPF, receive, from the MC-UPF and responsive to the PDU session information and the multicast source information, multicast distribution information to be associated with the multicast source, where the multicast distribution information includes information per multicast source per UE charging and LI related information, and transmit the multicast distribution information, a related PDU session ID, QoS information for the multicast data, and a management container to a management function for use by a base station that is to deliver the multicast traffic to the UE via either unicast delivery or multicast delivery.

Another apparatus for wireless communication is described. The apparatus may include means for identifying, at an SMF, that a UE is to join a multicast source for reception of multicast traffic from the multicast source, selecting an MC-UPF to provide the multicast traffic to the UE, transmitting PDU session information associated with the UE and multicast source information associated with the multicast source to the multicast UPF, receiving, from the MC-UPF and responsive to the PDU session information and the multicast source information, multicast distribution information to be associated with the multicast source, where the multicast distribution information includes information per multicast source per UE charging and LI related information, and transmitting the multicast distribution information, a related PDU session ID, QoS information for the multicast data, and a management container to a management function for use by a base station that is to deliver the multicast traffic to the UE via either unicast delivery or multicast delivery.

A non-transitory computer-readable medium storing code for wireless communication is described. The code may include instructions executable by a processor to identify, at an SMF, that a UE is to join a multicast source for reception of multicast traffic from the multicast source, select an MC-UPF to provide the multicast traffic to the UE, transmit PDU session information associated with the UE and multicast source information associated with the multicast source to the multicast UPF, receive, from the MC-UPF and responsive to the PDU session information and the multicast source information, multicast distribution information to be associated with the multicast source, where the multicast distribution information includes information per multicast source per UE charging and LI related information, and transmit the multicast distribution information, a related PDU session ID, QoS information for the multicast data, and a management container to a management function for use by a base station that is to deliver the multicast traffic to the UE via either unicast delivery or multicast delivery.

In some examples of the method, apparatuses, and non-transitory computer-readable medium described herein, selecting the MC-UPF may include operations, features, means, or instructions for selecting the MC-UPF based on at least one of a single network slice selection assistance information (S-NSSAI) of the related PDU session ID, a data network name (DNN) of the related PDU session ID, or the multicast source information.

In some examples of the method, apparatuses, and non-transitory computer-readable medium described herein, identifying that the UE may be to join the multicast source for reception of multicast traffic from the multicast source may include operations, features, means, or instructions for receiving the multicast source information from the UE.

In some examples of the method, apparatuses, and non-transitory computer-readable medium described herein, identifying that the UE may be to join the multicast source for reception of multicast traffic from the multicast source may include operations, features, means, or instructions for deriving the multicast source information when a type of PDU session corresponding to the related PDU session ID may be Ethernet.

Some examples of the method, apparatuses, and non-transitory computer-readable medium described herein may further include operations, features, means, or instructions for identifying that a type of PDU session corresponding to the related PDU session ID may be Ethernet and transmitting a message to a UPF separate from the MC-UPF and which may be serving a unicast PDU session to the UE, where the message requests that the UPF block downlink Ethernet broadcast frames to the UE.

In some examples of the method, apparatuses, and non-transitory computer-readable medium described herein, the multicast source information includes an IP multicast delivery address and an IP multicast source address.

In some examples of the method, apparatuses, and non-transitory computer-readable medium described herein, the multicast source information includes an Ethernet broadcast traffic indication which indicates that only Ethernet broadcast frames may be to be delivered as the multicast traffic to the UE.

Some examples of the method, apparatuses, and non-transitory computer-readable medium described herein may further include operations, features, means, or instructions for identifying that the UE may be to leave the multicast source, transmitting a request to the MC-UPF to release a UE context for the multicast source information and transmitting a request to that the base station remove a tuple that includes the PDU session ID and the multicast source information from the UE context.

Some examples of the method, apparatuses, and non-transitory computer-readable medium described herein may further include operations, features, means, or instructions for receiving an indication that a handover or an N2 path switch may be to occur, selecting a new MC-UPF to provide the multicast traffic to the UE, transmitting a request to the new MC-UPF that the new MC-UPF may be to join the multicast source and to provide updated multicast distribution information to the SMF, receiving the updated multicast distribution information from the new MC-UPF and transmitting the updated multicast distribution information via the management function to the base station.

Some examples of the method, apparatuses, and non-transitory computer-readable medium described herein may further include operations, features, means, or instructions for adding, to a PDU session associated with the PDU session ID, the multicast source identified by the multicast source information.

Some examples of the method, apparatuses, and non-transitory computer-readable medium described herein may further include operations, features, means, or instructions for identifying that a PDU session for communication with the UE may have not yet been established, establishing a unicast PDU session for communication with the UE and adding, to the unicast PDU session, the multicast source identified by the multicast source information.

In some examples of the method, apparatuses, and non-transitory computer-readable medium described herein, identifying that the UE may be to join the multicast source for reception of multicast traffic from the multicast source may include operations, features, means, or instructions for configuring a UPF that may be separate from the MC-UPF and which may be serving a unicast PDU session to the UE, such that the UPF matches and forwards any IGMP or MLD messages received from the UE, receiving an IGMP or MLD message from the UPF indicating that the UE may be to join the multicast source and deriving the multicast source information from the IGMP or MLD message, where the method further includes.

Some examples of the method, apparatuses, and non-transitory computer-readable medium described herein may further include operations, features, means, or instructions for receiving an indication that the UE may be to leave the multicast source and stopping delivery of the multicast traffic to the UE based on the indication.

Some examples of the method, apparatuses, and non-transitory computer-readable medium described herein may further include operations, features, means, or instructions for configuring a UPF that may be separate from the MC-UPF and which may be serving a unicast PDU session to the UE, such that the UPF matches and forwards any IGMP or MLD messages received from the UE, receiving an IGMP or MLD message from the UPF indicating that the UE may be to leave the multicast source and deriving the multicast source information from the IGMP or MLD message, where the method further includes.

Some examples of the method, apparatuses, and non-transitory computer-readable medium described herein may further include operations, features, means, or instructions for transmitting a request for a group key for ciphering of the multicast traffic, receiving, as a result of the request, the group key, where the group key may be based on the multicast distribution information and transmitting the group key via the management function to the base station for use by the base station with the multicast traffic.

DETAILED DESCRIPTION

In some wireless communications systems, a base station (e.g., as part of a radio access network (RAN)) may utilize services to provide broadcast communications and/or multicast communications to multiple user equipments (UEs) (e.g., via evolved multimedia broadcast multicast services (eMBMS)). The broadcast communications may include transmitting a same message to any UE (including the multiple UEs) within a coverage area of the base station. Alternatively, the multicast communications may enable a mixed mode of multicast and unicast transmissions specifically to the multiple UEs, where the base station may transmit a same message to each of the multiple UEs via a shared radio bearer (e.g., a multicast radio bearer (MRB)) and/or the same message to each of the multiple UEs via separate radio bearers (e.g., data radio bearers (DRBs)). In some cases, the base station may dynamically decide a delivery method (e.g., shared MRB or separate DRBs) for multicasting data to the multiple UEs (e.g., based on the number of UEs, location of the UEs, etc.).

For either delivery method, a multicast user plane function (UPF) may initially deliver the multicast data to the base station, and the base station may then transmit the multicast data to the multiple UEs based on the decided delivery method. The multicast data may include data from a cellular network, Ethernet, etc. Additionally, when transmitting multicast data via an MRB, the base station may protect the multicast data by ciphering the multicast data that is sent on the MRB using the group key, where the group key may either be derived in the base station, derived in the base station using a master key provided by a management function, or provided by a management function. In some cases, a UE may transition from a source base station to a target base station (e.g., Xn-based or N2-based handover), where multicast information for the UE is forwarded from the source base station to the target base station. Accordingly, the target base station may determine which delivery method to utilize for subsequent multicast data transmissions for the UE.

Aspects of the disclosure are initially described in the context of a wireless communications system. Additional wireless communications systems, process flows, and network and Ethernet architectures are provided to illustrate aspects of the present disclosure. Aspects of the disclosure are further illustrated by and described with reference to apparatus diagrams, system diagrams, and flowcharts that relate to mixed mode multicast architecture.

Figure 1:
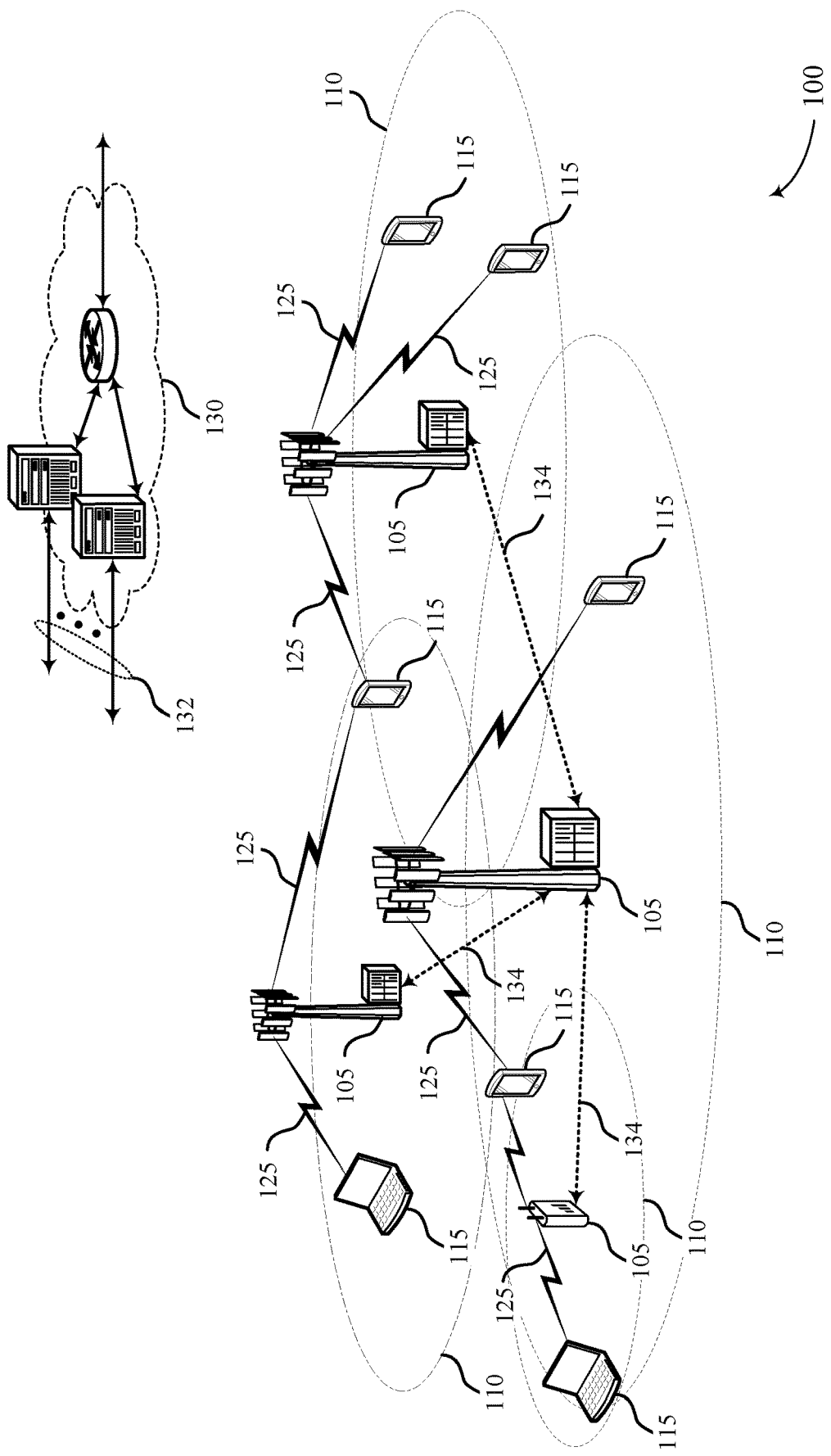
FIG. 1 illustrates an example of a wireless communications system that supports mixed mode multicast architecture in accordance with aspects of the present disclosure.

FIG. 1 illustrates an example of a wireless communications system 100 that supports mixed mode multicast architecture in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, different services (e.g., eMBMS) within the systems may provide different mechanisms for communicating between one or more base stations 105 and one or more UEs 115. For example, eMBMS may include a cellular-based broadcasting and multicasting mechanism. The cellular-based broadcasting and multicasting mechanism may support broadcasted and multicasted transmissions. Additionally, the cellular-based broadcasting and multicasting mechanism may or may not necessitate the usage of a specific broadcast multicast service center (BMSC)-based system architecture and may utilize a specific service layer to enhance broadcast communications. Accordingly, operators focused on broadcast or multicast communications may utilize the cellular-based broadcasting and multicasting mechanism.

However, despite offering the multicast mechanism, operators may refrain from deploying support for multicast communications. For example, the different services (e.g., eMBMS) that provide the multicast mechanism may rely on a tight integration of multiple communication layers (e.g., radio and service layers), resulting in a complex system. The tight integration of multicast transmissions over the multiple communication layers may be enabled through a common identifier (e.g., a temporary mobile group identity (TGMI)) to link the different communication layers. The common identifier, though, may imply the need to deploy additional centralized architectural entities (e.g., BMSC) to manage the integration of the multiple communication layers and the related common identifiers. Additionally, one or more of the multiple communication layers (e.g., the service layer) may not be needed for one or more different use cases. For example, multiple UEs 115 may receive multicast data from one base station 105, such that a common address for a service (e.g., a same multicast Internet Protocol (IP) address) is utilized. This common address may have been provided to the multiple UEs 115 as part of an application utilizing the received multicast data or may have been provided to the multiple UEs 115 by other means than the one or more of the multiple communications layers not needed for the use case. As such, a multicast architecture that avoids dependencies on a specific layer (e.g., service layer) or a need for operators to deploy additional centralized architectural entities for service layer integration may be desired.

Wireless communications system 100 may support a multicast architecture that supports flexible change between unicast and multicast, avoids additional centralized entities (e.g., a BMSC), supports a single cell point to multi-point communication pattern (e.g., without TGMIs for binding a service layer), and supports additional traffic types (e.g., IP and Ethernet traffic). For example, the multicast architecture may include transmitting data over a MRB and/or DRBs, a multicast UPF for supplying the multicast data to a base station 105, multicast data from different RANs (e.g., cellular network, Ethernet, etc), protecting the multicast data through creating a group key (e.g., derived by a RAN for the base station 105), ciphering the multicast data sent on the MRB using the group key, transitioning the multicast data from a source base station 105 to a target base station 105 (e.g., Xn-based or N2-based handover), or a combination thereof.

Figure 2:
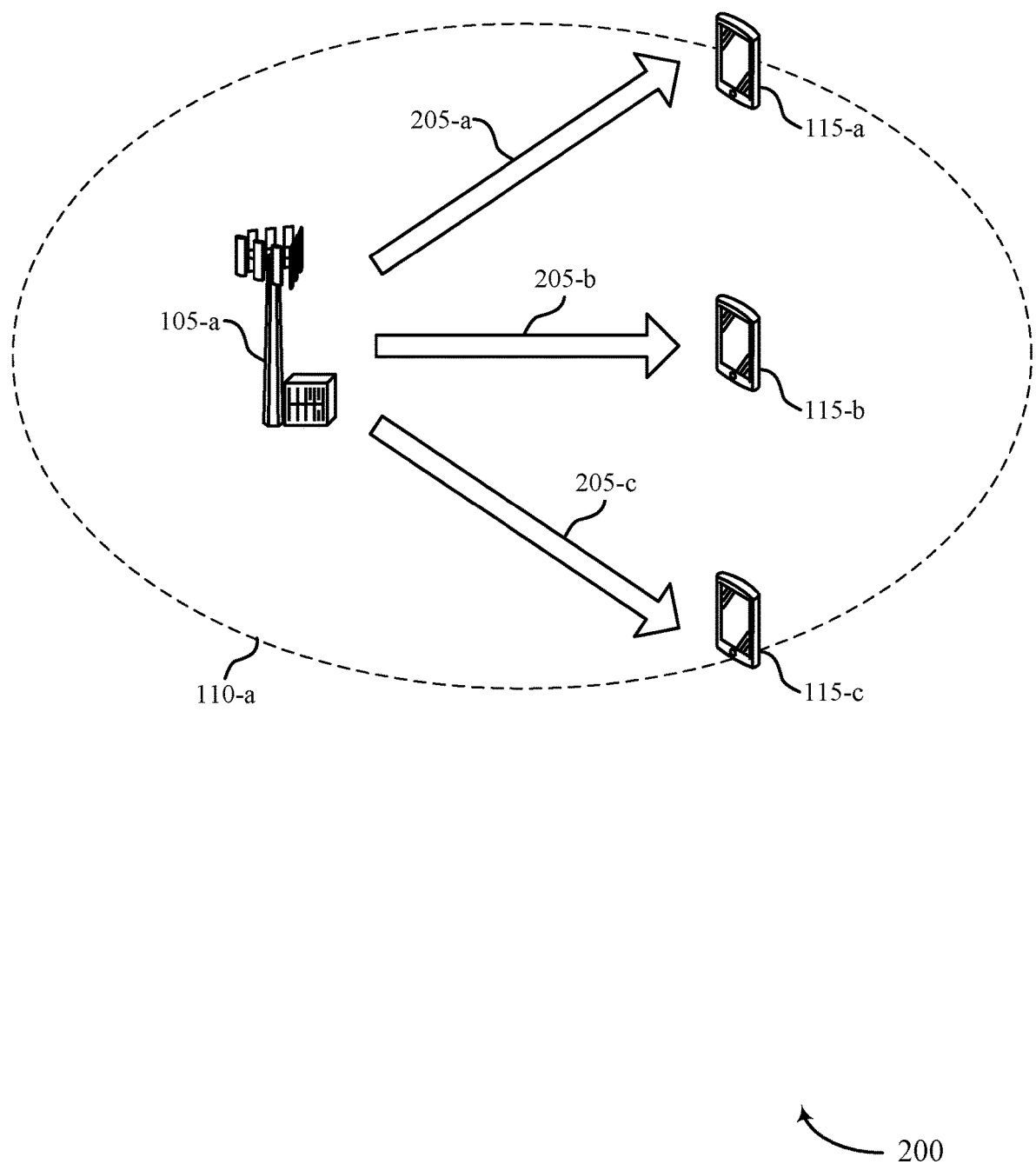
FIG. 2 illustrates an example of a wireless communications system that supports mixed mode multicast architecture in accordance with aspects of the present disclosure.

FIG. 2 illustrates an example of a wireless communications system 200 that supports mixed mode multicast architecture in accordance with aspects of the present disclosure. In some examples, wireless communications system 200 may implement aspects of wireless communications system 100. Wireless communications system 200 may include a base station 105-*a*, a UE 115-*a*, a UE 115-*b*, and a UE 115-*c*, which may be examples of corresponding base stations 105 and UEs 115, respectively, as described above with reference to FIG. 1. UEs 115-*a*, 115-*b*, and 115-*c* may be in a coverage area 110-*a* associated with base station 105-*a*.

As described herein, base station 105-*a* may support multicast communications with UEs 115-*a*, 115-*b*, and 115-*c* simultaneously, where UEs 115-*a*, 115-*b*, and 115-*c* may be in a connected state (e.g., RRC_Connected) with base station 105-*a* for receiving the multicast communications. In some cases, the multicast communications may enable a mixed mode of multicast and unicast transmissions specifically to UEs 115-*a*, 115-*b*, and 115-*c*. Although not shown, additional UEs 115 may be located within coverage area 110-*a* for base station 105-*a*, but base station 105-*a* may refrain from transmitting the multicast communications to these additional UEs 115. Accordingly, base station 105-*a* may transmit a same message to each of UEs 115-*a*, 115-*b*, and 115-*c* via a shared radio bearer 205 (e.g., multicast), where the shared radio bearer 205 is configured for UEs 115-*a*, 115-*b*, and 115-*c* together (e.g., radio bearers 205-*a*, 205-*b*, and 205-*c* are a same radio bearer). Accordingly, the shared radio bearer 205 may be defined as an MRB.

Alternatively, base station 105-*a* may transmit the same message to each of UEs 115-*a*, 115-*b*, and 115-*c* via separate radio bearers 205 (e.g., unicast), where each radio bearer 205 is configured separately for each of UEs 115-*a*, 115-*b*, and 115-*c* (e.g., radio bearers 205-*a*, 205-*b*, and 205-*c* are separate radio bearers). As such, these separate radio bearers may be defined as DRBs. The DRBs may include the same multicast information or may include specific, unicast information for respective UEs 115. In some cases, base station 105-*a* may dynamically decide a delivery method (e.g., MRB or DRBs) for transmitting the multicast data to UEs 115-*a*, 115-*b*, and 115-*c* based on factors of wireless communications system 200. For example, the factors may include a number of UEs 115 receiving the multicast data, a location of the corresponding UEs 115, etc. Accordingly, after determining the delivery method, base station 105-*a* may configure the respective UEs 115 (e.g., UEs 115-*a*, 115-*b*, and 115-*c*) with the corresponding delivery method through higher layer signaling (e.g., RRC dedicated signaling). Additionally, base station 105-*a* may change the delivery method on a per UE basis. For example, if base station 105-*a* determines unicast transmissions are more efficient for UE 115-*b* (e.g., due to a mobility of UE 115-*b*), base station 105-*a* may configure UE 115-*b* with a DRB, while configuring UEs 115-*a* and 115-*c* with an MRB. In such cases, base station 105-*a* may deliver unicast and multicast traffic (e.g., over DRBs and the MRB) in a same logical protocol data unit (PDU) session to the respective UEs 115. Accordingly, in some cases, a core network may add or remove sources for the multicast traffic to or from an existing PDU session.

Additionally, a group key may be created per multicast source (e.g., a group key per Multicast Distribution Information) to protect multicast data transmitted in wireless communications system 200. In some cases, a management entity may create the group key or a master group key for the system for a multicast source. Additionally or alternatively, a RAN may derive and distribute the group key. In some cases, the RAN may derive the group key using a master group key provided by a management entity. Accordingly, base station 105-*a* may cipher any multicast traffic transmitted on the MRB using the created group key. Alternatively, traffic unicasted over a DRB may not be ciphered via the created group key. In some cases, the unicast and multicast architecture as described above may be applied in a cellular network while transporting IP and Ethernet traffic. Additionally or alternatively, different functions included in network architecture may support the multicast and unicast traffic as described herein. For example, a UPF, an access and mobility management function (AMF) (e.g., or a general management function), a session management function (SMF), and a multicast UPF (MC-UPF) may be included in supporting the multicast architecture. While an AMF and an SMF are described with aspect to the present disclosure, additional management entities or management functions may be used in the multicast architecture.

Figure 3A:
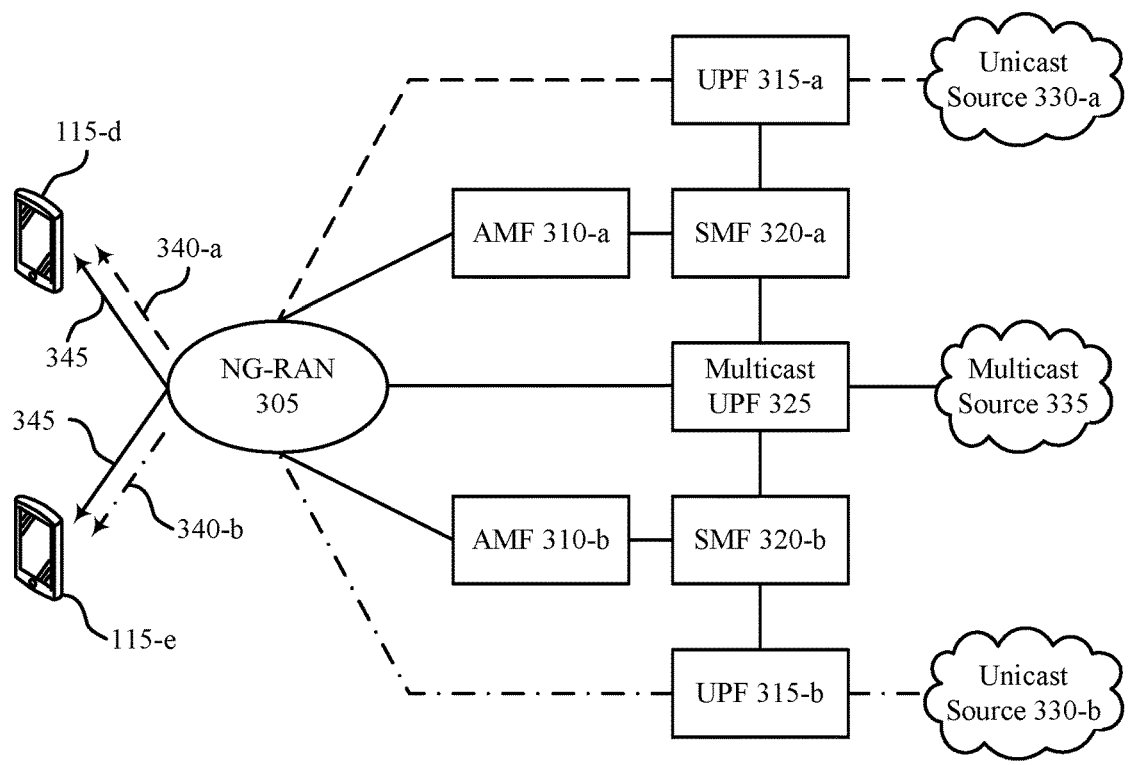
FIGS. 3A and 3B illustrate examples of network architecture that support mixed mode multicast architecture in accordance with aspects of the present disclosure.
Figure 3B:
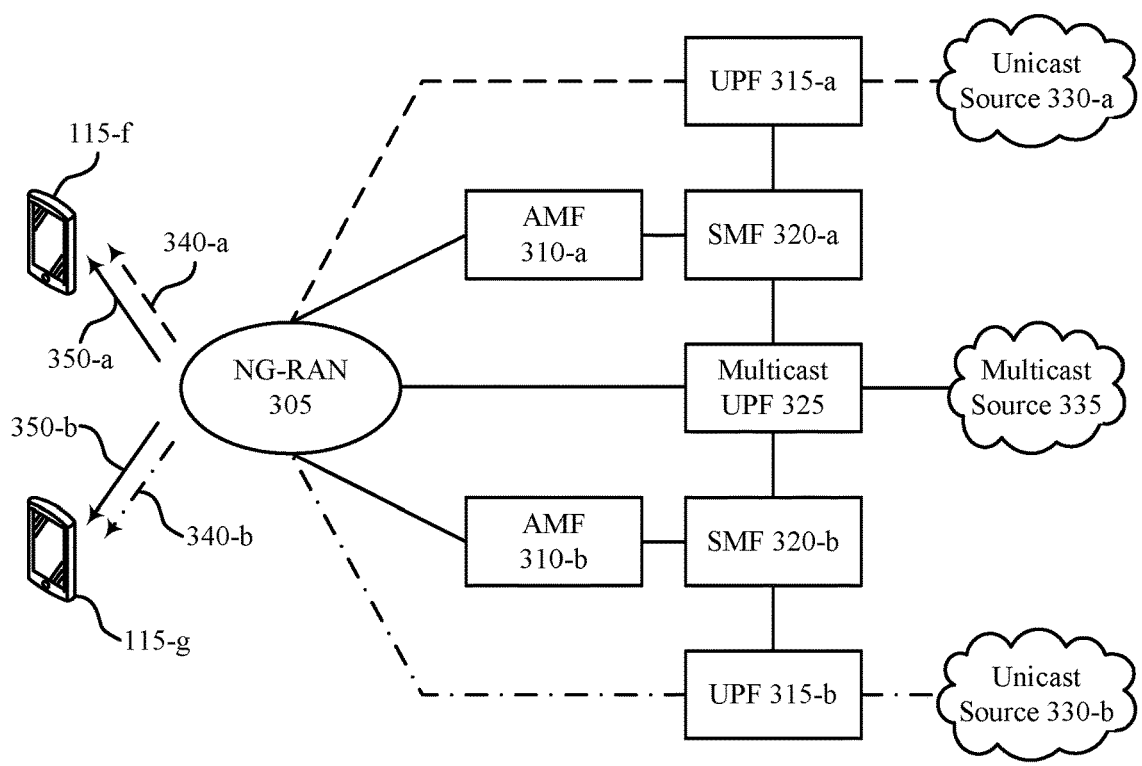

FIGS. 3A and 3B illustrate examples of network architectures 300 and 301 that support mixed mode multicast architecture in accordance with aspects of the present disclosure. In some examples, network architectures 300 and 301 may implement aspects of wireless communications systems 100 and/or 200. Network architectures 300 and 301 may include multiple UEs 115, a next generation RAN (NG-RAN) 305 (e.g., a base station 105), one or more AMFs 310, one or more UPFs 315, one or more SMFs 320, an MC-UPF 325, one or more unicast sources 330, and a multicast source 335. In some cases, network architectures 300 and 301 may provide different delivery methods for multicast and/or unicast traffic. The UEs 115 may receive unicast transmissions from NG-RAN 305 over radio bearers 340, where the unicast transmissions originate at a unicast source 330 and are routed through a UPF 315 before being transmitted from NG-RAN 305 to a corresponding UE 115. The unicast transmissions may include specific data for the corresponding UEs 115.

Initially, an SMF 320 may identify that a UE 115 is to join a multicast source for receiving multicast traffic. For example, SMF 320-*a* may identify that UE 115-*d* or UE 115-*f*, respectively for network architectures 300 and 301, and SMF 320-*b* may identify that UE 115-*e* or UE 115-*g*, respectively for network architectures 300 and 301, are to join multicast source 335. The SMF 320 may receive multicast source information from the respective UEs 115 or may locally derive the multicast information. Accordingly, the SMF 320 may select MC-UPF 325 to provide the multicast data to the corresponding UEs 115. When selecting MC-UPF 325, each SMF 320 may take a single network slice selection assistance information (S-NSSAI), a data network name (DNN) of a related PDU session for the UE 115 (e.g., a unicast PDU session for the UE 115), and the multicast source information into account. The SMF 320 may then pass the S-NSSAI, DNN, and multicast source information to MC-UPF 325 and may request that MC-UPF 325 prepare multicast data identified by the multicast source information. In some cases, the multicast source information may include information for IP traffic (e.g., an IP version 6 (IPv6) or IP version 4 (IPv4) multicast address or an IPv6/IPv4 source address).

Subsequently, MC-UPF 325 may join multicast source 335 identified by the multicast source information and provide multicast data from multicast source 335 to NG-RAN 305. In some cases, MC-UPF 325 may be co-located with NG-RAN 305. Additionally, MC-UPF 325 may send the multicast data to NG-RAN 305 via a tunnel, where the tunnel may be shared by all UEs 115 served by NG-RAN 305 and MC-UPF 325 and who receive multicast data from multicast source 335 (i.e., a single copy of multicast data is sent from a given MC-UPF 325 to a given NG-RAN 305). Accordingly, a shared tunnel (e.g., using a shared tunnel endpoint identifier (TEID)) may be used per multicast source 335 per MC-UPF 325 per cell. Additionally, in some cases, one MC-UPF 325 may serve multiple NG-RANs 305 (e.g., based on a 1:N relationship) per multicast source 335 (e.g., per IPv6 multicast group and source address). In some cases, the tunnel may also support different types of multicast payload (e.g., IPv4/IPv6 packets). IP packets conveying the multicast data in the tunnel may be delivered using an IP multicast.

MC-UPF 325 may assign an information designation (e.g., Multicast Distribution Information) for the multicast source information received from the SMF 320 and provide the designation to the SMF 320, where the designation includes a TEID, a multicast distribution address, and a multicast source address. Additionally, MC-UPF 325 may provide charging and lawful interception (LI) information to the SMF 320 for each UE 115 (e.g., per UE charging and LI information). The SMF 320 may then transmit the information designation, a related PDU session identifier (ID) for the corresponding UE 115, quality of service (QoS) information for the multicast data identified in the information designation, and a session management (SM) container (e.g., N1 SM container and N2 SM information) to an AMF 310. The AMF 310 may then forward the received data from the SMF 320 to NG-RAN 305. Subsequently, NG-RAN 305 may then join multicast source 335 identified in the information designation received from the AMF 310 (unless NG-RAN 305 has already joined multicast source 335) and may provide the SM container to the corresponding UE 115. Consequently, NG-RAN 305 may then start delivering the multicast data to the corresponding UE 115 either using dedicated or shared radio resources and configures the UE 115 accordingly. NG-RAN may decide whether to use dedicated or shared radio resources based on various parameters (e.g., number of receiving UEs 115, radio quality levels for the receiving UEs 115, location of the receiving UEs 115, etc.).

For example, as shown in network architecture 300, NG-RAN 305 may determine to deliver the multicast data identified by the information designation to UEs 115-*d* and 115-*e* via an MRB 345 (e.g., radio bearer shared by multiple UEs 115). Accordingly, NG-RAN 305 may create a multicast radio network temporary identifier (M-RNTI), which identifies multicast source 335 in NG-RAN 305. NG-RAN 305 may then provide a tuple (e.g., a sequence of elements) to UEs 115-*d* and 115-*e* in dedicated signaling (e.g., RRC signaling), where the tuple includes at least a PDU session ID and the M-RNTI. UEs 115-*d* and 115-*e* may utilize the tuple to determine the PDU session ID to which multicast source 335 identified by the M-RNTI belongs. Subsequently, NG-RAN 305 may start delivering the multicast data via MRB 345 identified by the M-RNTI, and UEs 115-*d* and 115-*e* may receive the multicast data via MRB 345 identified by the M-RNTI and may deliver data associated with the received multicast data within the PDU session identified by the PDU session ID.

Additionally or alternatively, as shown in network architecture 301, NG-RAN 305 may determine to deliver the multicast data identified by the information designation to UEs 115-*f* and 115-*g* via DRBs 350-*a* and 350-*b*, respectively (e.g., a radio bearer for a single UE 115). Accordingly, NG-RAN 305 either may select one of already established DRBs (e.g., radio bearers 340-*a* and 340-*b*) or may establish an additional DRB 350, where the choice may be based on the QoS information for the multicast data received from the SMF 320. NG-RAN 305 may then configure UEs 115-*f* and 115-*g* accordingly using dedicated signaling (e.g., RRC signaling). Subsequently, NG-RAN 305 may deliver a copy of the multicast data to each UE 115-*f* and UE 115-*g* using the identified DRB 350-*a* and DRB 350-*b*, respectively.

In some cases, NG-RAN 305 may dynamically switch between using MRB 345 and DRBs 350 (e.g., switching between multicast and unicast data delivery). As such, NG-RAN 305 may change a deliver method from unicast to multicast (e.g., DRB to MRB) and vice versa (e.g., MRB to DRB) at any time (e.g., during an inter-RAN mobility mode).

Additionally, when sending data via MRB 345, ciphering may be employed to protect integrity of the multicast data (e.g., from a same multicast source 335 on a RAN node, such as NG-RAN 305). For example, the SMF 320 may request a group key when multicast data is added to a PDU session for a corresponding UE 115 from a multicast authentication server function (AUSF)/authentication credential repository and processing function (ARPF), where the multicast AUSF/ARPF may be hosted in a visited network for the UE 115 and NG-RAN 305 (e.g., visited public land mobile network (VPLMN)). Consequently, the multicast AUSF/ARPF may derive the group key taking the information designation that the SMF 320 maintains. The multicast AUSF/ARPF may then later update the group key by notifying the SMF 320. Accordingly, the SMF 320 may send the group key to NG-RAN 305 via the AMF 310 in signaling associated with the corresponding UE 115 (e.g., UE-associated N2 messaging), where the group key is sent per UE 115 assuming that NG-RAN 305 receives a same key for different UEs 115 receiving the same content. The AMF 310 may then cipher a non-access stratum (NAS) message carrying the group key and transmit the ciphered NAS signaling to the corresponding UE 115. As such, NG-RAN 305 may cipher multicast data transmitted to a corresponding UE 115 over MRB 345 according to the group key. Additionally or alternatively, NG-RAN 305 may derive and distribute a security key specific to NG-RAN 305 for the multicast source 335.

Figure 4:
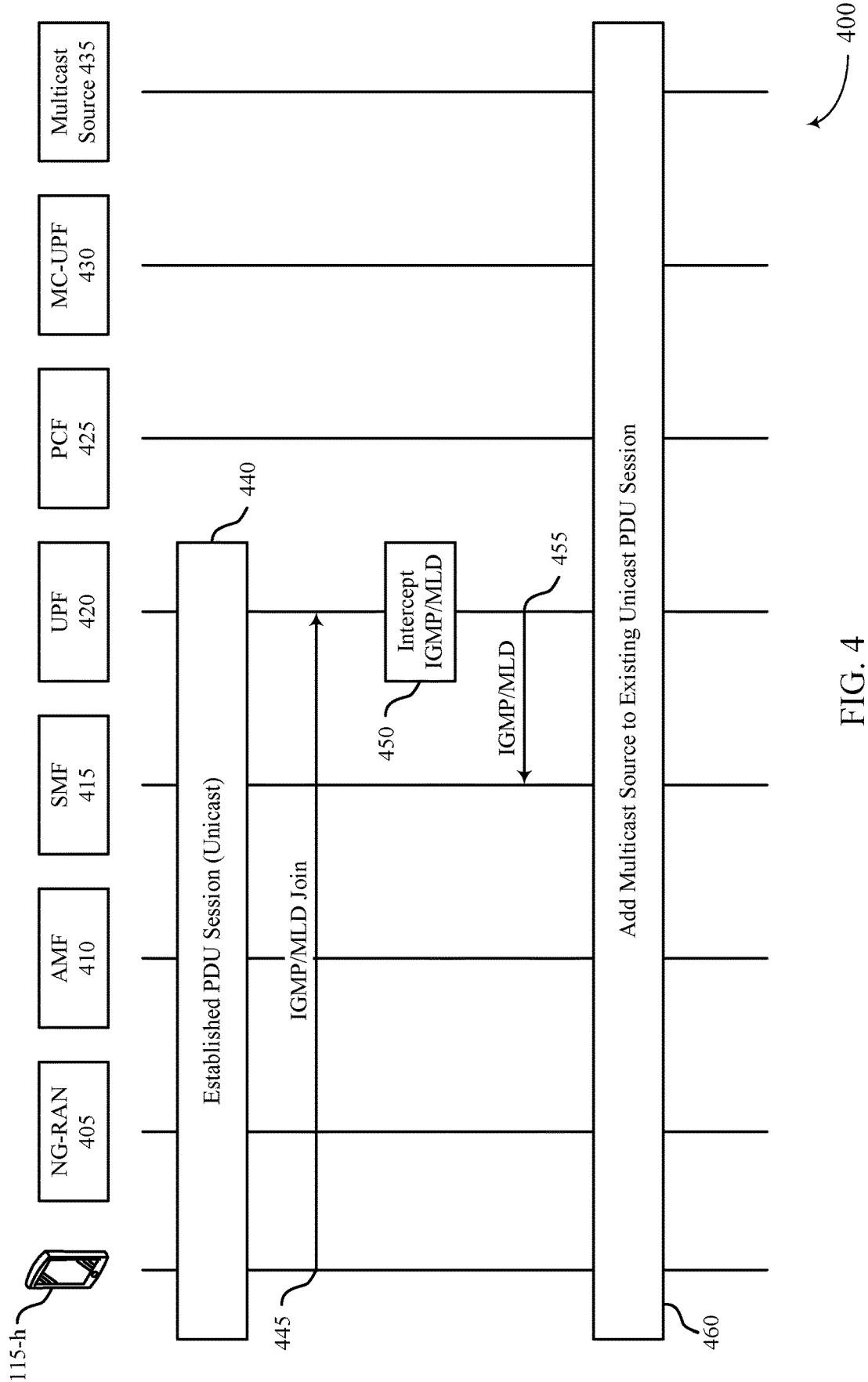
FIGS. 4, 5, and 6 illustrate examples of process flows that support mixed mode multicast architecture in accordance with aspects of the present disclosure.

FIG. 4 illustrates an example of a process flow 400 that supports mixed mode multicast architecture in accordance with aspects of the present disclosure. In some examples, process flow 400 may implement aspects of wireless communications systems 100 and/or 200. Process flow 400 may include a UE 115-*h*, an NG-RAN 405, an AMF 410, an SMF 415, a UPF 420, a policy control function (PCF) 425, an MC-UPF 430, and a multicast source 435, which may be examples of corresponding devices as described above with reference to FIGS. 1-3. Process flow 400 may include a process for UE 115-*h* to join multicast source 435 (e.g., an IP multicast source). Additionally, while the AMF 410 and the SMF 415 are shown in process flow 400, it is understood that the AMF 410 and the SMF 415 may be examples of other management entities that include separate management functions for enabling the mixed mode multicast architecture as described herein.

At 440, UE 115-*h* may establish a PDU session. For example, UE 115-*h* may transmit a PDU session establishment request, which may include an S-NSSAI, DNN, and additional information. Accordingly, SMF 415 may establish a unicast PDU session. Additionally, SMF 415 may configure UPF 420, which handles the PDU session for UE 115-*h*, to match on Internet group management protocol (IGMP) and multicast listener discovery (MLD) messages transmitted by UE 115-*h* during the PDU session and forward the messages to SMF 415.

At 445, UE 115-*h* may send an IGMP and/or MLD message to join multicast source 435 (e.g., an IPv4 or IPv6 multicast source). In some cases, the IGMP and/or MLD messages may include an identification or address for multicast source 435. Additionally, UE 115-*h* may send the message(s) in-band.

At 450, as configured by SMF 415, UPF 420 may intercept the IGMP/MLD message(s). Accordingly, at 455, UPF 420 may then forward the IGMP/MLD message(s) to SMF 415.

At 460, SMF 415 may derive the multicast source information for UE 115-*h* from the IGMP/MLD message(s). Consequently, SMF 415 may then add multicast source 435 identified by the multicast source information for UE 115-*h* to the PDU session via which the IGMP/MLD message(s) were received.

Figure 5:
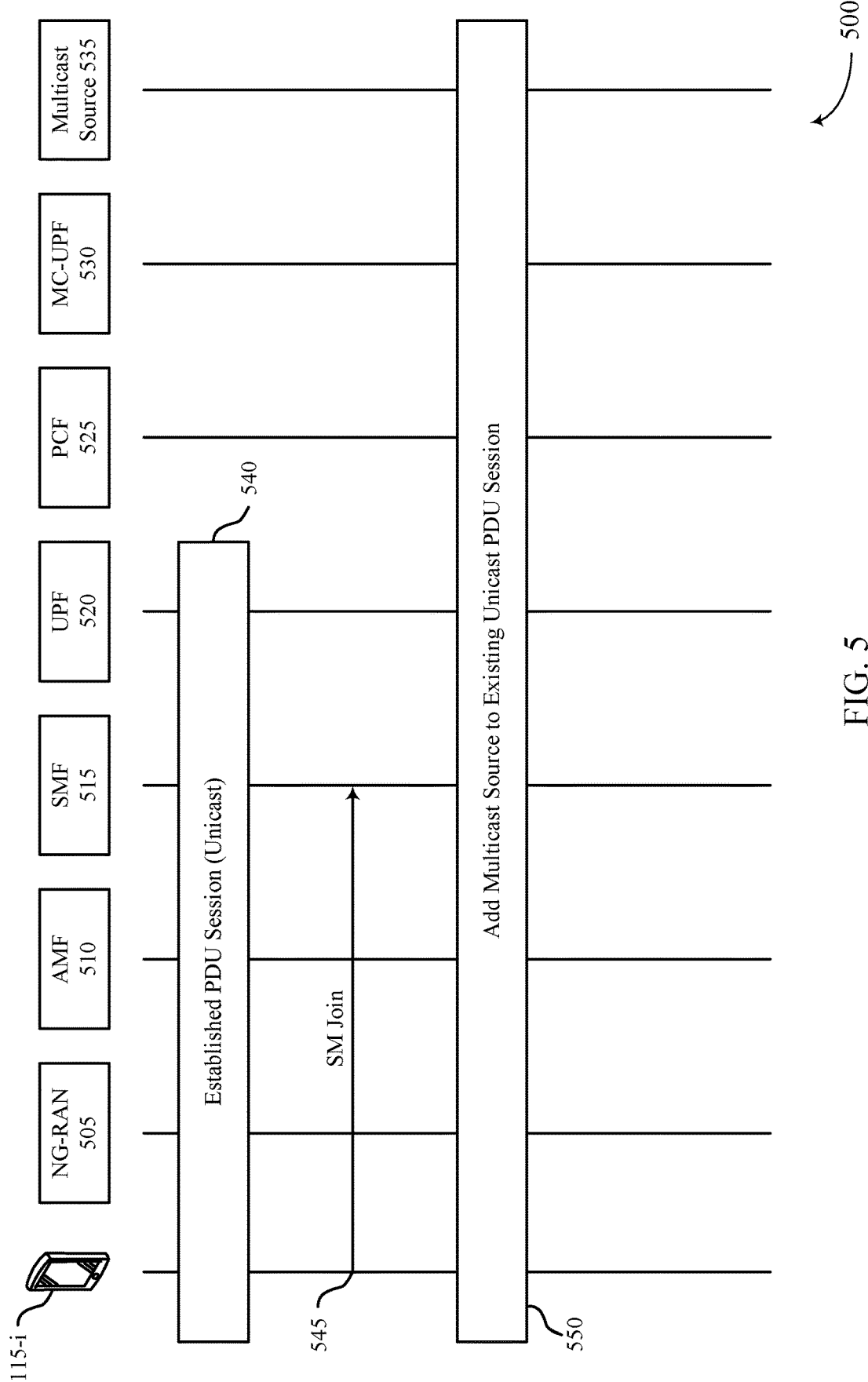

FIG. 5 illustrates an example of a process flow 500 that supports mixed mode multicast architecture in accordance with aspects of the present disclosure. In some examples, process flow 500 may implement aspects of wireless communications systems 100 and/or 200. Process flow 500 may include a UE 115-*i*, an NG-RAN 505, an AMF 510, an SMF 515, a UPF 520, a PCF 525, an MC-UPF 530, and a multicast source 535, which may be examples of corresponding devices and functions as described above with reference to FIGS. 1-4. Process flow 500 may include a process for UE 115-*i* to join multicast source 535 (e.g., an IP multicast source). Additionally, while the AMF 510 and the SMF 515 are shown in process flow 500, it is understood that the AMF 510 and the SMF 515 may be examples of other management entities that include separate management functions for enabling the mixed mode multicast architecture as described herein.

At 540 (e.g., similar to 440 as described above with reference to FIG. 4), UE 115-*i* may establish a PDU session, where establishing the PDU session may include transmitting a PDU session establishment request, an S-NSSAI, DNN, UE multicast source information, and additional information. Accordingly, SMF 515 may establish a unicast PDU session, and at 550, may add multicast source 535 identified by the UE multicast source information to the newly established PDU session. Alternatively, at 540, UE 115-*i* may establish a PDU session, and then after establishing the PDU session, UE 115-*i* may add a multicast source at 545.

At 545, UE 115-*i* may send a non-access stratum session management (NAS-SM) message (e.g., a PDU session modification request), which includes a PDU session ID, multicast source information for UE 115-*i* (e.g., an address for multicast source 535), and an indication that UE 115-*i* wants to add multicast source 535.

Accordingly, at 550, SMF 515 may add multicast source 535 identified by the multicast source information for UE 115-*i* to the PDU session identified by the PDU session ID.

Figure 6:
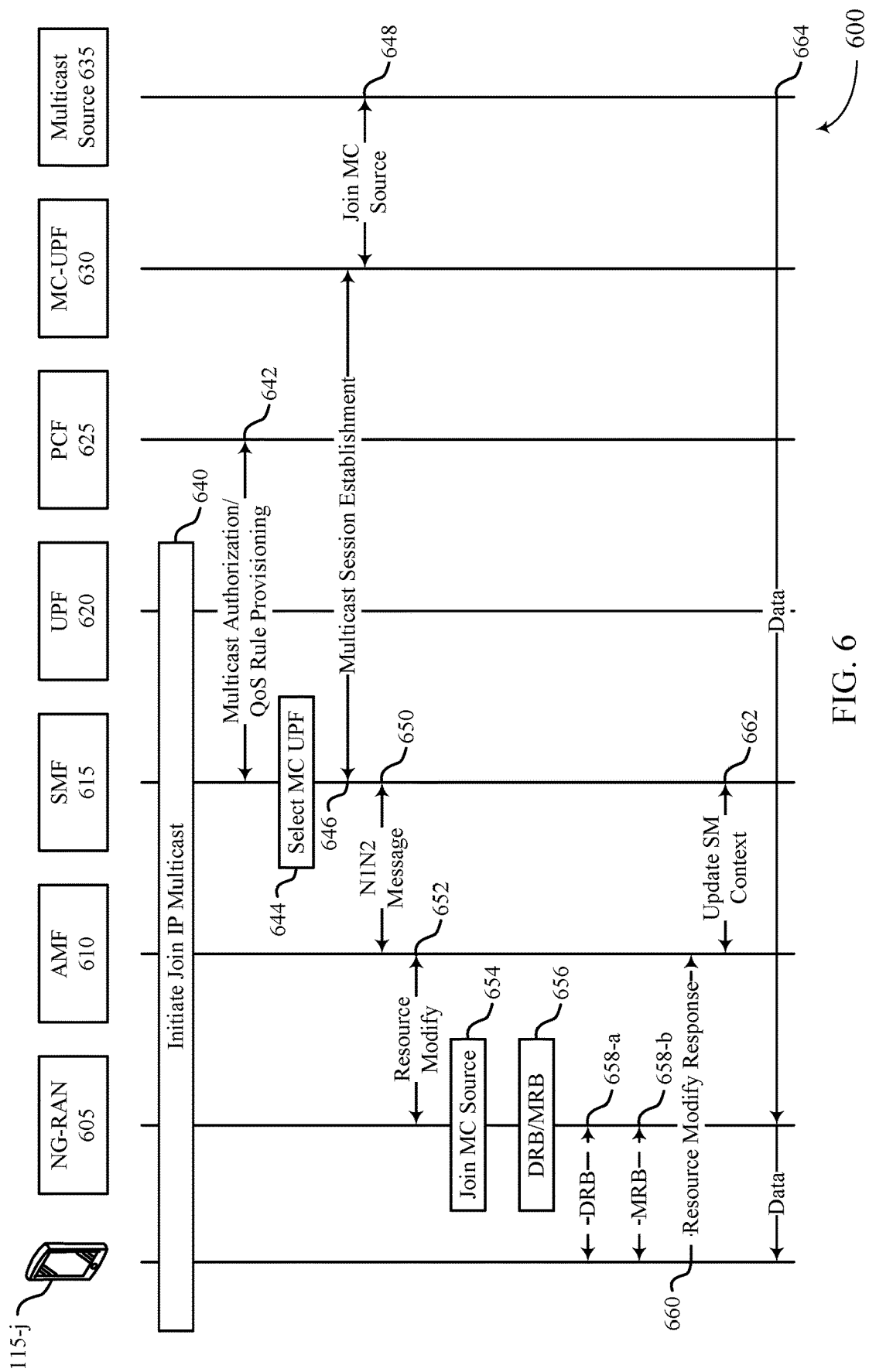

FIG. 6 illustrates an example of a process flow 600 that supports mixed mode multicast architecture in accordance with aspects of the present disclosure. In some examples, process flow 600 may implement aspects of wireless communications systems 100 and/or 200. Process flow 600 may include a UE 115-*j*, an NG-RAN 605, an AMF 610, an SMF 615, a UPF 620, a PCF 625, an MC-UPF 630, and a multicast source 635, which may be examples of corresponding devices and functions as described above with reference to FIGS. 1-5. Process flow 600 may include a process for UE 115-*j* to join multicast source 635 (e.g., an IP multicast source). Additionally, while the AMF 610 and the SMF 615 are shown in process flow 600, it is understood that the AMF 610 and the SMF 615 may be examples of other management entities that include separate management functions for enabling the mixed mode multicast architecture as described herein.

At 640, UE 115-*j* may initiate a procedure to join multicast source 635 as described above with reference to FIGS. 4 and 5. Accordingly, SMF 615 may add multicast source 635 as a result of the initiated procedure at 640.

At 642, SMF 615 and PCF 625 may exchange multicast authentication and QoS rule provisioning.

At 644, SMF 615 may select MC-UPF 630 as described above with reference to FIGS. 3A and 3B. In some cases, the selection of MC-UPF 630 may be based on location (e.g., a base station 105 or NG-RAN 605 ID), a data network for the existing PDU session, and multicast source information for UE 115-*j*.

At 646, SMF 615 and MC-UPF 630 may establish a multicast session. In some cases, establishing the multicast session may include SMF 615 transmitting the multicast source information (e.g., IPv4/IPv6 multicast address and IPv4/IPv6 source address for multicast source 635) and multicast distribution information (e.g., common TEID, IP multicast distribution address, and IP multicast source address).

At 648, MC-UPF 630 may join multicast source 635. In some cases, aspects of the joining may be up to UPF implementation (e.g., multicast UPF may perform IP IGMP/MLD join similar to the IGMP/MLD join described above with reference to FIG. 4).

At 650, SMF 615 may transfer messages (e.g., N1N2MessageTransfer) to indicate QoS flow IDs (QFIs), QoS profile(s), the multicast distribution information, and an SM container (e.g., N1 SM container and N2 SM information) to AMF 610.

At 652, AMF 610 may transfer the messages received from SMF 615 at 620 (e.g., QoS profile(s), the multicast distribution information, and an SM container) to NG-RAN 605. In some cases, this transfer of messages may be indicated in a PDU session resource modification message.

At 654, NG-RAN 605 may join multicast source 635 identified by the multicast distribution information received at 652 from AMF 610.

At 656, NG-RAN 605 may determine whether to use DRBs or an MRB to deliver multicast data to UE 115-*j*. The determination may include aspects as described above with reference to FIGS. 3A and 3B. For example, NG-RAN 605 may identify UEs 115 (e.g., a number of receiving UEs 115) receiving the same multicast data based on the multicast distribution information in contexts of the UEs 115 and base its determination to use DRBs or an MRB on the identified UEs 115.

At 658-*a*, NG-RAN 605 may transmit a configuration message (e.g., RRC Connection Reconfiguration) to indicate multicast data is transmitted over DRBs.

Additionally or alternatively, at 658-*b*, NG-RAN may transmit a configuration message to indicate multicast data is transmitted over the MRB, where the configuration includes an M-RNTI, which may indicate the PDU session ID. For example, NG-RAN 605 may assign the M-RNTI per multicast source, and a mapping between the M-RNTI and the PDU session ID may enable UE 115-*j* to identify the PDU session that the multicast data belongs to.

At 660, UE 115-*j* may transmit a PDU session resource modify response message to AMF 610.

At 662, AMF 610 may update a context of the SM for the PDU session based on response message received at 660 and forward the updated SM context to SMF 615.

At 664, NG-RAN may receive multicast data from multicast source 635 and transmit the multicast data to UE 115-*j* via either the determined DRBs and/or MRB from 656.

Figure 7:
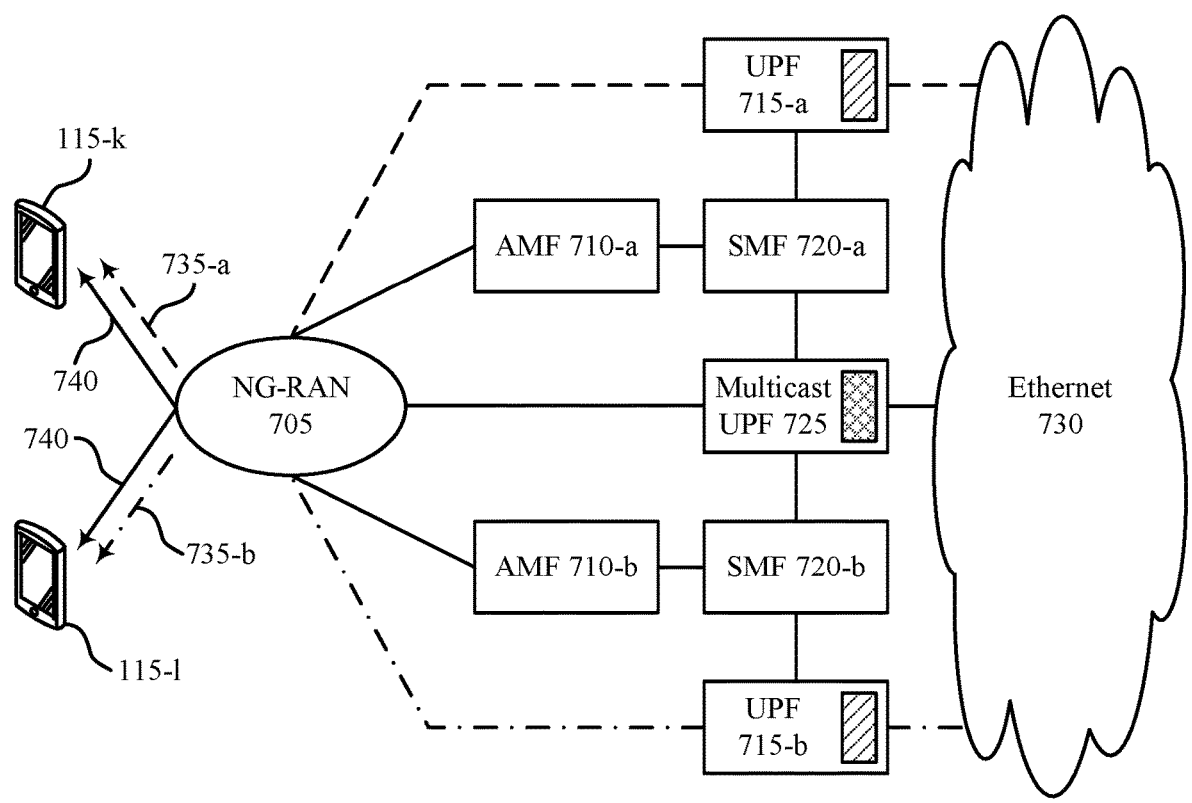
FIG. 7 illustrates an example of an Ethernet architecture that supports mixed mode multicast architecture in accordance with aspects of the present disclosure.

FIG. 7 illustrates an example of an Ethernet architecture 700 that supports mixed mode multicast architecture in accordance with aspects of the present disclosure. In some examples, Ethernet architecture 700 may implement aspects of wireless communications systems 100 and/or 200. Ethernet architecture 700 may follow a similar architecture as described for network architecture 300 and 301 as described above with reference to FIGS. 3A and 3B, respectively. For example, an NG-RAN 705 may provide multicast data to UEs 115-*k* and 115-1 over an MRB 740 or DRBs (not shown).

As opposed to the network architecture described above, Ethernet architecture 700 may include shared tunnel data from MC-UPF 725 to NG-RAN 705 for Ethernet frames rather than IP packets. Rather than receiving multicast source information from a corresponding UE 115, an SMF 720 (e.g., or an additional management entity) may derive the multicast source information locally for the PDU session for Ethernet for the UE 115.

Additionally, Ethernet architecture 700 may include determining multicast source information specific to Ethernet for the corresponding UEs 115. In some cases, the multicast source information may include an Ethernet Broadcast Traffic Indication. Accordingly, the Ethernet Broadcast Traffic Indication may indicate to a UPF 715 that Ethernet broadcast frames may be delivered as multicast data to the corresponding UEs 115. Additionally or alternatively, an SMF 720 may request the UPF 715 serving a unicast PDU session (e.g., data bearers 735) to block downlink Ethernet broadcast frames in case the multicast data identified by the multicast source information includes an Ethernet type. As such, broadcast frames from the Ethernet may be allowed over through MC-UPF 725 and may be blocked by UPFs 715-*a* and 715-*b*.

Figure 8:
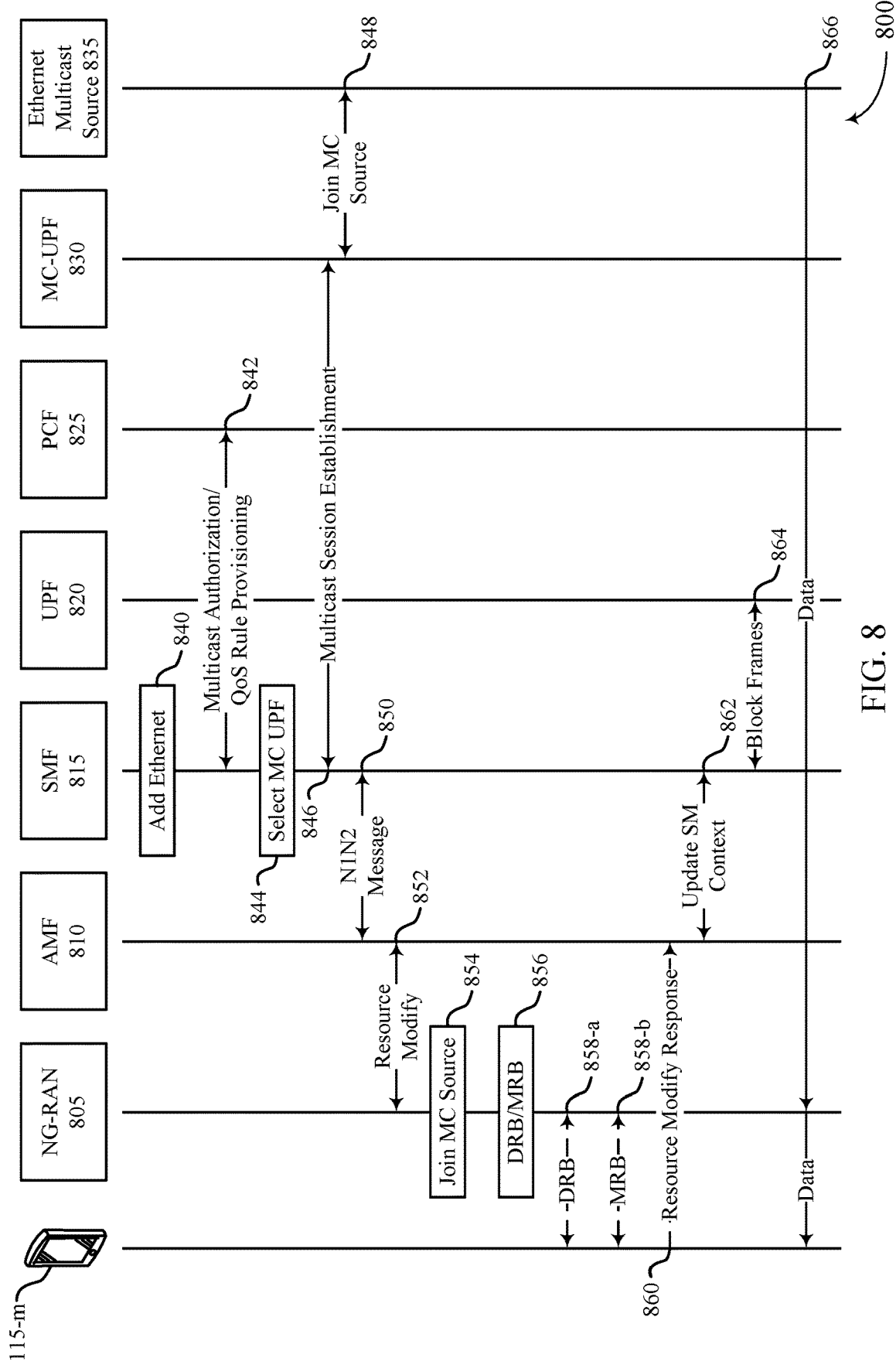
FIG. 8 illustrates an example of a process flow that supports mixed mode multicast architecture in accordance with aspects of the present disclosure.

FIG. 8 illustrates an example of a process flow 800 that supports mixed mode multicast architecture in accordance with aspects of the present disclosure. In some examples, process flow 800 may implement aspects of wireless communications systems 100 and/or 200. Process flow 800 may include a UE 115-*m*, an NG-RAN 805, an AMF 810, an SMF 815, a UPF 820, a PCF 825, an MC-UPF 830, and an Ethernet multicast source 835, which may be examples of corresponding devices and functions as described above with reference to FIGS. 1-7. Process flow 800 may include a process for UE 115-*m* to join Ethernet multicast source 835. Additionally, while the AMF 810 and the SMF 815 are shown in process flow 800, it is understood that the AMF 810 and the SMF 815 may be examples of other management entities that include separate management functions for enabling the mixed mode multicast architecture as described herein.

Process flow 800 may include a similar procedure as described above with respect to process flow 600 in FIG. 6. However, at 840, based on local policy, SMF 815 may decide to add Ethernet broadcast frames as a multicast source (e.g., Ethernet multicast source 835). Until 864, a wireless communications system may follow similar steps as described in process flow 600 of FIG. 6, including determining whether to utilize DRBs or an MRB for transmitting the multicast data (e.g., Ethernet frames in this case). However, alternative to process flow 600, at 864, SMF 815 may indicate to UPF 820 to block Ethernet broadcast frames for unicast data transmissions intended for UE 115-*m*. Accordingly, at 866, NG-RAN 805 may receive multicast data from Ethernet multicast source 835 in the form of Ethernet broadcast frames and transmit the corresponding multicast data to UE 115-*m* over the DRBs and/or MRB (e.g., unicast or multicast).

Figure 9:
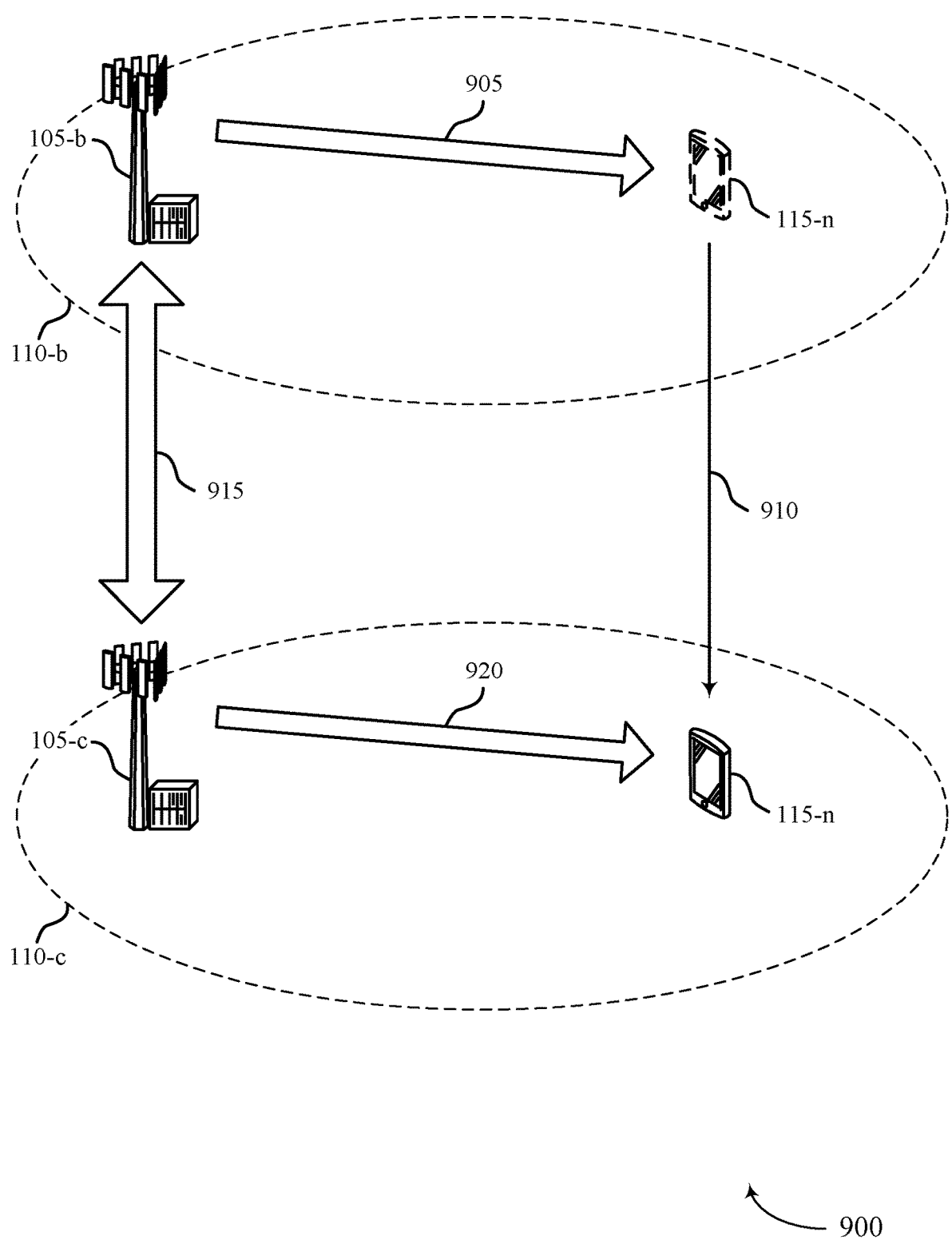
FIG. 9 illustrates an example of a wireless communications system that supports mixed mode multicast architecture in accordance with aspects of the present disclosure.

FIG. 9 illustrates an example of a wireless communications system 900 that supports mixed mode multicast architecture in accordance with aspects of the present disclosure. In some examples, wireless communications system 900 may implement aspects of wireless communications systems 100 and/or 200. Wireless communications system 900 may include a base station 105-*b*, a base station 105-*c*, and a UE 115-*n*, which may be examples of corresponding devices as described above with reference to FIGS. 1-8.

Initially, as described herein, base station 105-*b* may transmit multicast data over a carrier 905 (via an MRB or a DRB) to UE 115-*n* that is located within a coverage area 110-*b* for base station 105-*b*. However, in some cases, a handover from base station 105-*b* to base station 105-*c* may occur, where base station 105-*c* now transmits the multicast data to UE 115-*n*. For example, UE 115-*n* may move from coverage area 110-*b* to a coverage area 110-*c* corresponding to base station 105-*c* (e.g., movement 910). Accordingly, base station 105-*b* (e.g., a source RAN) may forward multicast distribution information for UE 115-*n* to base station 105-*c* (e.g., a target RAN) over a link 915 for a first type of mobility procedure (e.g., Xn-based inter NG-RAN handover). Additionally or alternatively, in some cases, base station 105-*b* may forward the multicast distribution information to base station 105-*c* via a core network (e.g., via backhaul link, N2 interface, etc.). As described above, the multicast distribution information may include an indication of a multicast source (e.g., IP multicast distribution and source address or Ethernet multicast distribution and source address) for UE 115-*n* and common TEIDs for transmitting the multicast data from an MC-UPF to the respective base station 105.

After receiving the multicast distribution information, base station 105-*c* may join the multicast source identified by the multicast distribution information. Subsequently, base station 105-*c* may then determine to send the multicast data over a carrier 920 to UE 115-*n* via DRB or MRB. For example, base station 105-*c* may utilize a same delivery method as base station 105-*b*, or base station 105-*c* may determine to utilize a different delivery method based on factors for base station 105-*c* different than base station 105-*b* (e.g., more or fewer receiving UEs 115 in coverage area 110-*c* than coverage area 110-*b*, location of receiving UEs 115 in coverage area 110-*c*, etc.). Once the delivery method is determined, base station 105-*c* may send a radio bearer configuration to UE 115-*n* (e.g., in RRCReconfiguration message) via base station 105-*b*. As such, base station 105-*c* may start receiving the multicast data directly from the multicast source (i.e., no multicast data forwarding between the two base stations 105). Additionally, base station 105-*b* may then leave the multicast source (unless other UEs 115 are receiving data from the same multicast source through base station 105-*b*). For any remaining UEs receiving multicast data from the multicast source at base station 105-*b*, base station 105-*b* may decide to change the delivery method at any time.

Figure 10A:
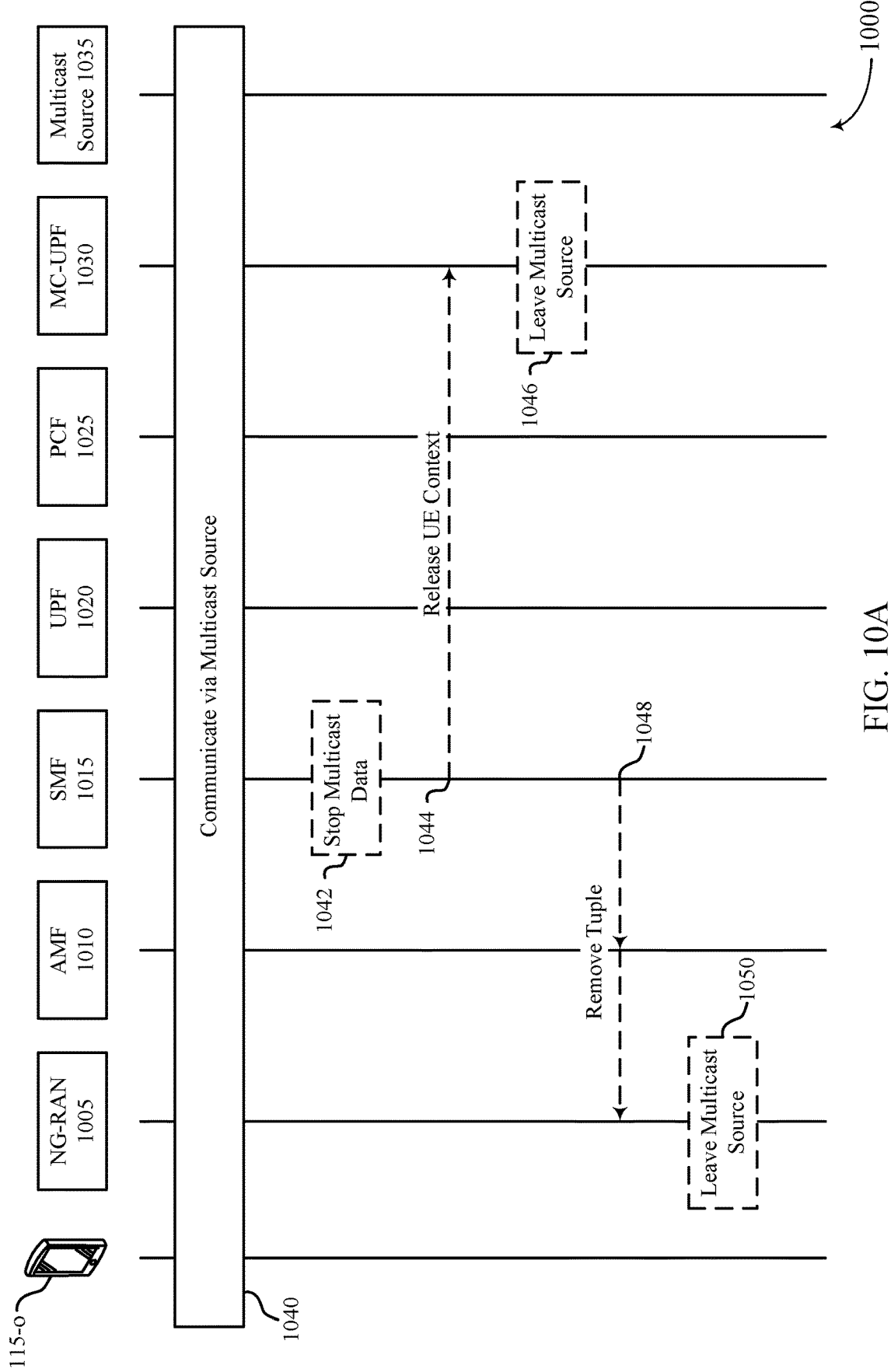
FIGS. 10A, 10B, 10C, and 11 illustrate examples of process flows that support mixed mode multicast architecture in accordance with aspects of the present disclosure.
Figure 10B:
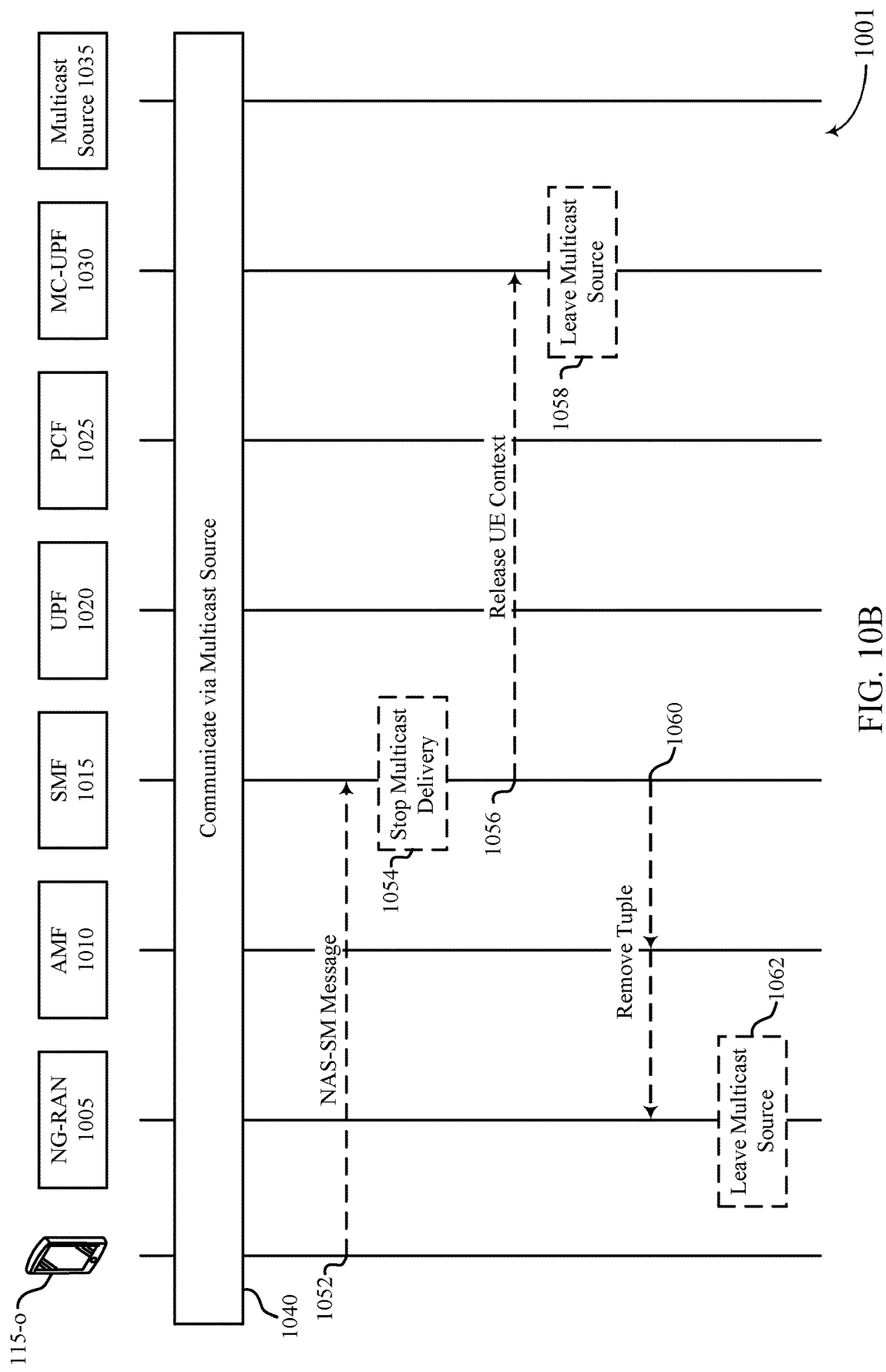
Figure 10C:
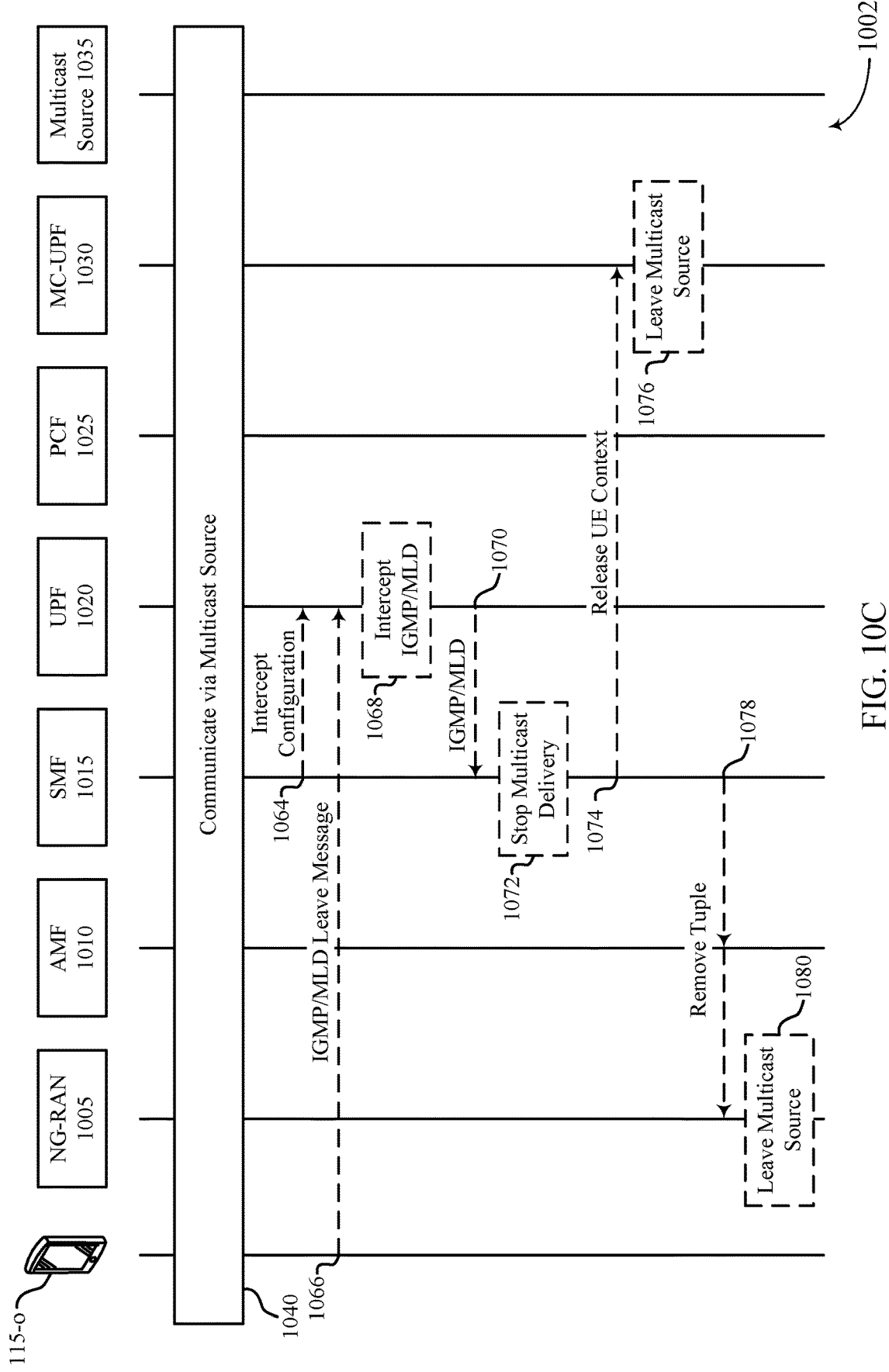

FIGS. 10A, 10B, and 10C illustrate examples of process flows 1000, 1001, and 1002, respectively that support mixed mode multicast architecture in accordance with aspects of the present disclosure. In some examples, process flows 1000, 1001, and 1002 may implement aspects of wireless communications systems 100, 200, and/or 900. Process flows 1000, 1001, and 1002 may include a UE 115-*o*, an NG-RAN 1005, an AMF 1010, an SMF 1015, a UPF 1020, a PCF 1025, an MC-UPF 1030, and a multicast source 1035, which may be examples of corresponding devices and functions as described above with reference to FIGS. 1-9. Process flows 1000, 1001, and 1002 may include a process for UE 115-*o* to leave multicast source 1035. Accordingly, additional signaling may occur to ensure the multicast data is no longer delivered for UE 115-*o*. Additionally, while the AMF 1010 and the SMF 1015 are shown in process flows 1000, 1001, and 1002, it is understood that the AMF 1010 and the SMF 1015 may be examples of other management entities that include separate management functions for enabling the mixed mode multicast architecture as described herein.

At 1040, UE 115-*o* and associated components (e.g., NG-RAN 1005, AMF 1010, SMF 1015, UPF 1020, PCF 1025, and MC-UPF 1030) may transmit and receive multicast data (e.g., IP and/or Ethernet data) via multicast source 1035 as described above with reference to FIGS. 2-8.

In some cases, as shown in process flow 1000, at 1042, SMF 1015 may locally decide to stop the multicast data delivery (e.g., Ethernet broadcast traffic delivery as multicast data). As such, at 1044, SMF 1015 may then request MC-UPF 1030 to release the context of UE 115-*o* for the multicast source information. Accordingly, at 1046, MC-UPF 1030 may leave the multicast source identified by the multicast source information (unless other UEs 115 are still receiving multicast data from multicast source 1035 from MC-UPF 1030). At 1048, SMF 1015 may then request AMF 1010, which in turn may request NG-RAN 1005 (e.g., a base station 105) to remove a tuple from the UE context, where the tuple includes a PDU session ID and the multicast source information for UE 115-*o*. Subsequently, at 1050, NG-RAN 1005 may then leave multicast source 1035 identified by the multicast source information (unless other UEs 115 served by NG-RAN 1005 are receiving multicast data from the same multicast source 1035).

Additionally or alternatively, as shown in process flow 1001, in order to leave multicast source 1035, UE 115-*o*, at 1052, may send a NAS-SM message (e.g., an explicit request to leave multicast source 1035) to SMF 1015, which includes the PDU session ID, multicast source information and an indication that UE 115-*o* wants to leave multicast source 1035. Accordingly, at 1054, SMF 1015 may stop delivery of multicast data identified by the multicast source information within the PDU session identified by the PDU session ID for UE 115-*o*. After SMF 1015 stops delivery of the multicast data, similar steps to process flow 1001 may then be performed. For example, at 1056, SMF 1015 may request MC-UPF 1030 to release the context of UE 115-*o* for the multicast source information. Accordingly, at 1058, MC-UPF 1030 may leave the multicast source identified by the multicast source information (unless other UEs 115 are still receiving multicast data from multicast source 1035 from MC-UPF 1030). At 1060, SMF 1015 may then request AMF 1010, which in turn may request NG-RAN 1005 (e.g., a base station 105) to remove a tuple from the UE context, where the tuple includes a PDU session ID and the multicast source information for UE 115-*o*. Subsequently, at 1062, NG-RAN 1005 may then leave multicast source 1035 identified by the multicast source information.

In some cases, as shown in process flow 1002, when UE 115-*o* is leaving multicast source 1035, SMF 1015, at 1064, may configure UPF 1020 handling the PDU session for UE 115-*o* to match on IGMP and MLD messages and to forward the messages to SMF 1015. As such, at 1066, when UE 115-*o* sends an IGMP or MLD message to leave multicast source 1035 (e.g., an IPv4 or IPv6 multicast source or Ethernet multicast source), UPF 1020, at 1068, may intercept the IGMP/MLD message. At 1070, UPF 1020 may then forward the IGMP/MLD message to SMF 1015. Accordingly, at 1072, SMF 1015 may then derive the multicast source information from the IGMP or MLD message and, accordingly, may stop delivery of multicast data identified by multicast source 1035 within the PDU session in which the IGMP or MLD message was received for UE 115-*o*. After SMF 1015 stops delivery of the multicast data, similar steps to process flows 1001 and 1002 may then be performed. For example, at 1074, SMF 1015 may request MC-UPF 1030 to release the context of UE 115-*o* for the multicast source information. Accordingly, at 1076, MC-UPF 1030 may leave the multicast source identified by the multicast source information (unless other UEs 115 are still receiving multicast data from multicast source 1035 from MC-UPF 1030). At 1078, SMF 1015 may then request AMF 1010, which in turn may request NG-RAN 1005 (e.g., a base station 105) to remove a tuple from the UE context, where the tuple includes a PDU session ID and the multicast source information for UE 115-*o*. Subsequently, at 1080, NG-RAN 1005 may then leave multicast source 1035 identified by the multicast source information. Once delivery of the multicast data is stopped, a target NG-RAN may then connect to multicast source 1035, receive the multicast data, and forward the multicast data to UE 115-*o*.

Figure 11:
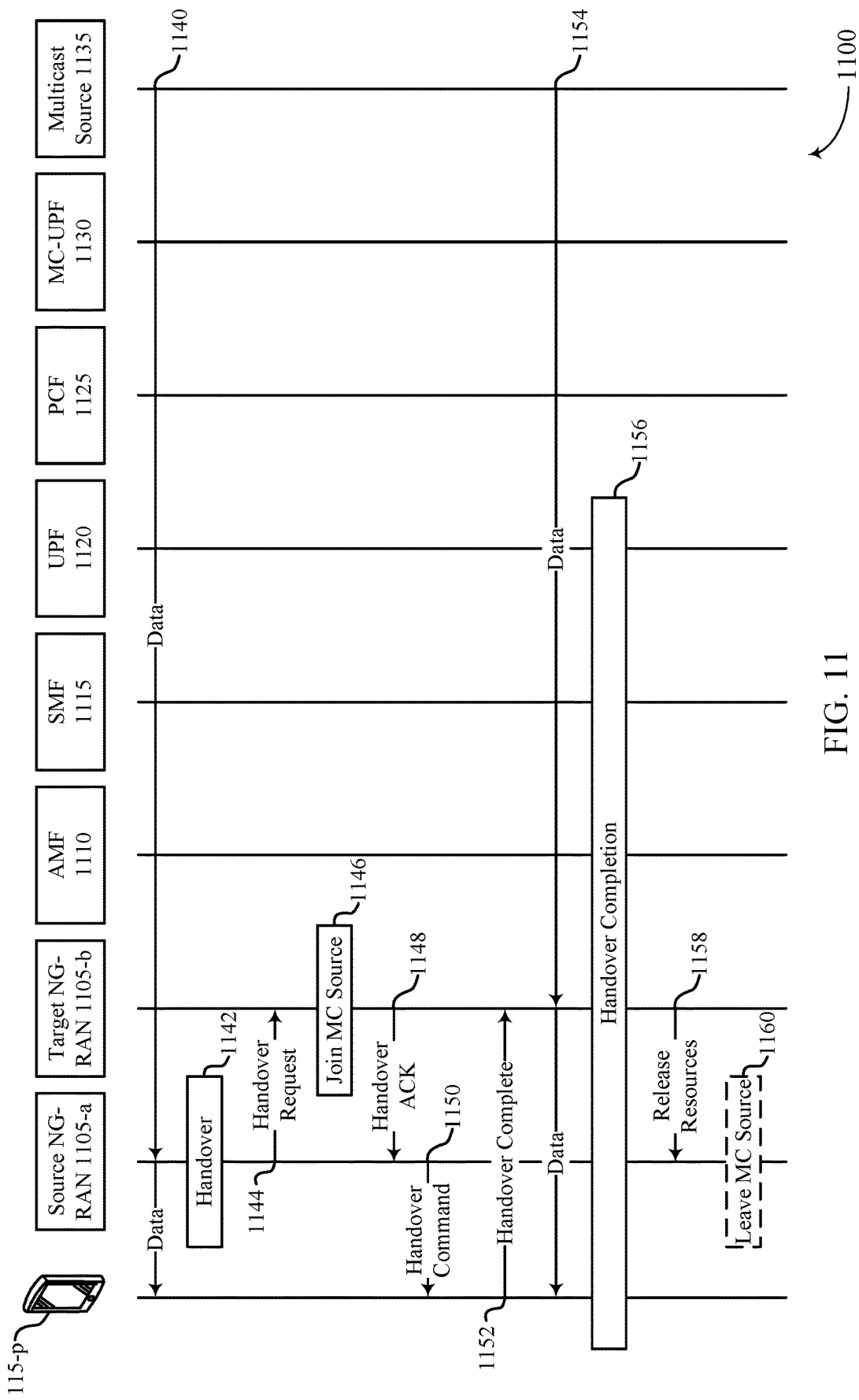

FIG. 11 illustrates an example of a process flow 1100 that supports mixed mode multicast architecture in accordance with aspects of the present disclosure. In some examples, process flow 1100 may implement aspects of wireless communications systems 100, 200, and/or 900. Process flow 800 may include a UE 115-*p*, a source NG-RAN 1105-*a*, a target NG-RAN 1105-*b*, an AMF 1110, an SMF 1115, a UPF 1120, a PCF 1125, an MC-UPF 1130, and a multicast source 1135, which may be examples of corresponding devices and functions as described above with reference to FIGS. 1-10. Process flow 1100 may include a process for a handover from source NG-RAN 1105-*a* to target NG-RAN 1105-*b* for UE 115-*p*, including multicast downlink transmissions. Additionally, while the AMF 1110 and the SMF 1115 are shown in process flow 1100, it is understood that the AMF 1110 and the SMF 1115 may be examples of other management entities that include separate management functions for enabling the mixed mode multicast architecture as described herein.

At 1140, multicast source 1135 may send data to source NG-RAN 1105-*a*, which may then transmit the data to UE 115-*p* according to a determined delivery system (e.g., unicast/DRB or multicast/MRB).

At 1142, source NG-RAN 1105-*a* may determine a handover is to be performed for UE 115-*p*. In some cases, the determination may be based on signaling from AMF 1110 as indicated above with reference to FIG. 10.

At 1144, source NG-RAN 1105-*a* may forward multicast distribution information to target NG-RAN 1105-*b* as part of a handover request message. In some cases, source NG-RAN 1105-*a* may forward the information to target NG-RAN 1105-*b* via an Xn interface for an Xn-based inter-NG RAN handover. Alternatively, source NG-RAN 1105-*a* may forward the information via a core network (e.g., 5G core network (5GC)) to target NG-RAN 1105-*b* for an N2-based inter NG-RAN handover. For example, the different interfaces may include the target NG-RAN 1105-*b* directly (e.g., the Xn interface) or via a management function (e.g., AMF, SMF, etc.) indirectly (e.g., N2 interface) for the communication between the two NG-RANs 1105.

At 1146, target NG-RAN 1105-*b* may join multicast source 1135 identified by the multicast distribution information received from source NG-RAN 1105-*a*. Additionally, target NG-RAN 1105-*b* may decide whether to deliver the multicast data identified by the multicast distribution information using DRBs or an MRB (e.g., dedicated or shared radio resources) and may prepare a radio bearer configuration for UE 115-*p* accordingly.

At 1148, target NG-RAN 1105-*b* may pass the prepared radio bearer configuration to source NG-RAN 1105-*a* in a handover acknowledgement (ACK) message. In some cases, target NG-RAN 1105-*b* may forward the radio bearer configuration to source NG-RAN 1105-*a* via an Xn interface for an Xn-based inter-NG RAN handover. Alternatively, target NG-RAN 1105-*b* may forward the radio bearer configuration via a core network (e.g., 5GC) to source NG-RAN 1105-*a* for an N2-based inter NG-RAN handover. For example, the different interfaces may include the target NG-RAN 1105-*b* directly (e.g., the Xn interface) or via a management function (e.g., an AMF, SMF, etc.) indirectly (e.g., N2 interface) for the communication between the two NG-RANs 1105.

At 1150, source NG-RAN 1105-*a* may forward the radio bearer configuration to UE 115-*p* in a handover command message. At 1152, UE 115-*p* may transmit a handover completion message to target NG-RAN 1105-*b*, where the handover completion message includes the multicast distribution information.

At 1154, target NG-RAN 1105-*b* may receive multicast data directly from MC-UPF 1130 and multicast source 1135 identified by multicast distribution information received from source NG-RAN 1105-*a* (i.e., no multicast data for-warding between source NG-RAN 1105-*a* and target NG-RAN 1105-*b*). Target NG-RAN 1105-*b* may then deliver the multicast data to UE 115-*p*.

At 1156, a handover completion protocol may be followed, including transmitting the multicast distribution information at 1150 and 1152. At 1158, target NG-RAN 1105-*b* may transmit an indication to source NG-RAN 1105-*a* to release resources for multicast source 1135 based on the handover completion.

At 1158, source NG-RAN 1105-*a* may leave multicast source 1135, unless other UEs 115 are receiving data from the same multicast source 1135 via source NG-RAN 1105-*a*.

Additionally or alternatively, MC-UPF 1130 may change as a result of the handover procedure. For example, AMF 1110 may receive a handover required message (e.g., N2 Handover required message) from source NG-RAN 1105-*a* or a path switch request message (e.g., N2 Path Switch Request) from target NG-RAN 1105-*b*. Subsequently, AMF 1110 may inform SMF 1115 of the handover through an SM context update message (e.g., Nsmf_PDUSession_UpdateSMContext Request). SMF 1115 may then reselect a new MC-UPF 1130 for a new multicast source 1135 for UE 115-*p* and may request the new MC-UPF 1130 to join the new multicast source 1135 and to provide the new multicast distribution information back to SMF 1115. As such, SMF 1115 may then include new multicast distribution information in an SM context update response message (e.g., Nsmf_PDUSession_UpdateSMContext Response) to AMF 1110. AMF 1110 may include this new multicast distribution information in a path switch request ACK (e.g., N2 Path Switch Request ACK) or a handover request message (e.g., N2 Handover Request message) to target NG-RAN 1105-*b*. Consequently, target NG-RAN 1105-*b* may join the new multicast source 1135 identified by the new multicast distribution information and may start delivering the multicast data to UE 115-*p* using either DRBs or an MRB (e.g., dedicated or shared resources) and may configure UE 115-*p* accordingly.

Figure 12:
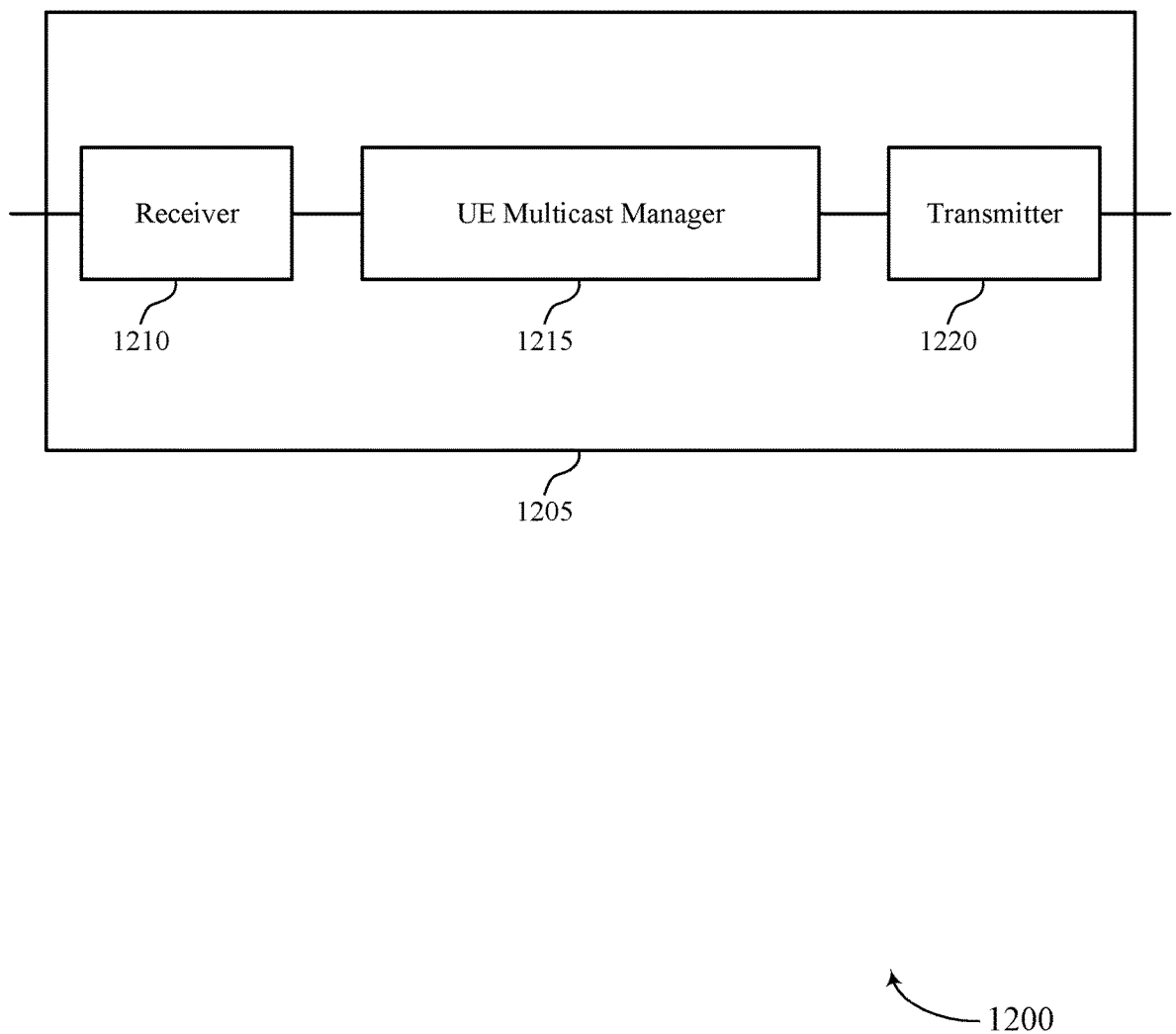
FIGS. 12 and 13 show block diagrams of devices that support mixed mode multicast architecture in accordance with aspects of the present disclosure.

FIG. 12 shows a block diagram 1200 of a device 1205 that supports mixed mode multicast architecture in accordance with aspects of the present disclosure. The device 1205 may be an example of aspects of a UE 115 as described herein. The device 1205 may include a receiver 1210, a UE multicast manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to mixed mode multicast architecture, etc.). Information may be passed on to other components of the device 1205. The receiver 1210 may be an example of aspects of the transceiver 1520 described with reference to FIG. 15. The receiver 1210 may utilize a single antenna or a set of antennas.

The UE multicast manager 1215 may receive, at the UE and from a base station, an signal (e.g., RRC signal) indicating whether a DRB or an MRB is to be used to receive multicast traffic at the UE. Accordingly, the UE multicast manager 1215 may receive multicast traffic at the UE using either the DRB or the MRB based on the signal. The UE multicast manager 1215 may be an example of aspects of the UE multicast manager 1510 described herein.

The UE multicast manager 1215, or its sub-components, may be implemented in hardware, code (e.g., software or firmware) executed by a processor, or any combination thereof. If implemented in code executed by a processor, the functions of the UE multicast manager 1215, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The UE multicast manager 1215, or its sub-components, may be physically located at various positions, including being distributed such that portions of functions are implemented at different physical locations by one or more physical components. In some examples, the UE multicast manager 1215, or its sub-components, may be a separate and distinct component in accordance with various aspects of the present disclosure. In some examples, the UE multicast manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
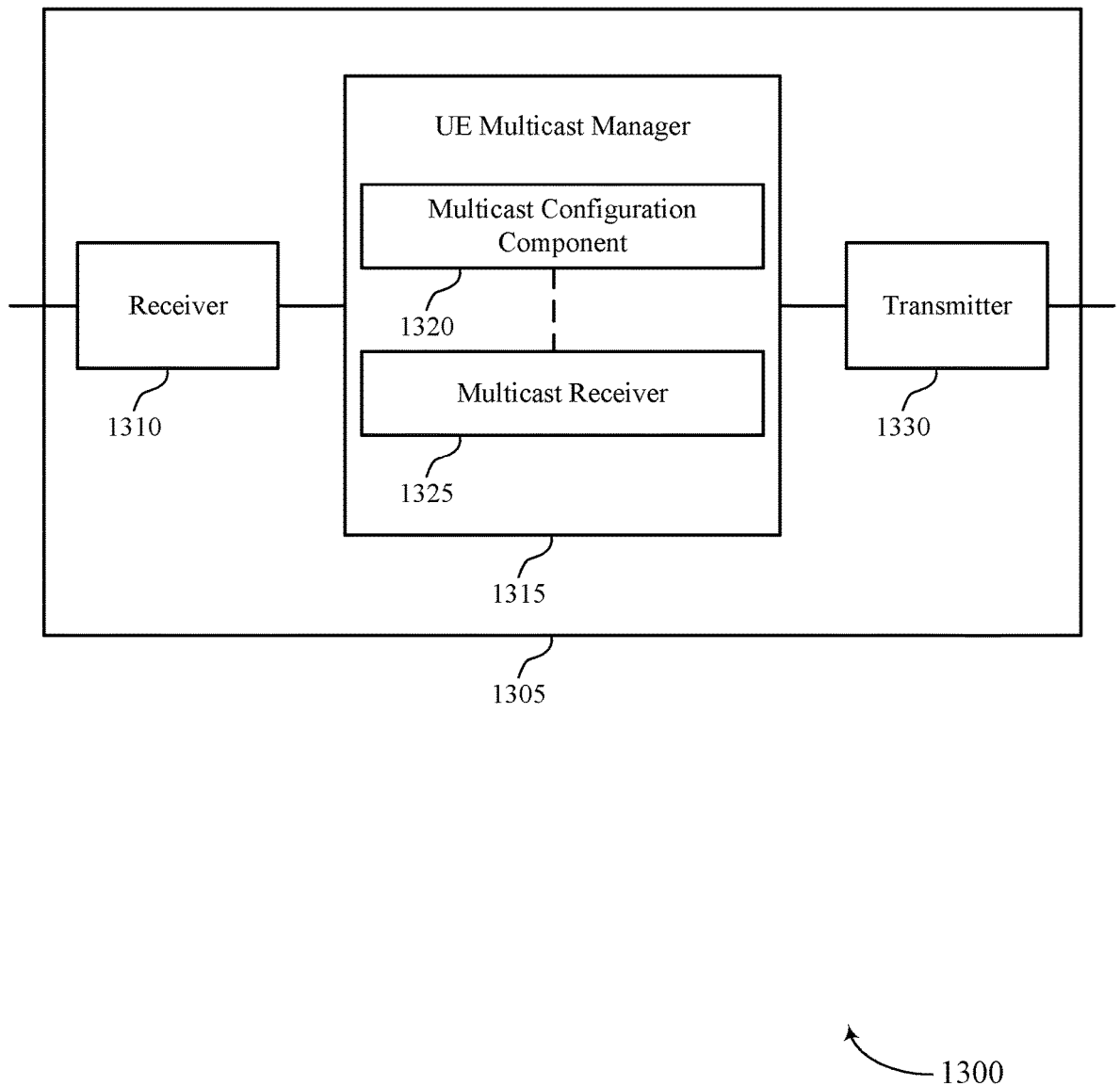

FIG. 13 shows a block diagram 1300 of a device 1305 that supports mixed mode multicast architecture in accordance with aspects of the present disclosure. The device 1305 may be an example of aspects of a device 1205 or a UE 115 as described herein. The device 1305 may include a receiver 1310, a UE multicast manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to mixed mode multicast architecture, etc.). Information may be passed on to other components of the device 1305. The receiver 1310 may be an example of aspects of the transceiver 1520 described with reference to FIG. 15. The receiver 1310 may utilize a single antenna or a set of antennas.

The UE multicast manager 1315 may be an example of aspects of the UE multicast manager 1215 as described herein. The UE multicast manager 1315 may include a multicast configuration component 1320 and a multicast receiver 1325. The UE multicast manager 1315 may be an example of aspects of the UE multicast manager 1510 described herein.

The multicast configuration component 1320 may receive, at the UE and from a base station, a signal (e.g., RRC signal) indicating whether a DRB or an MRB is to be used to receive multicast traffic at the UE.

The multicast receiver 1325 may receive multicast traffic at the UE using either the DRB or the MRB based on the signal.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
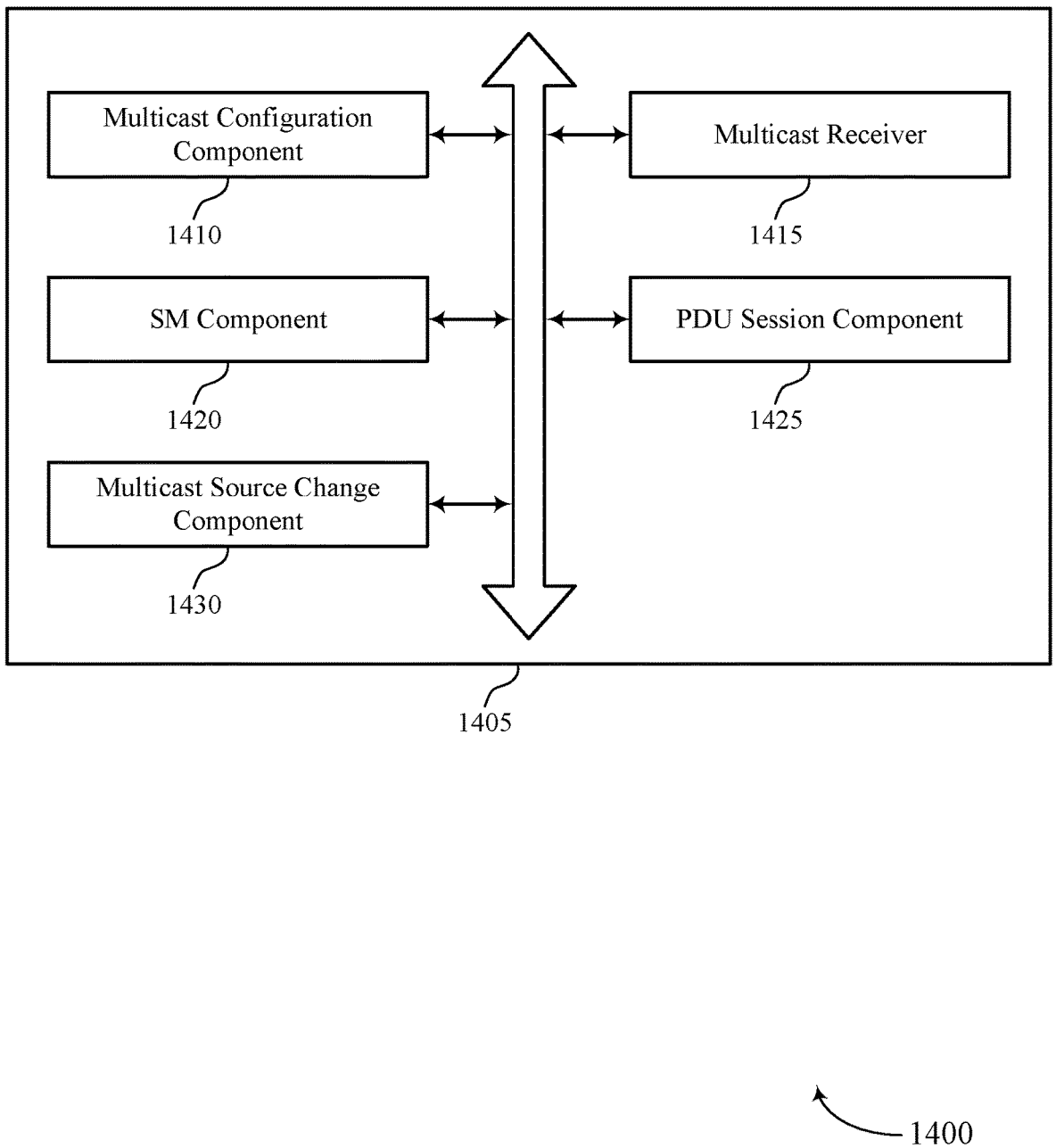
FIG. 14 shows a block diagram of a UE multicast manager that supports mixed mode multicast architecture in accordance with aspects of the present disclosure.

FIG. 14 shows a block diagram 1400 of a UE multicast manager 1405 that supports mixed mode multicast architecture in accordance with aspects of the present disclosure. The UE multicast manager 1405 may be an example of aspects of a UE multicast manager 1215, a UE multicast manager 1315, or a UE multicast manager 1510 described herein. The UE multicast manager 1405 may include a multicast configuration component 1410, a multicast receiver 1415, a SM component 1420, a PDU session component 1425, and a multicast source change component 1430. Each of these modules may communicate, directly or indirectly, with one another (e.g., via one or more buses).

The multicast configuration component 1410 may receive, at the UE and from a base station, a signal (e.g., an RRC signal) indicating whether a DRB or an MRB is to be used to receive multicast traffic at the UE. In some examples, the multicast configuration component 1410 may receive a tuple based on an M-RNTI, which identifies a multicast source of the multicast traffic, and a PDU session ID. In some examples, the multicast configuration component 1410 may associate the MRB with the M-RNTI in order to facilitate reception of the multicast traffic using the MRB. In some examples, the multicast configuration component 1410 may receive a configuration for using the DRB to receive the multicast traffic.

The multicast receiver 1415 may receive multicast traffic at the UE using either the DRB or the MRB based on the signal. In some examples, the multicast receiver 1415 may receive, via ciphered NAS signaling initiated at a management function or via signaling (e.g. RRC signal, system information broadcast (SIB) message, etc.) initiated at the base station, a group key associated with ciphering and deciphering the multicast traffic.

The SM component 1420 may transmit, prior to receiving the signal indicating whether the DRB or the MRB is to be used, a message (e.g., SM message) in order to trigger addition of a multicast source of the multicast traffic to a PDU session with which the UE is associated, the message including at least one of a PDU session ID, or multicast source information. Additionally or alternatively, in some examples, the SM component 1420 may transmit a message (e.g., SM message) in order to stop delivery of the multicast traffic from a multicast source to the UE, the message including at least one of a PDU session ID, multicast source information, or an indication that the multicast source is to be dropped from the PDU session.

The PDU session component 1425 may transmit, prior to receiving the signal indicating whether the DRB or the MRB is to be used and prior to establishment of a PDU session for communication with the UE, a PDU session establishment request, where the PDU session establishment request includes multicast source information corresponding to a multicast source of the multicast traffic. In some examples, the PDU session component 1425 may transmit, prior to receiving the signal indicating whether the DRB or the MRB is to be used, an IGMP or MLD message via a user-plane in order to trigger addition of a multicast source of the multicast traffic to a PDU session with which the UE is associated, the IGMP or MLD message including information indicative of the multicast source.

The multicast source change component 1430 may transmit an IGMP or MLD message via a user-plane in order to stop delivery of the multicast traffic from a multicast source to the UE, the IGMP or MLD message including information indicative of the multicast source.

Figure 15:
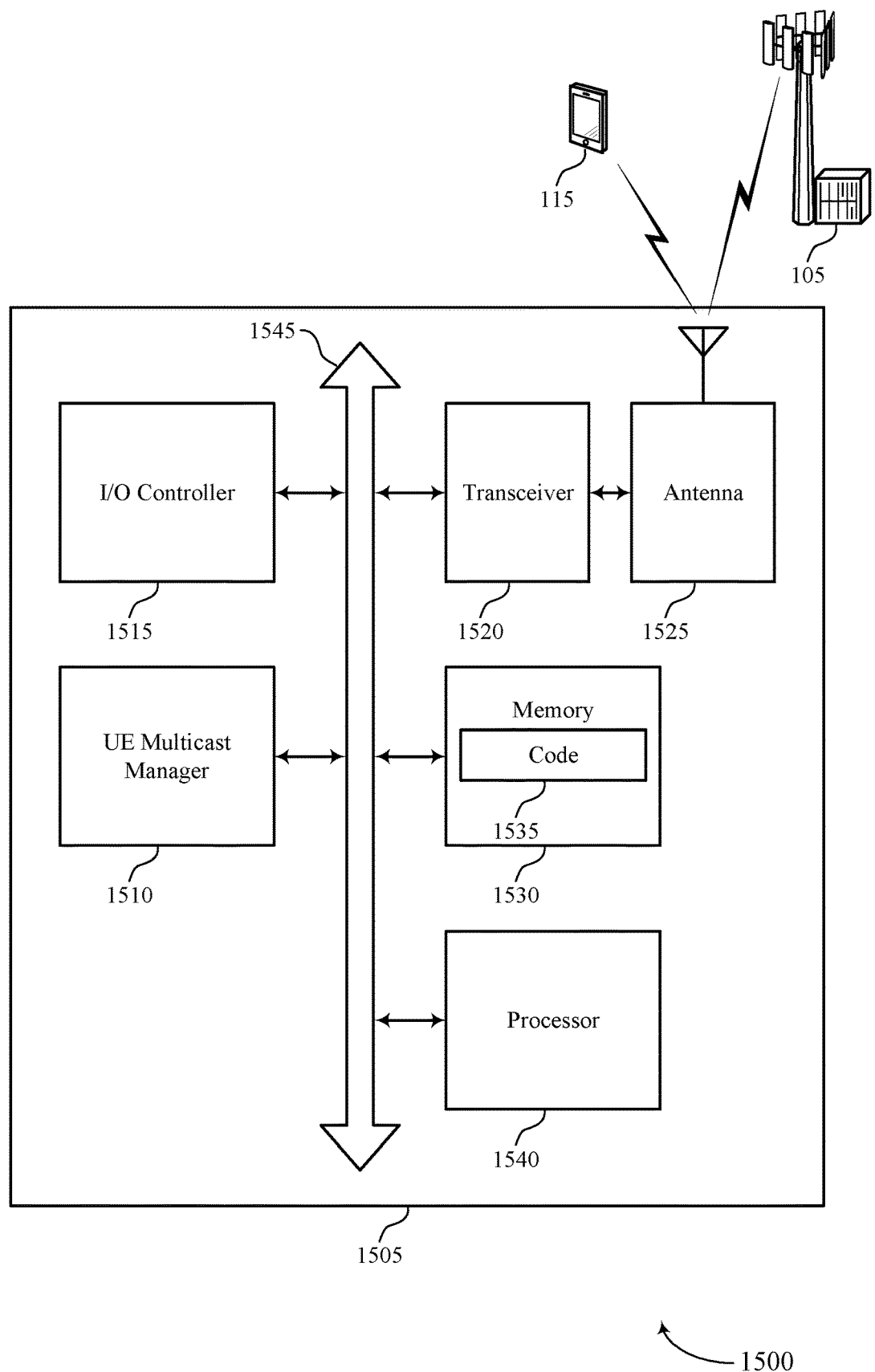
FIG. 15 shows a diagram of a system including a device that supports mixed mode multicast architecture in accordance with aspects of the present disclosure.

FIG. 15 shows a diagram of a system 1500 including a device 1505 that supports mixed mode multicast architecture in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a UE multicast manager 1510, an I/O controller 1515, a transceiver 1520, an antenna 1525, memory 1530, and a processor 1540. These components may be in electronic communication via one or more buses (e.g., bus 1545).

The UE multicast manager 1510 may receive, at the UE and from a base station, a signal (e.g., RRC signal) indicating whether a DRB or an MRB is to be used to receive multicast traffic at the UE. Accordingly, the UE multicast manager 1510 may receive multicast traffic at the UE using either the DRB or the MRB based on the signal.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1535 including instructions that, when executed, cause the processor to perform various functions described herein. In some cases, the memory 1530 may contain, among other things, a basic input/output system (BIOS) which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting mixed mode multicast architecture).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
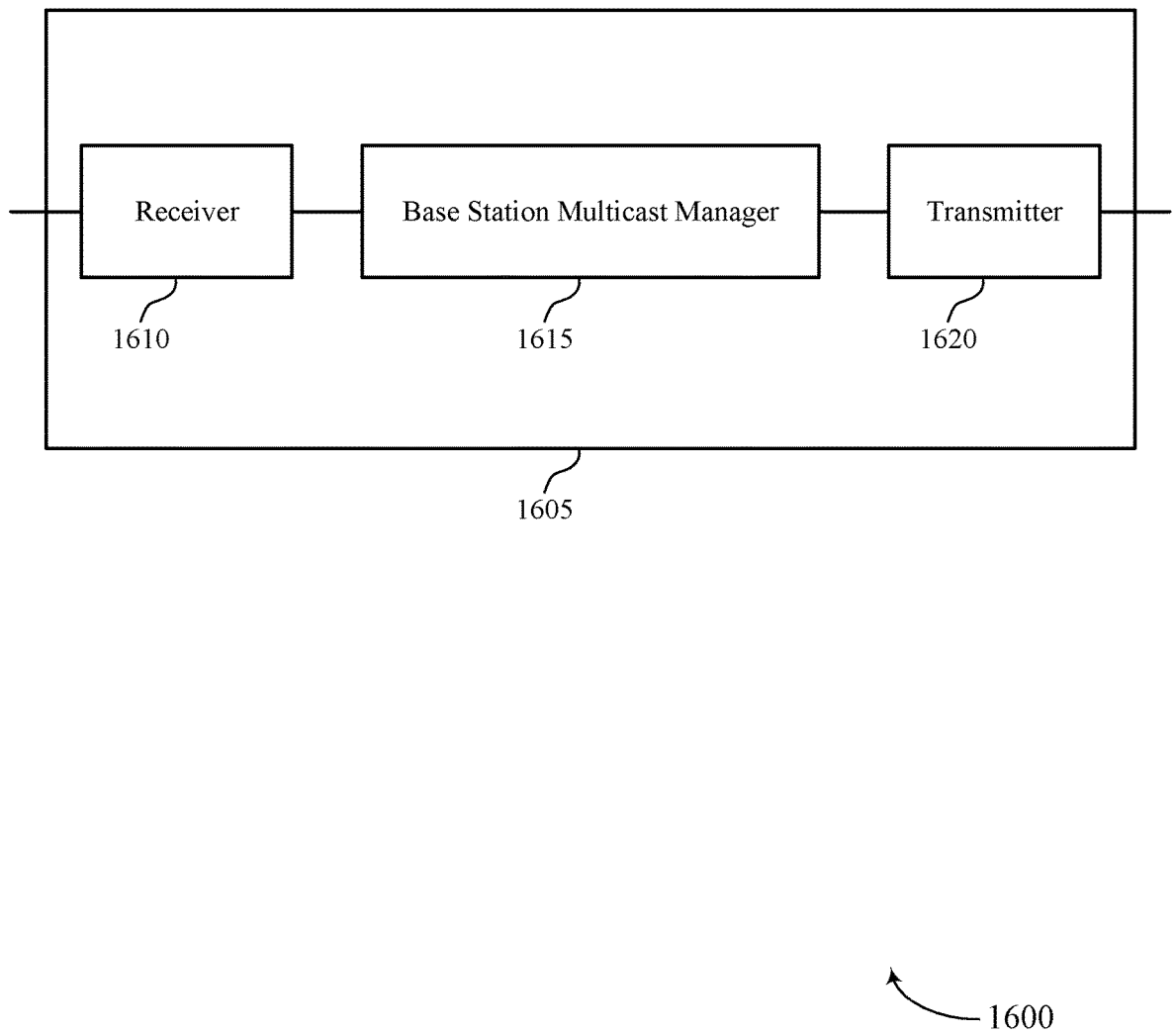
FIGS. 16 and 17 show block diagrams of devices that support mixed mode multicast architecture in accordance with aspects of the present disclosure.

FIG. 16 shows a block diagram 1600 of a device 1605 that supports mixed mode multicast architecture in accordance with aspects of the present disclosure. The device 1605 may be an example of aspects of a base station 105 as described herein. The device 1605 may include a receiver 1610, a base station multicast manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to mixed mode multicast architecture, etc.). Information may be passed on to other components of the device 1605. The receiver 1610 may be an example of aspects of the transceiver 1920 described with reference to FIG. 19. The receiver 1610 may utilize a single antenna or a set of antennas.

The base station multicast manager 1615 may receive multicast traffic at a base station for delivery to a set of UEs. Subsequently, the base station multicast manager 1615 may determine, at the base station, whether to deliver the multicast traffic to the set of UEs via unicast delivery, via multicast delivery, or combinations thereof. Accordingly, The base station multicast manager 1615 may transmit the multicast traffic to the set of UEs based on the determining. The base station multicast manager 1615 may be an example of aspects of the base station multicast manager 1910 described herein.

The base station multicast manager 1615, or its sub-components, may be implemented in hardware, code (e.g., software or firmware) executed by a processor, or any combination thereof. If implemented in code executed by a processor, the functions of the base station multicast manager 1615, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station multicast manager 1615, or its sub-components, may be physically located at various positions, including being distributed such that portions of functions are implemented at different physical locations by one or more physical components. In some examples, the base station multicast manager 1615, or its sub-components, may be a separate and distinct component in accordance with various aspects of the present disclosure. In some examples, the base station multicast manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
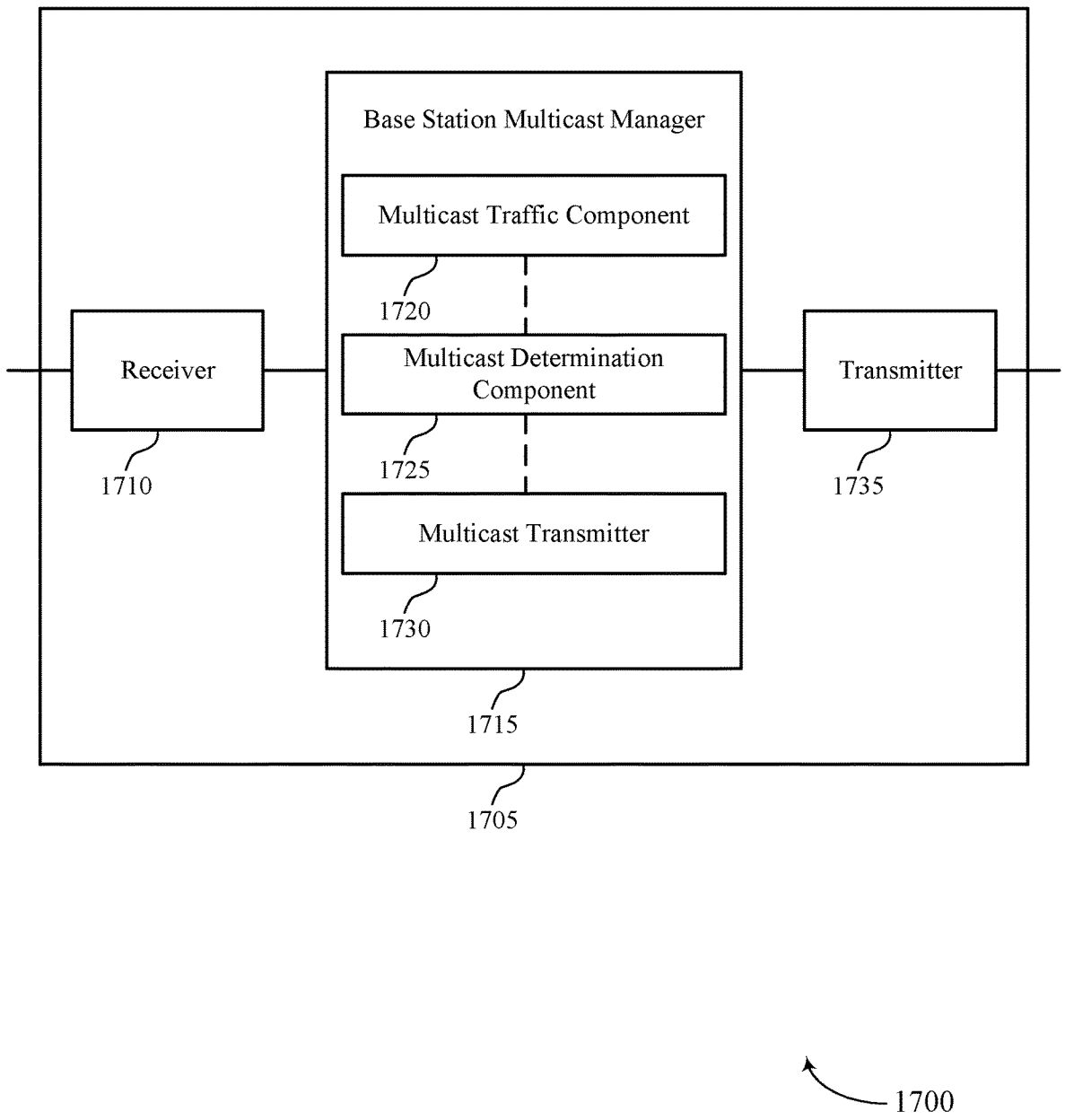

FIG. 17 shows a block diagram 1700 of a device 1705 that supports mixed mode multicast architecture in accordance with aspects of the present disclosure. The device 1705 may be an example of aspects of a device 1605 or a base station 105 as described herein. The device 1705 may include a receiver 1710, a base station multicast manager 1715, and a transmitter 1735. The device 1705 may also include a processor. Each of these components may be in communication with one another (e.g., via one or more buses).

The receiver 1710 may receive information such as packets, user data, or control information associated with various information channels (e.g., control channels, data channels, and information related to mixed mode multicast architecture, etc.). Information may be passed on to other components of the device 1705. The receiver 1710 may be an example of aspects of the transceiver 1920 described with reference to FIG. 19. The receiver 1710 may utilize a single antenna or a set of antennas.

The base station multicast manager 1715 may be an example of aspects of the base station multicast manager 1615 as described herein. The base station multicast manager 1715 may include a multicast traffic component 1720, a multicast determination component 1725, and a multicast transmitter 1730. The base station multicast manager 1715 may be an example of aspects of the base station multicast manager 1910 described herein.

The multicast traffic component 1720 may receive multicast traffic at a base station for delivery to a set of UEs.

The multicast determination component 1725 may determine, at the base station, whether to deliver the multicast traffic to the set of UEs via unicast delivery, via multicast delivery, or combinations thereof.

The multicast transmitter 1730 may transmit the multicast traffic to the set of UEs based on the determining.

The transmitter 1735 may transmit signals generated by other components of the device 1705. In some examples, the transmitter 1735 may be collocated with a receiver 1710 in a transceiver module. For example, the transmitter 1735 may be an example of aspects of the transceiver 1920 described with reference to FIG. 19. The transmitter 1735 may utilize a single antenna or a set of antennas.

Figure 18:
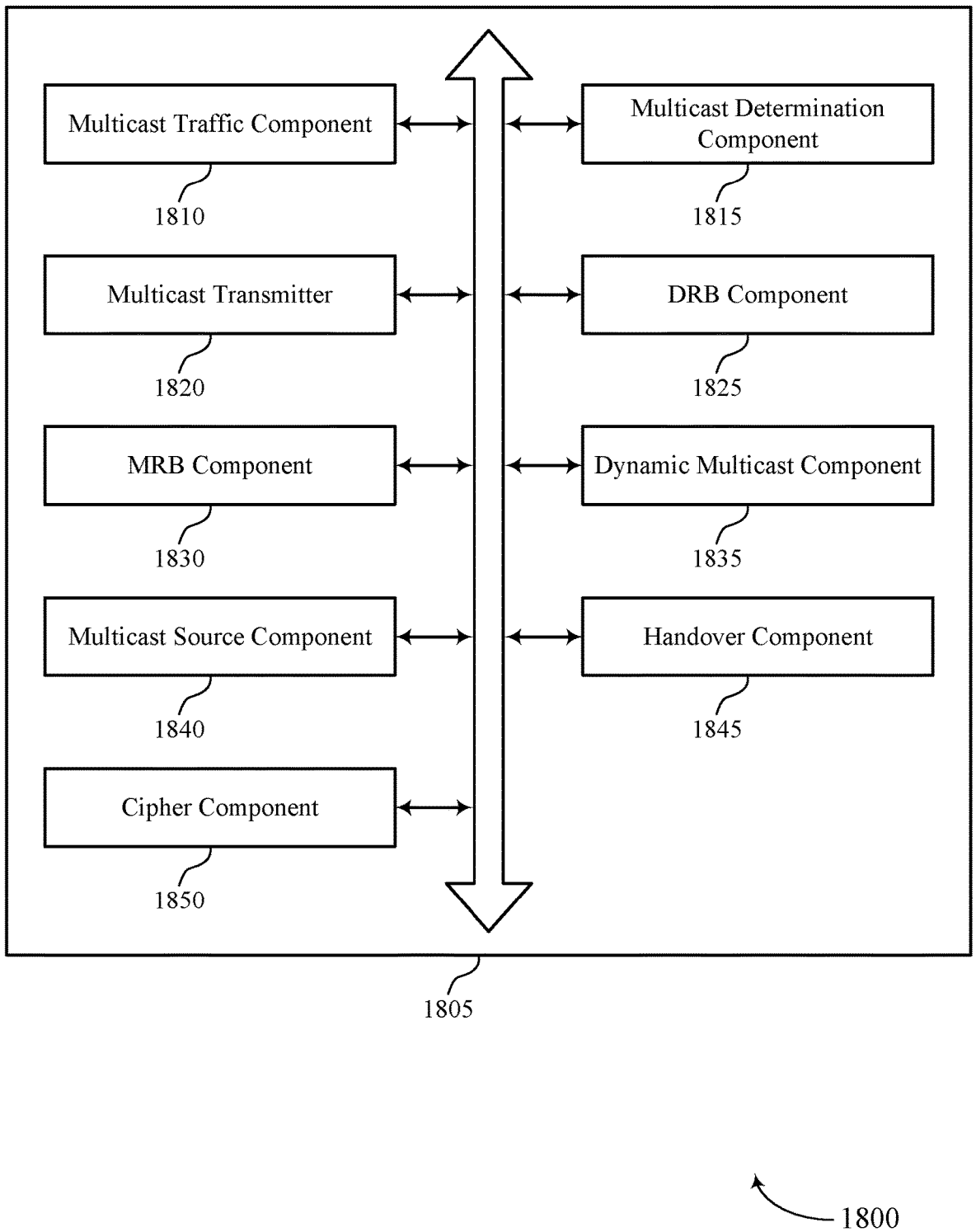
FIG. 18 shows a block diagram of a base station multicast manager that supports mixed mode multicast architecture in accordance with aspects of the present disclosure.

FIG. 18 shows a block diagram 1800 of a base station multicast manager 1805 that supports mixed mode multicast architecture in accordance with aspects of the present disclosure. The base station multicast manager 1805 may be an example of aspects of a base station multicast manager 1615, a base station multicast manager 1715, or a base station multicast manager 1910 described herein. The base station multicast manager 1805 may include a multicast traffic component 1810, a multicast determination component 1815, a multicast transmitter 1820, a DRB component 1825, a MRB component 1830, a dynamic multicast component 1835, a multicast source component 1840, a handover component 1845, and a cipher component 1850. Each of these modules may communicate, directly or indirectly, with one another (e.g., via one or more buses).

The multicast traffic component 1810 may receive multicast traffic at a base station for delivery to a set of UEs. In some examples, the multicast traffic component 1810 may receive the multicast traffic via a tunnel from an MC-UPF, where only a single copy of the multicast traffic is received for delivery to each of the set of UEs, and where the tunnel supports different types of multicast traffic, the different types including both IP packets and Ethernet frames, and where the IP packets are received via IP multicast.

The multicast determination component 1815 may determine, at the base station, whether to deliver the multicast traffic to the set of UEs via unicast delivery, via multicast delivery, or combinations thereof. In some examples, the multicast determination component 1815 may identify one or more UE-related parameters. In some examples, the multicast determination component 1815 may determine whether to use unicast delivery, multicast delivery, or combinations thereof based on the one or more UE-related parameters, where the one or more UE-related parameters include at least one of a number of UEs in the set of UEs, or a channel quality for communication with individual UEs of the set of UEs.

The multicast transmitter 1820 may transmit the multicast traffic to the set of UEs based on the determining. In some examples, the multicast transmitter 1820 may receive, from a management function (e.g., an AMF, SMF, etc.), a request to stop transmitting the multicast traffic to at least one of the set of UEs. In some examples, the multicast transmitter 1820 may remove, from a UE context corresponding to the at least one of the set of UEs, a tuple that includes UE multicast source information associated with a multicast source of the multicast traffic. In some examples, the multicast transmitter 1820 may leave the multicast source if none of the set of UEs is still receiving multicast data from the multicast source.

The DRB component 1825 may transmit the multicast traffic to each UE within at least a subset of the set of UEs via individual DRBs. In some examples, the DRB component 1825 may identify the individual DRBs to be used to transmit the multicast traffic to each UE within the subset of the set of UEs. In some examples, the DRB component 1825 may transmit a signal (e.g., RRC signal) to each UE within the subset of the set of UEs in order to configure each UE within the subset of the set of UEs to receive the multicast traffic via the individual DRBs. In some examples, the DRB component 1825 may identify QoS information for the multicast traffic. In some examples, the DRB component 1825 may identify the individual DRBs to be used based on the QoS information for the multicast traffic, the individual DRBs either selected from already established DRBs or established as additional DRBs.

The MRB component 1830 may transmit the multicast traffic to each UE within at least a subset of the set of UEs via a shared MRB. In some examples, the MRB component 1830 may generate an M-RNTI in order to identify a source of the multicast traffic. In some examples, the MRB component 1830 may transmit a signal (e.g., RRC signal) to each UE within the subset of the set of UEs in order to provide each UE within the subset of the set of UEs with a tuple based on the M-RNTI and a PDU session ID. In some examples, the MRB component 1830 may identify the MRB by the M-RNTI.

The dynamic multicast component 1835 may dynamically change a determination of whether to deliver the multicast traffic to the set of UEs via unicast delivery, via multicast delivery, or combinations thereof.

The multicast source component 1840 may receive, from a management function, at least one of multicast distribution information, a corresponding PDU session ID, QoS information for the multicast traffic, or SM container, where the multicast distribution information includes a TEID, a multicast distribution address, and a multicast source address. In some examples, the multicast source component 1840 may join a multicast source corresponding to the multicast source address of the multicast distribution information. In some examples, the multicast source component 1840 may forward the SM container to the set of UEs.

The handover component 1845 may prepare for a handover of the multicast traffic for a UE of the set of UEs by forwarding multicast distribution information to a target base station via the target base station directly or an additional base station indirectly (e.g., via either an Xn interface or an N2 interface) and via a management function, where the multicast distribution information includes a TEID, a multicast distribution address, and a multicast source address. In some examples, the handover component 1845 may receive, either directly from the target base station or indirectly through a management function, a UE radio bearer configuration from the target base station, where the UE radio bearer configuration includes individual DRBs or a shared MRB. In some examples, the handover component 1845 may forward the UE radio bearer configuration to the UE. In some examples, the handover component 1845 may leave a multicast source of the multicast traffic if none of the set of UEs is still receiving multicast data from the multicast source via the base station.

The cipher component 1850 may cipher the multicast traffic using a group key for multicast traffic that is transmitted via multicast delivery.

Figure 19:
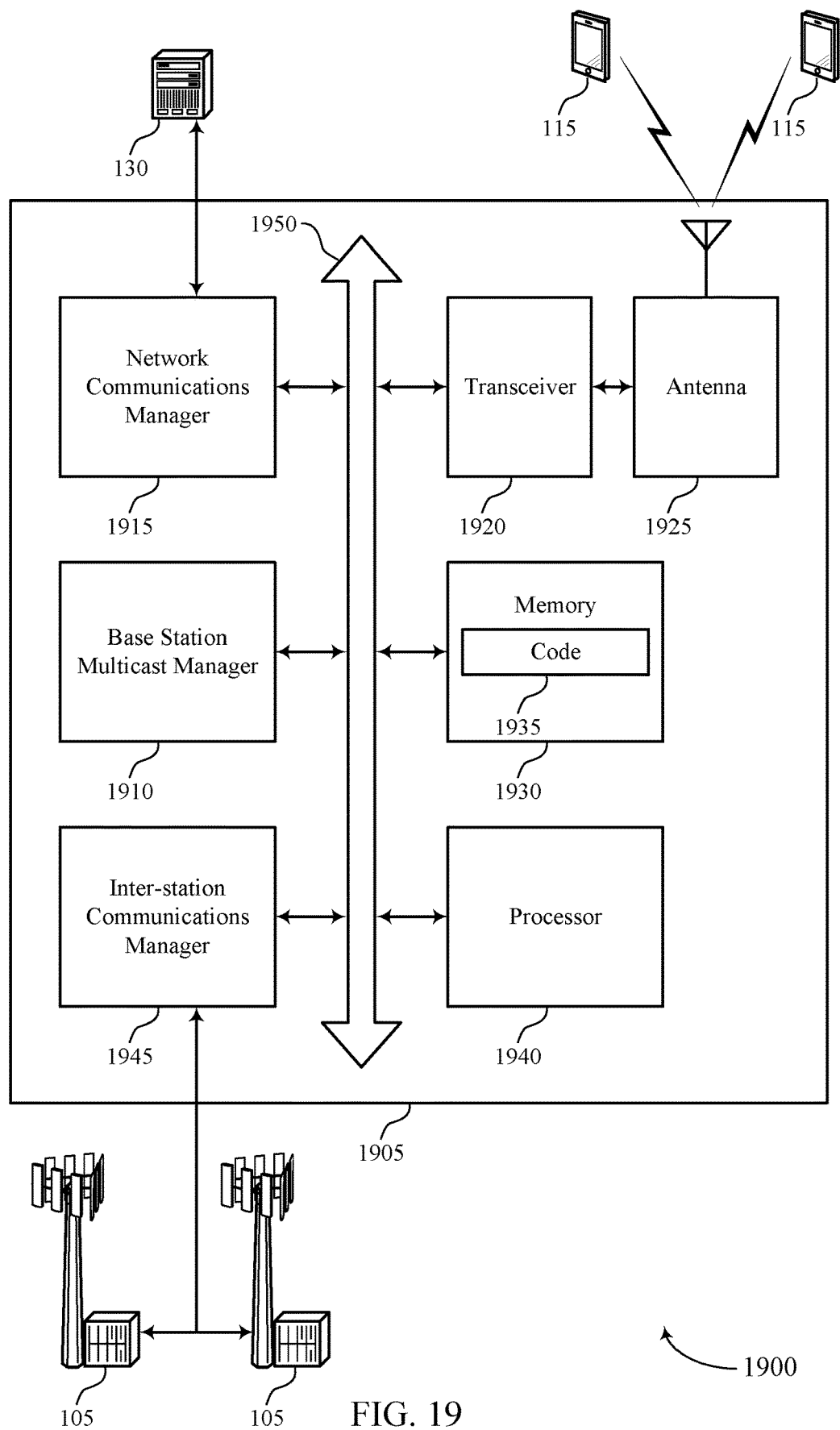
FIG. 19 shows a diagram of a system including a device that supports mixed mode multicast architecture in accordance with aspects of the present disclosure.

FIG. 19 shows a diagram of a system 1900 including a device 1905 that supports mixed mode multicast architecture in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a base station multicast manager 1910, a network communications manager 1915, a transceiver 1920, an antenna 1925, memory 1930, a processor 1940, and an inter-station communications manager 1945. These components may be in electronic communication via one or more buses (e.g., bus 1950).

The base station multicast manager 1910 may receive multicast traffic at a base station for delivery to a set of UEs. Subsequently, the base station multicast manager 1910 may determine, at the base station, whether to deliver the multicast traffic to the set of UEs via unicast delivery, via multicast delivery, or combinations thereof. Accordingly, the base station multicast manager 1910 may transmit the multicast traffic to the set of UEs based on the determining.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device #{device} to perform various functions (e.g., functions or tasks supporting mixed mode multicast architecture).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
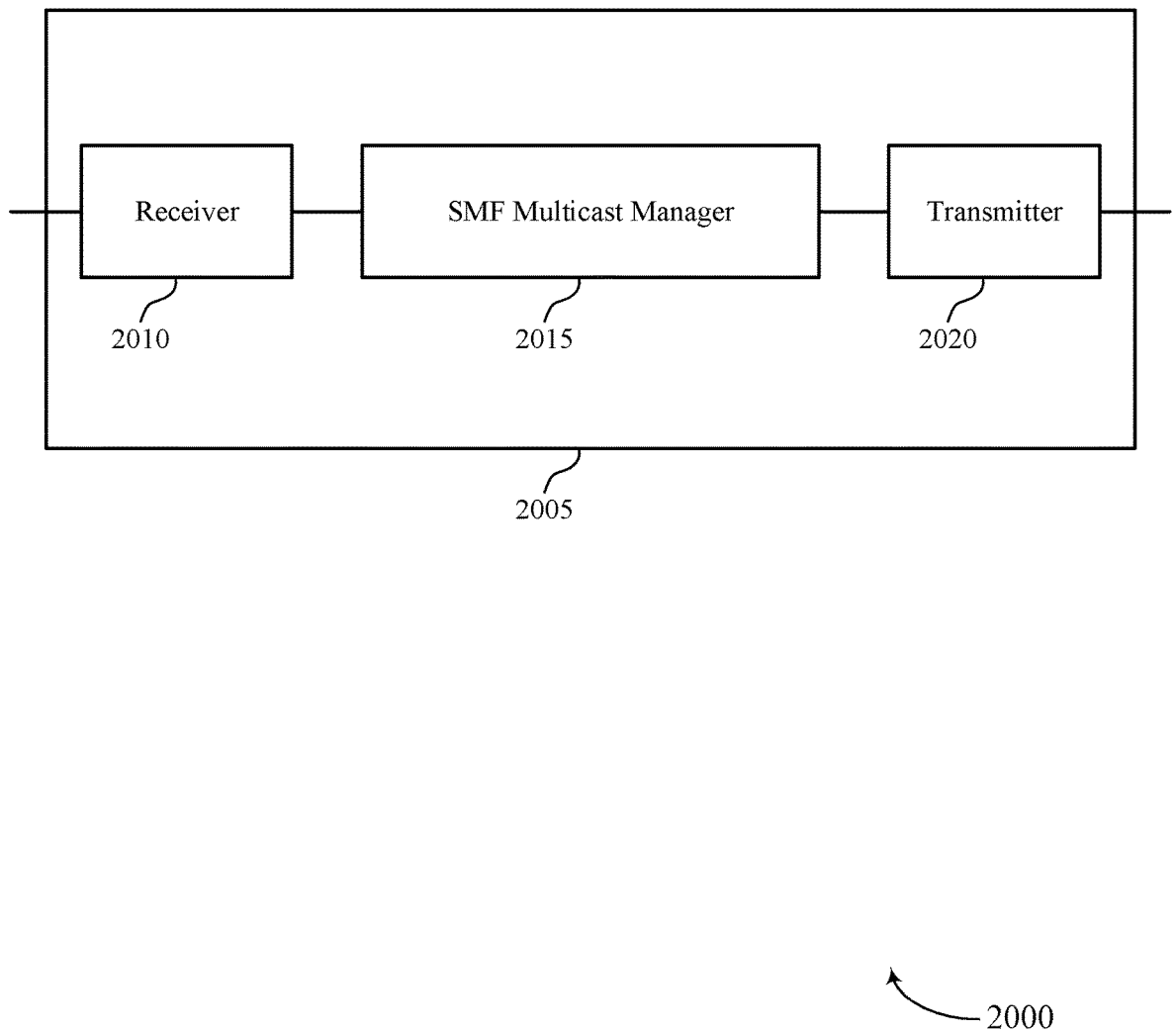
FIGS. 20 and 21 show block diagrams of devices that support mixed mode multicast architecture in accordance with aspects of the present disclosure.

FIG. 20 shows a block diagram 2000 of a device 2005 that supports mixed mode multicast architecture in accordance with aspects of the present disclosure. The device 2005 may be an example of aspects of a device as described herein. The device 2005 may include a receiver 2010, a SMF multicast manager 2015, and a transmitter 2020. The device 2005 may also include a processor. Each of these components may be in communication with one another (e.g., via one or more buses).

The receiver 2010 may receive information such as packets, user data, or control information associated with various information channels (e.g., control channels, data channels, and information related to mixed mode multicast architecture, etc.). Information may be passed on to other components of the device 2005. The receiver 2010 may be an example of aspects of the transceiver 2320 described with reference to FIG. 23. The receiver 2010 may utilize a single antenna or a set of antennas.

The SMF multicast manager 2015 may identify, at an SMF, that a UE is to join a multicast source for reception of multicast traffic from the multicast source. Accordingly, in some cases, the SMF multicast manager 2015 may select an MC-UPF to provide the multicast traffic to the UE. The SMF multicast manager 2015 may then transmit PDU session information associated with the UE and multicast source information associated with the multicast source to the multicast UPF. Additionally, the SMF multicast manager 2015 may receive, from the MC-UPF and responsive to the PDU session information and the multicast source information, multicast distribution information to be associated with the multicast source, where the multicast distribution information includes information per multicast source per UE charging and LI related information. Accordingly, the SMF multicast manager 2015 may then transmit the multicast distribution information, a related PDU session ID, QoS information for the multicast data, and a management container to a management function (e.g., an AMF, SMF, etc.) for use by a base station that is to deliver the multicast traffic to the UE via either unicast delivery or multicast delivery. The SMF multicast manager 2015 may be an example of aspects of the SMF multicast manager 2310 described herein.

The SMF multicast manager 2015, or its sub-components, may be implemented in hardware, code (e.g., software or firmware) executed by a processor, or any combination thereof. If implemented in code executed by a processor, the functions of the SMF multicast manager 2015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The SMF multicast manager 2015, or its sub-components, may be physically located at various positions, including being distributed such that portions of functions are implemented at different physical locations by one or more physical components. In some examples, the SMF multicast manager 2015, or its sub-components, may be a separate and distinct component in accordance with various aspects of the present disclosure. In some examples, the SMF multicast manager 2015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2020 may transmit signals generated by other components of the device 2005. In some examples, the transmitter 2020 may be collocated with a receiver 2010 in a transceiver module. For example, the transmitter 2020 may be an example of aspects of the transceiver 2320 described with reference to FIG. 23. The transmitter 2020 may utilize a single antenna or a set of antennas.

Figure 21:
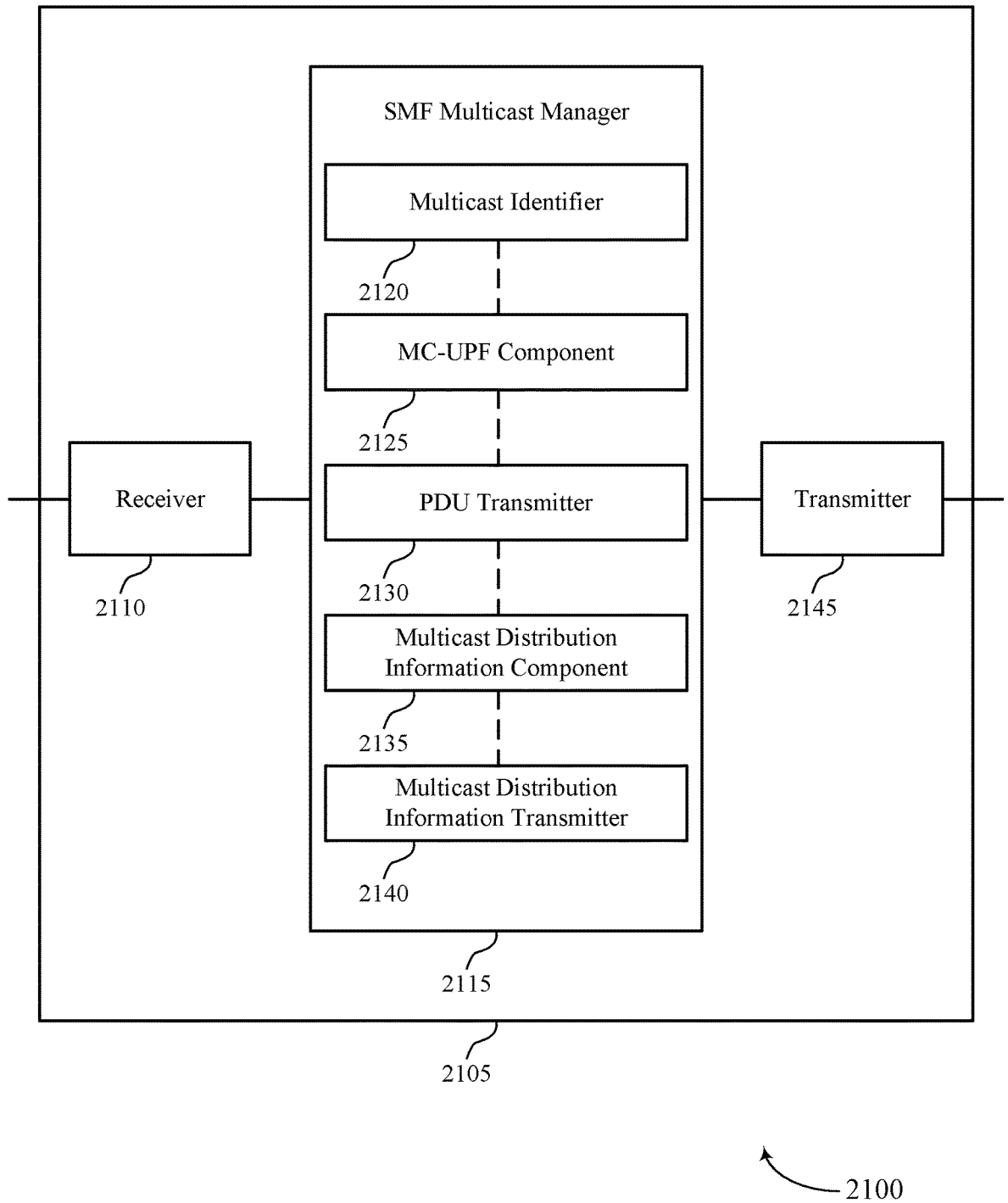

FIG. 21 shows a block diagram 2100 of a device 2105 that supports mixed mode multicast architecture in accordance with aspects of the present disclosure. The device 2105 may be an example of aspects of a device 2005 or an SMF as described herein. The device 2105 may include a receiver 2110, a SMF multicast manager 2115, and a transmitter 2145. The device 2105 may also include a processor. Each of these components may be in communication with one another (e.g., via one or more buses).

The receiver 2110 may receive information such as packets, user data, or control information associated with various information channels (e.g., control channels, data channels, and information related to mixed mode multicast architecture, etc.). Information may be passed on to other components of the device 2105. The receiver 2110 may be an example of aspects of the transceiver 2320 described with reference to FIG. 23. The receiver 2110 may utilize a single antenna or a set of antennas.

The SMF multicast manager 2115 may be an example of aspects of the SMF multicast manager 2015 as described herein. The SMF multicast manager 2115 may include a multicast identifier 2120, an MC-UPF component 2125, a PDU transmitter 2130, a multicast distribution information component 2135, and a multicast distribution information transmitter 2140. The SMF multicast manager 2115 may be an example of aspects of the SMF multicast manager 2310 described herein.

The multicast identifier 2120 may identify, at an SMF, that a UE is to join a multicast source for reception of multicast traffic from the multicast source.

The MC-UPF component 2125 may select an MC-UPF to provide the multicast traffic to the UE.

The PDU transmitter 2130 may transmit PDU session information associated with the UE and multicast source information associated with the multicast source to the multicast UPF.

The multicast distribution information component 2135 may receive, from the MC-UPF and responsive to the PDU session information and the multicast source information, multicast distribution information to be associated with the multicast source, where the multicast distribution information includes information per multicast source per UE charging and LI related information.

The multicast distribution information transmitter 2140 may transmit the multicast distribution information, a related PDU session ID, QoS information for the multicast data, and a management container to a management function (e.g., an AMF, SMF, etc.) for use by a base station that is to deliver the multicast traffic to the UE via either unicast delivery or multicast delivery.

The transmitter 2145 may transmit signals generated by other components of the device 2105. In some examples, the transmitter 2145 may be collocated with a receiver 2110 in a transceiver module. For example, the transmitter 2145 may be an example of aspects of the transceiver 2320 described with reference to FIG. 23. The transmitter 2145 may utilize a single antenna or a set of antennas.

Figure 22:
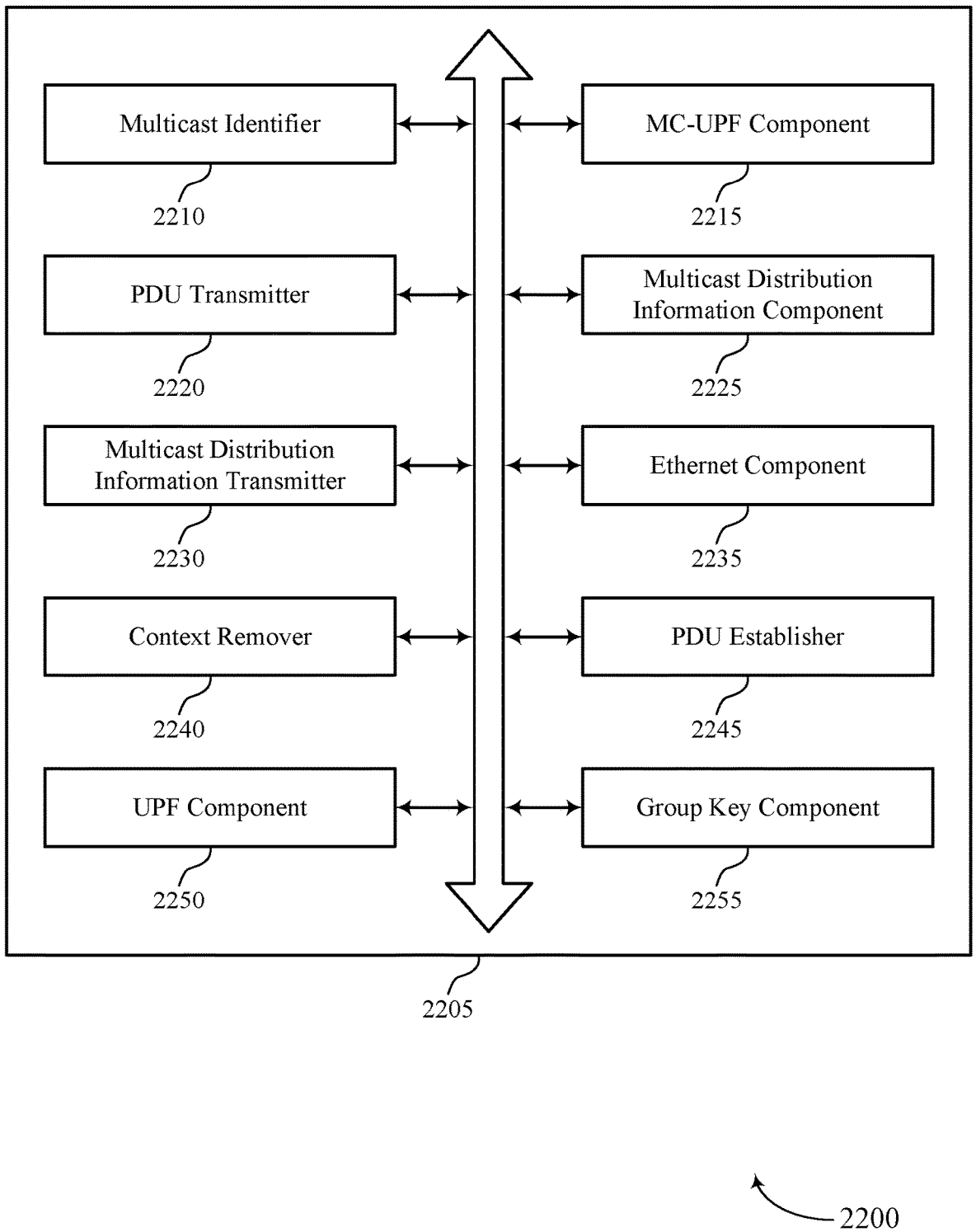
FIG. 22 shows a block diagram of a session management function (SMF) multicast manager that supports mixed mode multicast architecture in accordance with aspects of the present disclosure.

FIG. 22 shows a block diagram 2200 of a SMF multicast manager 2205 that supports mixed mode multicast architecture in accordance with aspects of the present disclosure. The SMF multicast manager 2205 may be an example of aspects of a SMF multicast manager 2015, a SMF multicast manager 2115, or a SMF multicast manager 2310 described herein. The SMF multicast manager 2205 may include a multicast identifier 2210, an MC-UPF component 2215, a PDU transmitter 2220, a multicast distribution information component 2225, a multicast distribution information transmitter 2230, an ethernet component 2235, a context remover 2240, a PDU establisher 2245, an UPF component 2250, and a group key component 2255. Each of these modules may communicate, directly or indirectly, with one another (e.g., via one or more buses).

The multicast identifier 2210 may identify, at an SMF, that a UE is to join a multicast source for reception of multicast traffic from the multicast source. In some examples, the multicast identifier 2210 may receive the multicast source information from the UE. In some examples, the multicast identifier 2210 may derive the multicast source information when a type of PDU session corresponding to the related PDU session ID is Ethernet. In some examples, the multicast identifier 2210 may configure a UPF that is separate from the MC-UPF and which is serving a unicast PDU session to the UE, such that the UPF matches and forwards any IGMP or MLD messages received from the UE. In some examples, the multicast identifier 2210 may receive an IGMP or MLD message from the UPF indicating that the UE is to join the multicast source. In some examples, deriving the multicast source information from the IGMP or MLD message, where the method further includes. In some examples, the multicast identifier 2210 may receive an indication that the UE is to leave the multicast source. In some examples, the multicast identifier 2210 may stop delivery of the multicast traffic to the UE based on the indication. In some cases, the multicast source information includes an IP multicast delivery address and an IP multicast source address.

The MC-UPF component 2215 may select a multicast user plane function (MC-UPF) to provide the multicast traffic to the UE. In some examples, the MC-UPF component 2215 may select the MC-UPF based on at least one of an S-NSSAI of the related PDU session ID, a DNN of the related PDU session ID, or the multicast source information. In some examples, the MC-UPF component 2215 may receive an indication that a handover or an N2 path switch is to occur. In some examples, the MC-UPF component 2215 may select a new MC-UPF to provide the multicast traffic to the UE. In some examples, the MC-UPF component 2215 may transmit a request to the new MC-UPF that the new MC-UPF is to join the multicast source and to provide updated multicast distribution information to the SMF. In some examples, the MC-UPF component 2215 may receive the updated multicast distribution information from the new MC-UPF. In some examples, the MC-UPF component 2215 may transmit the updated multicast distribution information via a management function to the base station.

The PDU transmitter 2220 may transmit PDU session information associated with the UE and multicast source information associated with the multicast source to the multicast UPF. In some examples, the PDU transmitter 2220 may add, to a PDU session associated with the PDU session ID, the multicast source identified by the multicast source information.

The multicast distribution information component 2225 may receive, from the MC-UPF and responsive to the PDU session information and the multicast source information, multicast distribution information to be associated with the multicast source, where the multicast distribution information includes information per multicast source per UE charging and LI related information.

The multicast distribution information transmitter 2230 may transmit the multicast distribution information, a related PDU session ID, QoS information for the multicast data, and a management container to a management function (e.g., an AMF, SMF, etc.) for use by a base station that is to deliver the multicast traffic to the UE via either unicast delivery or multicast delivery.

The Ethernet component 2235 may identify that a type of PDU session corresponding to the related PDU session ID is Ethernet. In some examples, the Ethernet component 2235 may transmit a message to a UPF separate from the MC-UPF and which is serving a unicast PDU session to the UE, where the message requests that the UPF block downlink Ethernet broadcast frames to the UE. In some cases, the multicast source information includes an Ethernet broadcast traffic indication which indicates that only Ethernet broadcast frames are to be delivered as the multicast traffic to the UE.

The context remover 2240 may identify that the UE is to leave the multicast source. In some examples, the context remover 2240 may transmit a request to the MC-UPF to release a UE context for the multicast source information. In some examples, the context remover 2240 may transmit a request to that the base station remove a tuple that includes the PDU session ID and the multicast source information from the UE context.

The PDU establisher 2245 may identify that a PDU session for communication with the UE has not yet been established. In some examples, the PDU establisher 2245 may establish a unicast PDU session for communication with the UE. In some examples, the PDU establisher 2245 may add, to the unicast PDU session, the multicast source identified by the multicast source information.

The UPF component 2250 may configure a UPF that is separate from the MC-UPF and which is serving a unicast PDU session to the UE, such that the UPF matches and forwards any IGMP or MLD messages received from the UE. In some examples, the UPF component 2250 may receive an IGMP or MLD message from the UPF indicating that the UE is to leave the multicast source. In some examples, deriving the multicast source information from the IGMP or MLD message, where the method further includes.

The group key component 2255 may transmit a request for a group key for ciphering of the multicast traffic. In some examples, the group key component 2255 may receive, as a result of the request, the group key, where the group key is based on the multicast distribution information. In some examples, the group key component 2255 may transmit the group key via the management function to the base station for use by the base station with the multicast traffic.

Figure 23:
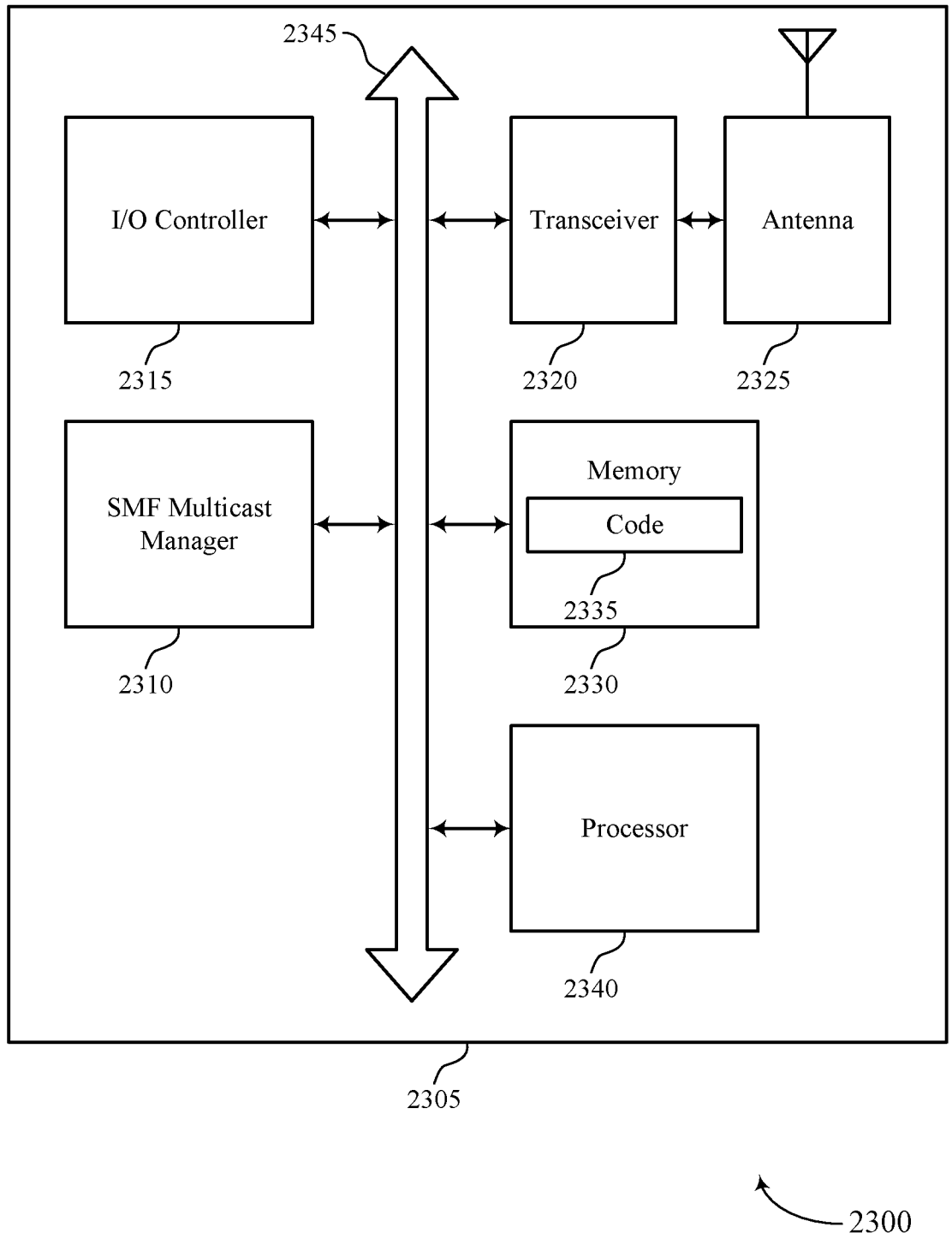
FIG. 23 shows a diagram of a system including a device that supports mixed mode multicast architecture in accordance with aspects of the present disclosure.

FIG. 23 shows a diagram of a system 2300 including a device 2305 that supports mixed mode multicast architecture in accordance with aspects of the present disclosure. The device 2305 may be an example of or include the components of device 2005, device 2105, or a device as described herein. The device 2305 may include components for bi-directional voice and data communications including components for transmitting and receiving communications, including a SMF multicast manager 2310, an I/O controller 2315, a transceiver 2320, an antenna 2325, memory 2330, and a processor 2340. These components may be in electronic communication via one or more buses (e.g., bus 2345).

The SMF multicast manager 2310 may identify, at an SMF, that a UE is to join a multicast source for reception of multicast traffic from the multicast source. The SMF multicast manager 2310 may then select an MC-UPF to provide the multicast traffic to the UE. Additionally, the SMF multicast manager 2310 may transmit PDU session information associated with the UE and multicast source information associated with the multicast source to the multicast UPF. Subsequently, the SMF multicast manager 2310 may receive, from the MC-UPF and responsive to the PDU session information and the multicast source information, multicast distribution information to be associated with the multicast source, where the multicast distribution information includes information per multicast source per UE charging and LI related information. Accordingly, the SMF multicast manager 2310 may transmit the multicast distribution information, a related PDU session ID, QoS information for the multicast data, and a management container to a management function (e.g., an AMF, SMF, etc.) for use by a base station that is to deliver the multicast traffic to the UE via either unicast delivery or multicast delivery.

The I/O controller 2315 may manage input and output signals for the device 2305. The I/O controller 2315 may also manage peripherals not integrated into the device 2305.

In some cases, the I/O controller 2315 may represent a physical connection or port to an external peripheral. In some cases, the I/O controller 2315 may utilize an operating system such as iOS®, ANDROID®, MS-DOS®, MS-WINDOWS®, OS/2®, UNIX®, LINUX®, or another known operating system. In other cases, the I/O controller 2315 may represent or interact with a modem, a keyboard, a mouse, a touchscreen, or a similar device. In some cases, the I/O controller 2315 may be implemented as part of a processor. In some cases, a user may interact with the device 2305 via the I/O controller 2315 or via hardware components controlled by the I/O controller 2315.

The transceiver 2320 may communicate bi-directionally, via one or more antennas, wired, or wireless links as described above. For example, the transceiver 2320 may represent a wireless transceiver and may communicate bi-directionally with another wireless transceiver. The transceiver 2320 may also include a modem to modulate the packets and provide the modulated packets to the antennas for transmission, and to demodulate packets received from the antennas.

In some cases, the wireless device may include a single antenna 2325. However, in some cases the device may have more than one antenna 2325, which may be capable of concurrently transmitting or receiving multiple wireless transmissions.

The memory 2330 may include RAM and ROM. The memory 2330 may store computer-readable, computer-executable code 2335 including instructions that, when executed, cause the processor to perform various functions described herein. In some cases, the memory 2330 may contain, among other things, a BIOS which may control basic hardware or software operation such as the interaction with peripheral components or devices.

The processor 2340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2340 may be configured to operate a memory array using a memory controller. In other cases, a memory controller may be integrated into the processor 2340. The processor 2340 may be configured to execute computer-readable instructions stored in a memory (e.g., the memory 2330) to cause the device 2305 to perform various functions (e.g., functions or tasks supporting mixed mode multicast architecture).

The code 2335 may include instructions to implement aspects of the present disclosure, including instructions to support wireless communications. The code 2335 may be stored in a non-transitory computer-readable medium such as system memory or other type of memory. In some cases, the code 2335 may not be directly executable by the processor 2340 but may cause a computer (e.g., when compiled and executed) to perform functions described herein.

Figure 24:
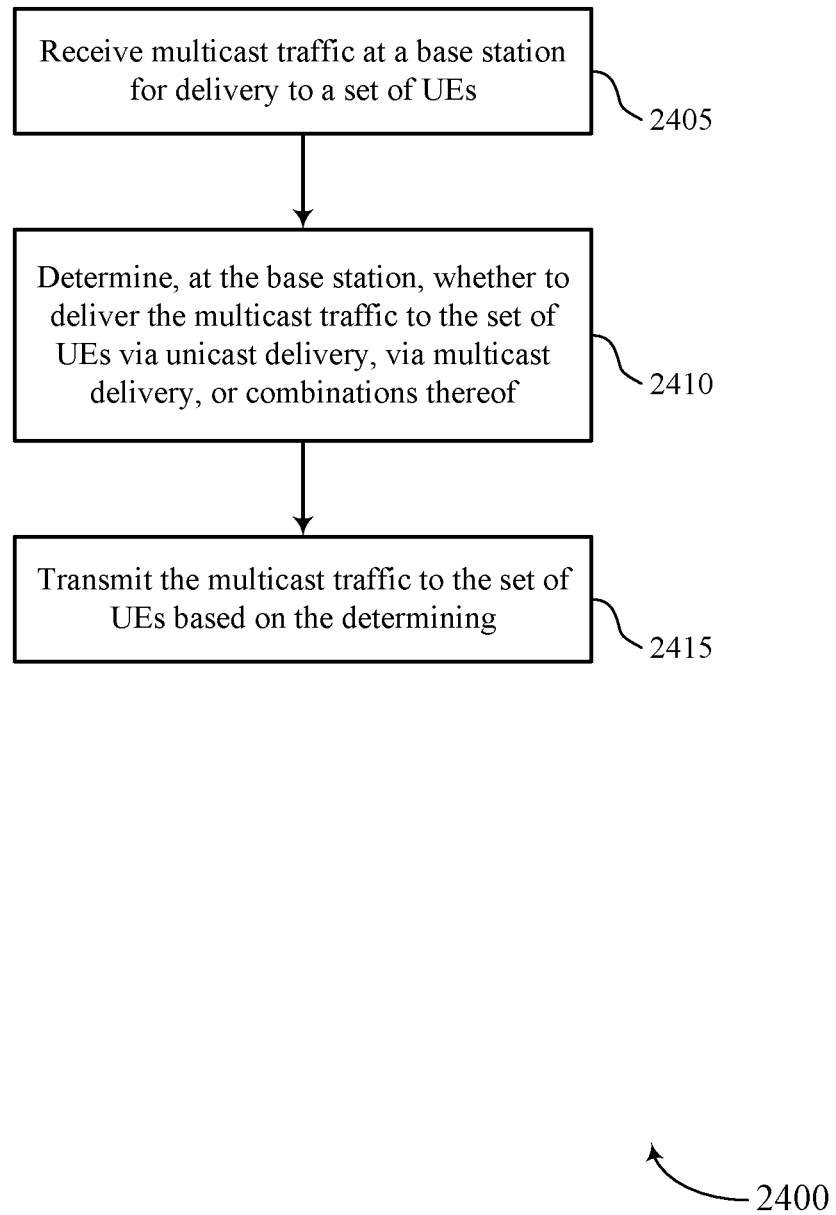
FIGS. 24 through 28 show flowcharts illustrating methods that support mixed mode multicast architecture in accordance with aspects of the present disclosure.

FIG. 24 shows a flowchart illustrating a method 2400 that supports mixed mode multicast architecture in accordance with aspects of the present disclosure. The operations of method 2400 may be implemented by a base station 105 or its components as described herein. For example, the operations of method 2400 may be performed by a base station multicast manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2405, the base station may receive multicast traffic at a base station for delivery to a set of UEs. The operations of 2405 may be performed according to the methods described herein. In some examples, aspects of the operations of 2405 may be performed by a multicast traffic component as described with reference to FIGS. 16 through 19.

At 2410, the base station may determine, at the base station, whether to deliver the multicast traffic to the set of UEs via unicast delivery, via multicast delivery, or combinations thereof. The operations of 2410 may be performed according to the methods described herein. In some examples, aspects of the operations of 2410 may be performed by a multicast determination component as described with reference to FIGS. 16 through 19.

At 2415, the base station may transmit the multicast traffic to the set of UEs based on the determining. The operations of 2415 may be performed according to the methods described herein. In some examples, aspects of the operations of 2415 may be performed by a multicast transmitter as described with reference to FIGS. 16 through 19.

Figure 25:
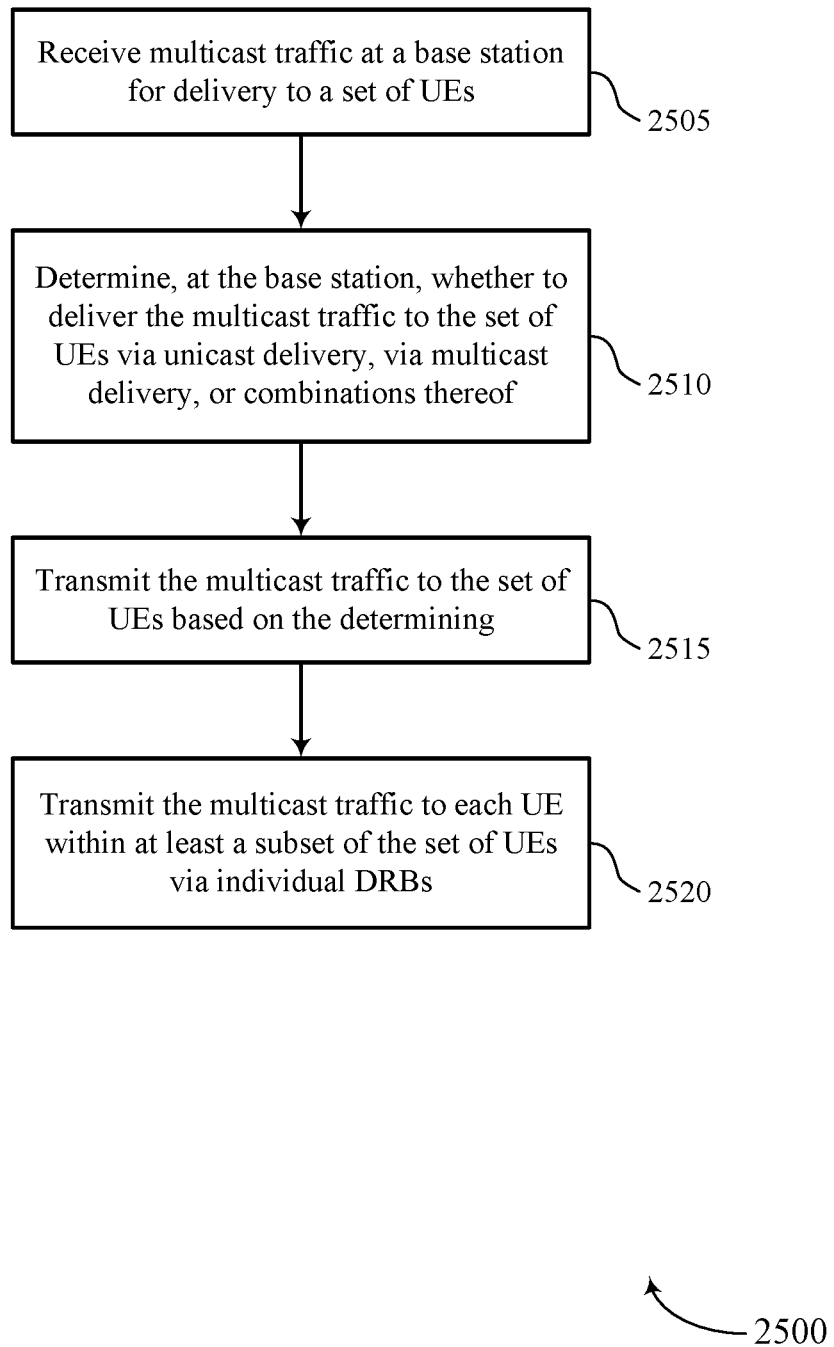

FIG. 25 shows a flowchart illustrating a method 2500 that supports mixed mode multicast architecture in accordance with aspects of the present disclosure. The operations of method 2500 may be implemented by a base station 105 or its components as described herein. For example, the operations of method 2500 may be performed by a base station multicast manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2505, the base station may receive multicast traffic at a base station for delivery to a set of UEs. The operations of 2505 may be performed according to the methods described herein. In some examples, aspects of the operations of 2505 may be performed by a multicast traffic component as described with reference to FIGS. 16 through 19.

At 2510, the base station may determine, at the base station, whether to deliver the multicast traffic to the set of UEs via unicast delivery, via multicast delivery, or combinations thereof. The operations of 2510 may be performed according to the methods described herein. In some examples, aspects of the operations of 2510 may be performed by a multicast determination component as described with reference to FIGS. 16 through 19.

At 2515, the base station may transmit the multicast traffic to the set of UEs based on the determining. The operations of 2515 may be performed according to the methods described herein. In some examples, aspects of the operations of 2515 may be performed by a multicast transmitter as described with reference to FIGS. 16 through 19.

At 2520, the base station may transmit the multicast traffic to each UE within at least a subset of the set of UEs via individual DRBs. The operations of 2520 may be performed according to the methods described herein. In some examples, aspects of the operations of 2520 may be performed by a DRB component as described with reference to FIGS. 16 through 19.

Figure 26:
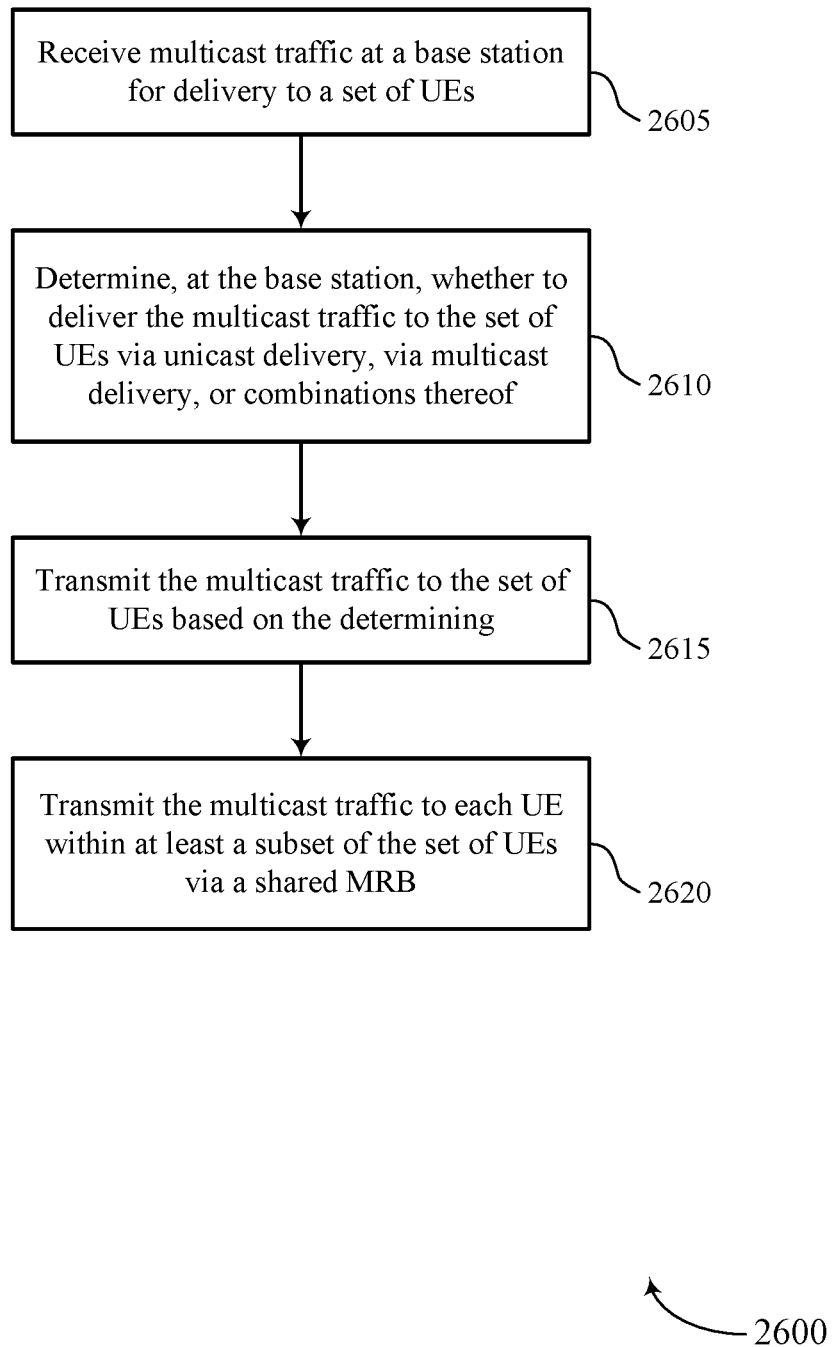

FIG. 26 shows a flowchart illustrating a method 2600 that supports mixed mode multicast architecture in accordance with aspects of the present disclosure. The operations of method 2600 may be implemented by a base station 105 or its components as described herein. For example, the operations of method 2600 may be performed by a base station multicast manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2605, the base station may receive multicast traffic at a base station for delivery to a set of UEs. The operations of 2605 may be performed according to the methods described herein. In some examples, aspects of the operations of 2605 may be performed by a multicast traffic component as described with reference to FIGS. 16 through 19.

At 2610, the base station may determine, at the base station, whether to deliver the multicast traffic to the set of UEs via unicast delivery, via multicast delivery, or combinations thereof. The operations of 2610 may be performed according to the methods described herein. In some examples, aspects of the operations of 2610 may be performed by a multicast determination component as described with reference to FIGS. 16 through 19.

At 2615, the base station may transmit the multicast traffic to the set of UEs based on the determining. The operations of 2615 may be performed according to the methods described herein. In some examples, aspects of the operations of 2615 may be performed by a multicast transmitter as described with reference to FIGS. 16 through 19.

At 2620, the base station may transmit the multicast traffic to each UE within at least a subset of the set of UEs via a shared MRB. The operations of 2620 may be performed according to the methods described herein. In some examples, aspects of the operations of 2620 may be performed by a MRB component as described with reference to FIGS. 16 through 19.

Figure 27:
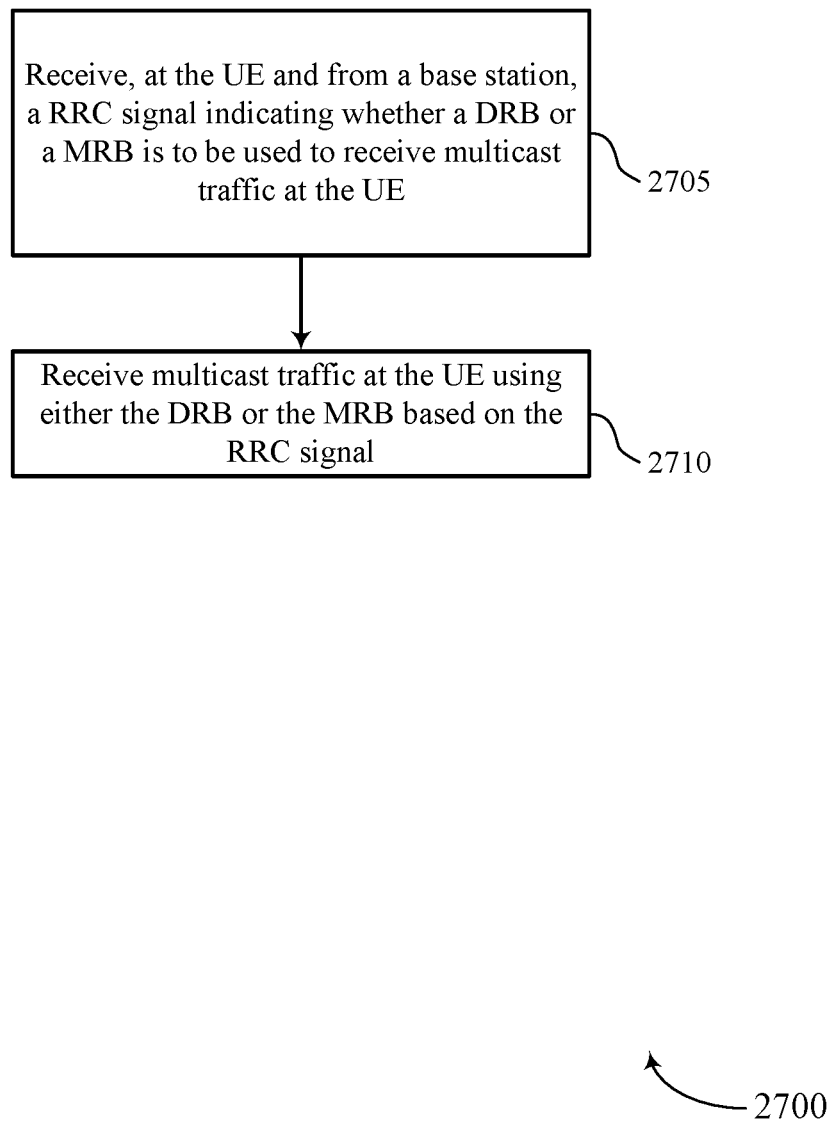

FIG. 27 shows a flowchart illustrating a method 2700 that supports mixed mode multicast architecture in accordance with aspects of the present disclosure. The operations of method 2700 may be implemented by a UE 115 or its components as described herein. For example, the operations of method 2700 may be performed by a UE multicast manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2705, the UE may receive, at the UE and from a base station, a signal (e.g., RRC signal) indicating whether a DRB or an MRB is to be used to receive multicast traffic at the UE. The operations of 2705 may be performed according to the methods described herein. In some examples, aspects of the operations of 2705 may be performed by a multicast configuration component as described with reference to FIGS. 12 through 15.

At 2710, the UE may receive multicast traffic at the UE using either the DRB or the MRB based on the signal. The operations of 2710 may be performed according to the methods described herein. In some examples, aspects of the operations of 2710 may be performed by a multicast receiver as described with reference to FIGS. 12 through 15.

Figure 28:
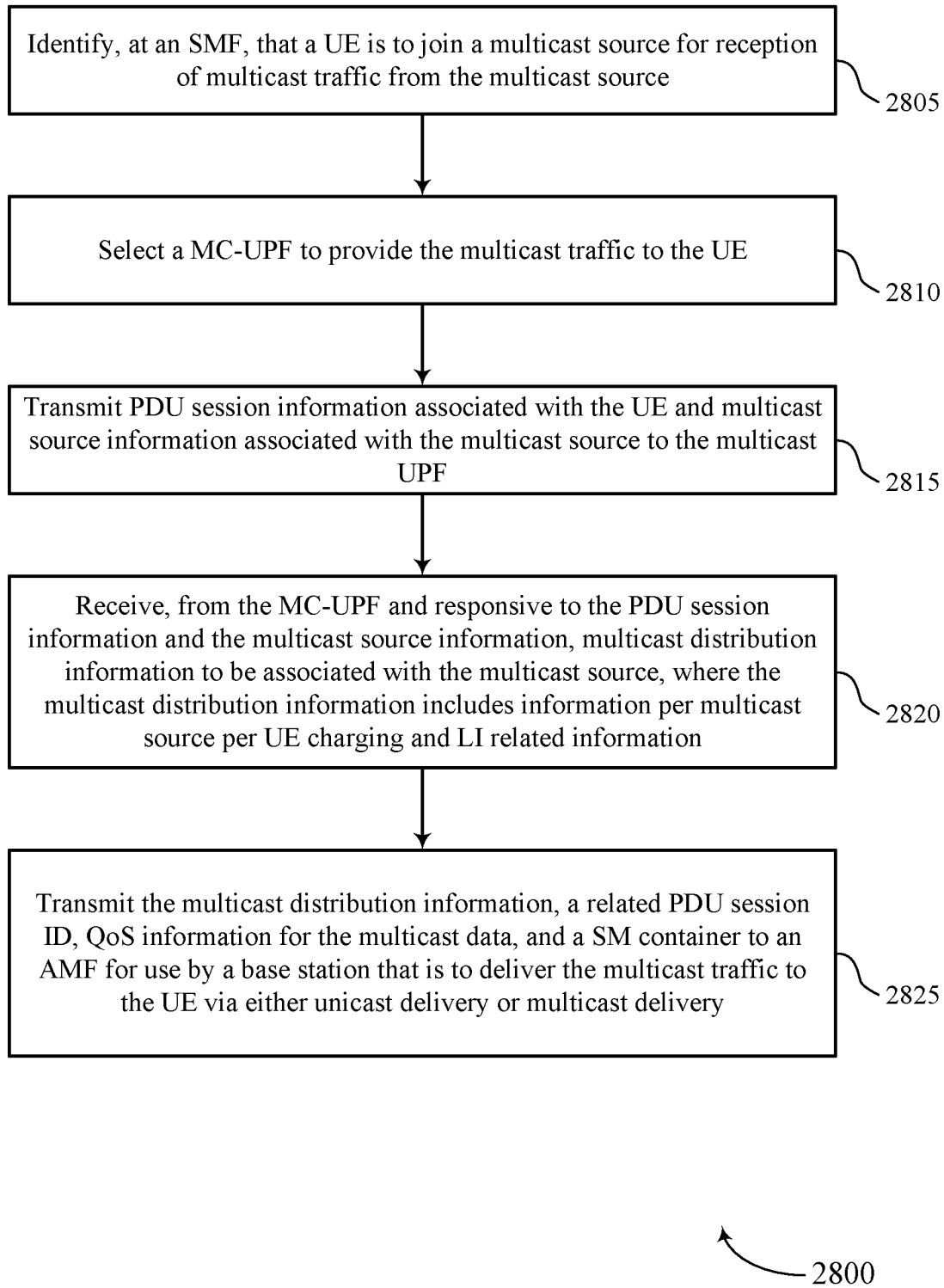

FIG. 28 shows a flowchart illustrating a method 2800 that supports mixed mode multicast architecture in accordance with aspects of the present disclosure. The operations of method 2800 may be implemented by a device or its components as described herein. For example, the operations of method 2800 may be performed by a multicast manager as described with reference to FIGS. 21 through 24. In some examples, a device may execute a set of instructions to control the functional elements of the device to perform the functions described below. Additionally or alternatively, a device may perform aspects of the functions described below using special-purpose hardware.

At 2805, the device may identify, at an SMF, that a UE is to join a multicast source for reception of multicast traffic from the multicast source. The operations of 2805 may be performed according to the methods described herein. In some examples, aspects of the operations of 2805 may be performed by a multicast identifier as described with reference to FIGS. 21 through 24.

At 2810, the device may select an MC-UPF to provide the multicast traffic to the UE. The operations of 2810 may be performed according to the methods described herein. In some examples, aspects of the operations of 2810 may be performed by an MC-UPF component as described with reference to FIGS. 21 through 24.

At 2815, the device may transmit PDU session information associated with the UE and multicast source information associated with the multicast source to the multicast UPF. The operations of 2815 may be performed according to the methods described herein. In some examples, aspects of the operations of 2815 may be performed by a PDU transmitter as described with reference to FIGS. 21 through 24.

At 2820, the device may receive, from the MC-UPF and responsive to the PDU session information and the multicast source information, multicast distribution information to be associated with the multicast source, where the multicast distribution information includes information per multicast source per UE charging and LI related information. The operations of 2820 may be performed according to the methods described herein. In some examples, aspects of the operations of 2820 may be performed by a multicast distribution information component as described with reference to FIGS. 21 through 24.

At 2825, the device may transmit the multicast distribution information, a related PDU session ID, QoS information for the multicast data, and a management container to a management function (e.g., an AMF, SMF, etc.) for use by a base station that is to deliver the multicast traffic to the UE via either unicast delivery or multicast delivery. The operations of 2825 may be performed according to the methods described herein. In some examples, aspects of the operations of 2825 may be performed by a multicast distribution information transmitter as described with reference to FIGS. 21 through 24.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   one or more memories storing processor-executable code; and
   one or more processors coupled with the one or more memories and individually or collectively operable to execute the code to cause the apparatus to:
   identify that a user equipment (UE) is to join a multicast source for reception of multicast traffic from the multicast source;
   select a multicast user plane function (MC-UPF) to provide the multicast traffic to the UE;
   output protocol data unit (PDU) session information associated with the UE and multicast source information associated with the multicast source to the MC-UPF;
   obtain, from the MC-UPF and responsive to the PDU session information and the multicast source information, multicast distribution information to be associated with the multicast source, wherein the multicast distribution information comprises information per multicast source per UE charging and lawful interception (LI) related information; and
   output the multicast distribution information, a related PDU session identifier (ID), quality of service (QoS) information for the multicast traffic, and a management container to a management function for use by a network device that is to deliver the multicast traffic to the UE via either unicast delivery or multicast delivery.

2. The apparatus of claim 1, wherein, to identify that a UE is to join a multicast source for reception of multicast traffic from the multicast source, the one or more processors are individually or collectively operable to execute the code to cause the apparatus to:
   obtain the multicast source information from the UE.

3. The apparatus of claim 1, wherein the multicast source information comprises an Internet Protocol (IP) multicast delivery address and an IP multicast source address, an Ethernet broadcast traffic indication which indicates that only Ethernet broadcast frames are to be delivered as the multicast traffic to the UE, or a combination thereof.

4. The apparatus of claim 1, wherein the one or more processors are individually or collectively further operable to execute the code to cause the apparatus to:
   identify that the UE is to leave the multicast source;
   output a request to the MC-UPF to release a UE context for the multicast source information; and
   output a request that the network device remove a tuple that includes the PDU session ID and the multicast source information from the UE context.

5. The apparatus of claim 1, wherein the one or more processors are individually or collectively further operable to execute the code to cause the apparatus to:
   obtain an indication that a handover or an N2 path switch is to occur;
   select a new MC-UPF to provide the multicast traffic to the UE;
   output a request to the new MC-UPF that the new MC-UPF is to join the multicast source and to provide updated multicast distribution information to the wireless device;
   obtain the updated multicast distribution information from the new MC-UPF; and
   output the updated multicast distribution information via the management function to the network device.

6. The apparatus of claim 1, wherein the one or more processors are individually or collectively further operable to execute the code to cause the apparatus to:
   add, to a PDU session associated with the PDU session ID, the multicast source identified by the multicast source information.

7. The apparatus of claim 1, wherein the one or more processors are individually or collectively further operable to execute the code to cause the apparatus to:
   identify that a PDU session for communication with the UE has not yet been established;
   establish a unicast PDU session for communication with the UE; and
   add, to the unicast PDU session, the multicast source identified by the multicast source information.

8. The apparatus of claim 1, wherein, to identify that a UE is to join a multicast source for reception of multicast traffic from the multicast source, the one or more processors are individually or collectively operable to execute the code to cause the apparatus to:
   configure a UPF that is separate from the MC-UPF and which is serving a unicast PDU session to the UE, such that the UPF matches and forwards any Internet Group Management Protocol (IGMP) or Multicast Listener Discovery (MLD) messages obtained from the UE;
   obtain an IGMP or MLD message from the UPF indicating that the UE is to join the multicast source; and
   derive the multicast source information from the IGMP or MLD message, wherein the one or more processors are individually or collectively further operable to execute the code to cause the apparatus to:

add, to a PDU session on which the IGMP or MLD message was obtained, the multicast source identified by the multicast source information; or stop delivery of the multicast traffic to the UE based at least in part on the IGMP or MLD message.

9. The apparatus of claim 1, wherein the one or more processors are individually or collectively further operable to execute the code to cause the apparatus to:

obtain an indication that the UE is to leave the multicast source; and stop delivery of the multicast traffic to the UE based at least in part on the indication.

10. The apparatus of claim 1, wherein the one or more processors are individually or collectively further operable to execute the code to cause the apparatus to:

output a request for a group key for ciphering of the multicast traffic;

obtain, as a result of the request, the group key, wherein the group key is based at least in part on the multicast distribution information; and output the group key via the management function to the network device for use by the network device with the multicast traffic.

11. A method for wireless communication, comprising:

identifying, at an entity with a wireless communications network, that a user equipment (UE) is to join a multicast source for reception of multicast traffic from the multicast source;

selecting a multicast user plane function (MC-UPF) to provide the multicast traffic to the UE;

outputting protocol data unit (PDU) session information associated with the UE and multicast source information associated with the multicast source to the MC-UPF;

receiving, from the MC-UPF and responsive to the PDU session information and the multicast source information, multicast distribution information to be associated with the multicast source, wherein the multicast distribution information comprises information per multicast source per UE charging and lawful interception (LI) related information; and outputting the multicast distribution information, a related PDU session identifier (ID), quality of service (QoS) information for the multicast traffic, and a management container to a management function for use by a network device that is to deliver the multicast traffic to the UE via either unicast delivery or multicast delivery.

12. The method of claim 11, wherein identifying that a UE is to join a multicast source for reception of multicast traffic from the multicast source comprises:

obtaining the multicast source information from the UE.

13. The method of claim 11, further comprising:

identifying that the UE is to leave the multicast source;

outputting a request to the MC-UPF to release a UE context for the multicast source information; and outputting a request that the network device remove a tuple that includes the PDU session ID and the multicast source information from the UE context.

14. The method of claim 11, further comprising:

obtaining an indication that a handover or an N2 path switch is to occur;

selecting a new MC-UPF to provide the multicast traffic to the UE;

outputting a request to the new MC-UPF that the new MC-UPF is to join the multicast source and to provide updated multicast distribution information to the entity;

obtaining the updated multicast distribution information from the new MC-UPF; and outputting the updated multicast distribution information via the management function to the network device.

15. The method of claim 11, further comprising:

adding, to a PDU session associated with the PDU session ID, the multicast source identified by the multicast source information.

16. The method of claim 11, further comprising:

identifying that a PDU session for communication with the UE has not yet been established;

establishing a unicast PDU session for communication with the UE; and adding, to the unicast PDU session, the multicast source identified by the multicast source information.

17. The method of claim 11, wherein identifying that a UE is to join a multicast source for reception of multicast traffic from the multicast source comprises:

configuring a UPF that is separate from the MC-UPF and which is serving a unicast PDU session to the UE, such that the UPF matches and forwards any Internet Group Management Protocol (IGMP) or Multicast Listener Discovery (MLD) messages obtained from the UE;

obtaining an IGMP or MLD message from the UPF indicating that the UE is to join the multicast source; and deriving the multicast source information from the IGMP or MLD message, the method further comprising:

adding, to a PDU session on which the IGMP or MLD message was obtained, the multicast source identified by the multicast source information; or stopping delivery of the multicast traffic to the UE based at least in part on the IGMP or MLD message.

18. The method of claim 11, further comprising:

obtaining an indication that the UE is to leave the multicast source; and stopping delivery of the multicast traffic to the UE based at least in part on the indication.

19. The method of claim 11, further comprising:

outputting a request for a group key for ciphering of the multicast traffic;

obtaining, as a result of the request, the group key, wherein the group key is based at least in part on the multicast distribution information; and outputting the group key via the management function to the network device for use by the network device with the multicast traffic.

20. A non-transitory computer-readable medium storing code for wireless communication, the code comprising instructions executable by one or more processors to:

identify, at an entity with a wireless communications network, that a user equipment (UE) is to join a multicast source for reception of multicast traffic from the multicast source;

select a multicast user plane function (MC-UPF) to provide the multicast traffic to the UE;

output protocol data unit (PDU) session information associated with the UE and multicast source information associated with the multicast source to the MC-UPF;

obtain, from the MC-UPF and responsive to the PDU session information and the multicast source information, multicast distribution information to be associated with the multicast source, wherein the multicast distribution information comprises information per multicast source per UE charging and lawful interception (LI) related information; and output the multicast distribution information, a related PDU session identifier (ID), quality of service (QoS) information for the multicast traffic, and a management container to a management function for use by a network device that is to deliver the multicast traffic to the UE via either unicast delivery or multicast delivery.

* * * * *